United States Patent
Takashima et al.

(10) Patent No.: US 8,098,326 B2
(45) Date of Patent: Jan. 17, 2012

(54) ELECTRONIC DEVICE AND ACCESSORY DEVICE

(75) Inventors: Kouichiro Takashima, Tokyo (JP); Yoichi Miyajima, Tokyo (JP); Yoshitake Takahashi, Tokyo (JP); Nobutatsu Takahashi, Tokyo (JP); Yuichiro Nogo, Tokyo (JP); Kiyoshi Miyamori, Tokyo (JP); Masayoshi Iida, Tokyo (JP); Nobuhito Ebine, Tokyo (JP)

(73) Assignee: Sony Corporation (JP)

( * ) Notice: Subject to any disclaimer, the term of this patent is extended or adjusted under 35 U.S.C. 154(b) by 284 days.

(21) Appl. No.: 12/148,546

(22) Filed: Apr. 18, 2008

(65) Prior Publication Data

US 2008/0204591 A1 Aug. 28, 2008

Related U.S. Application Data

(63) Continuation of application No. 11/107,147, filed on Apr. 15, 2005, now Pat. No. 7,612,826.

(30) Foreign Application Priority Data

Apr. 27, 2004 (JP) ................ P2004-131321
Apr. 27, 2004 (JP) ................ P2004-131552
Aug. 9, 2004 (JP) ................ P2004-231818

(51) Int. Cl.
*H04N 5/225* (2006.01)

(52) U.S. Cl. ........ 348/375; 396/422; 439/374; 439/246; 439/310; 439/376; 439/764; D16/237

(58) Field of Classification Search .................. 348/373, 348/375, 376; D16/237–250; 439/102, 127, 439/180, 232, 233, 246, 249, 283, 297, 299, 439/308–310, 325, 333, 376, 484, 539, 670, 439/764; 396/422
See application file for complete search history.

(56) References Cited

U.S. PATENT DOCUMENTS

| | | | |
|---|---|---|---|
| 3,252,394 A | 5/1966 | Jakob et al. | |
| 4,591,250 A | 5/1986 | Woodruff | |
| 5,016,142 A * | 5/1991 | White | 361/802 |
| 5,089,834 A | 2/1992 | Nakasa et al. | |
| 6,116,932 A | 9/2000 | Kawakita et al. | |
| 6,587,152 B1 * | 7/2003 | Sharp et al. | 348/373 |
| 7,612,826 B2 * | 11/2009 | Takashima et al. | 348/375 |
| 2002/0081912 A1 | 6/2002 | Sakurai et al. | |
| 2002/0168185 A1 * | 11/2002 | Hagiuda et al. | 396/155 |

FOREIGN PATENT DOCUMENTS

| | | |
|---|---|---|
| JP | 9-163200 | 12/1997 |
| JP | 2003-295263 | 10/2003 |
| JP | 2004-29733 | 1/2004 |

* cited by examiner

*Primary Examiner* — Sinh Tran
*Assistant Examiner* — Paul Berardesca
(74) *Attorney, Agent, or Firm* — Lerner, David, Littenberg, Krumholz & Mentlik, LLP

(57) ABSTRACT

A connector on an electronic device includes a pair of locking plates, a guide groove, and a space. Each locking plate has, on its edge, a first concave portion, a first convex portion, a second concave portion, and a second convex portion. An intermediate surface for determining a position of an accessory device below the guide groove is provided below the second concave portions and the second convex portions. A contact mounting surface provided with plural contacts is provided below the first convex portions. Guide surfaces for determining a position of the accessory device in the width direction of the guide groove are provided below the first concave portions and the first convex portions.

28 Claims, 36 Drawing Sheets

FIG. 3
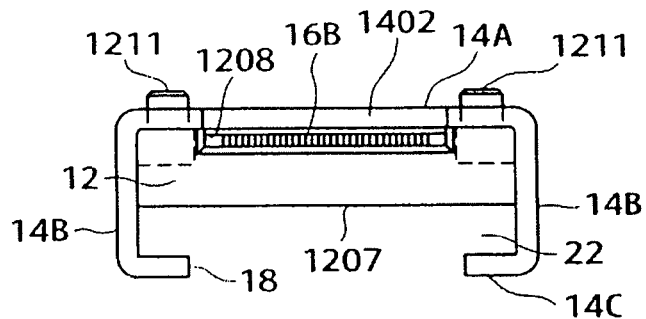
(C)
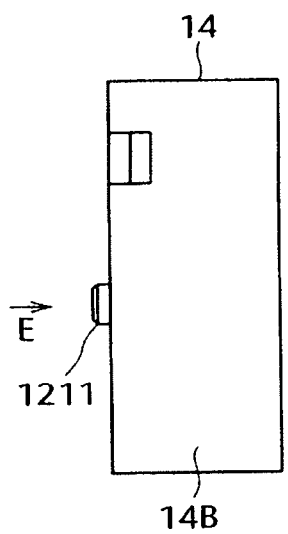
(D)
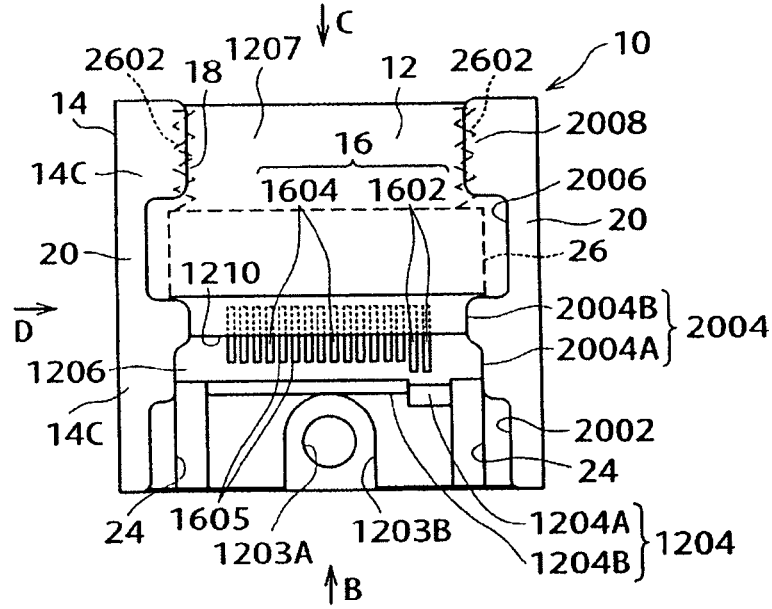
(A)
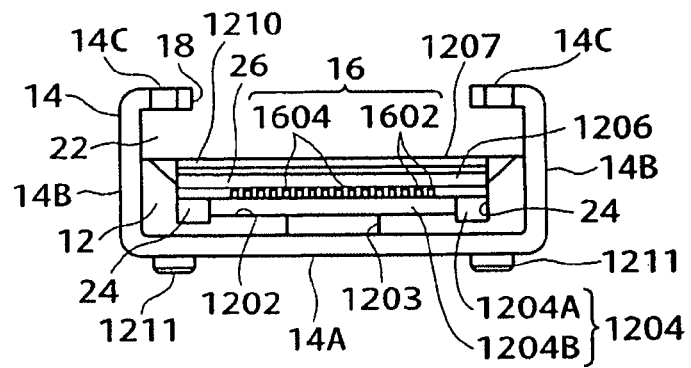
(B)

F I G. 1 4
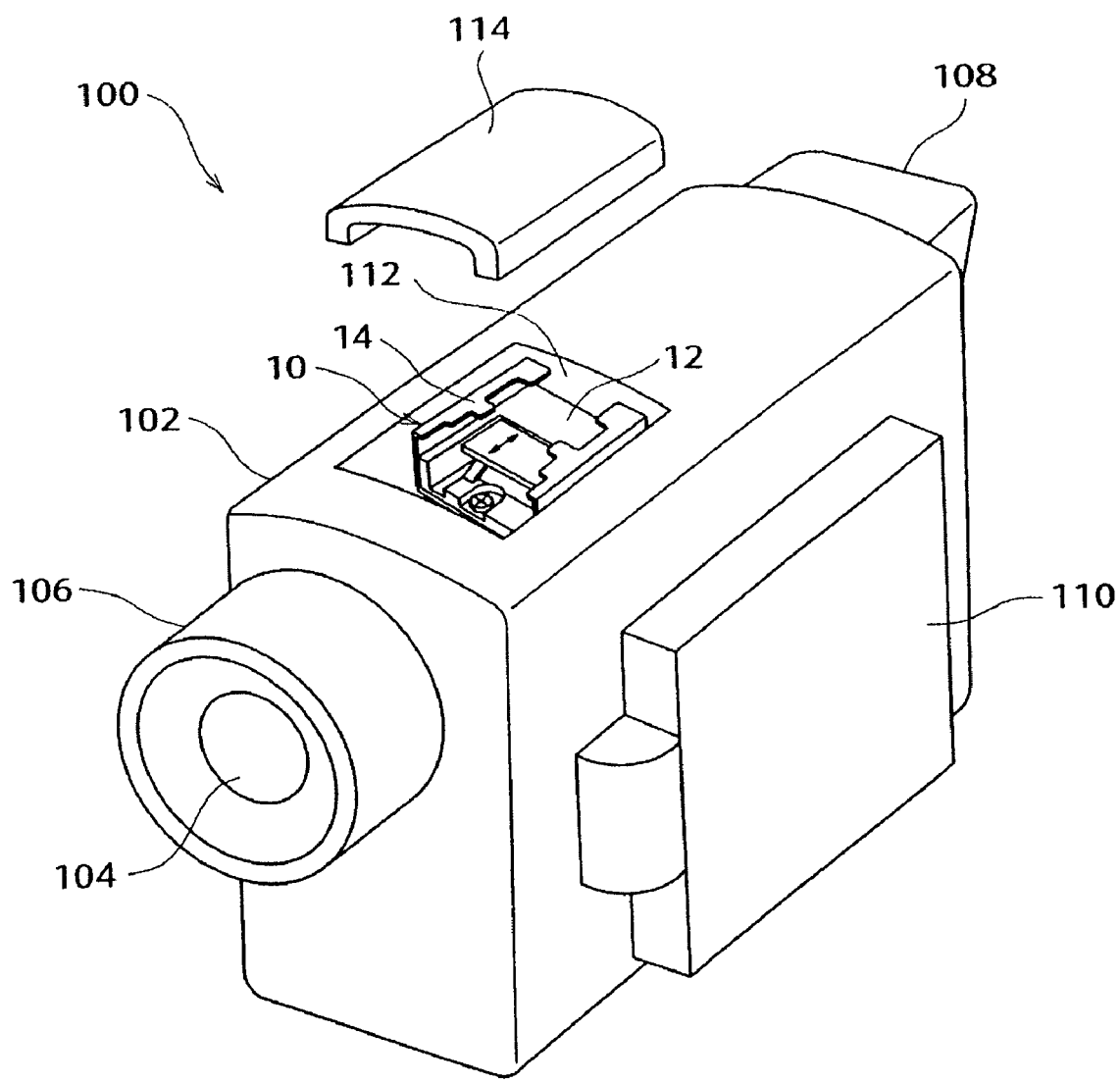

FIG. 17
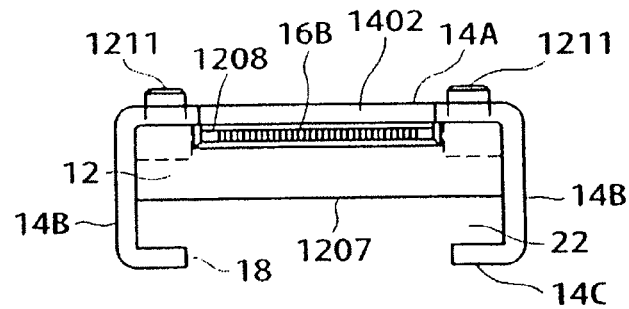
(C)
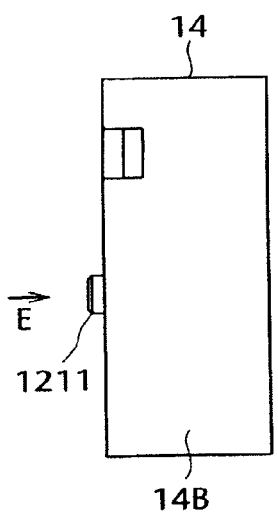
(D)
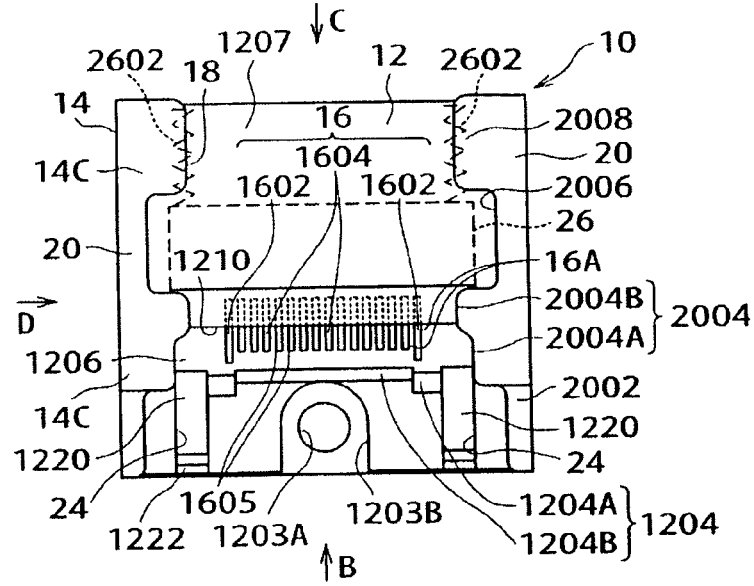
(A)
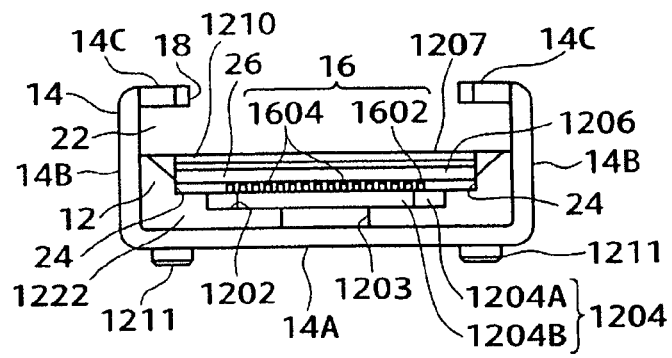
(B)

F I G . 20
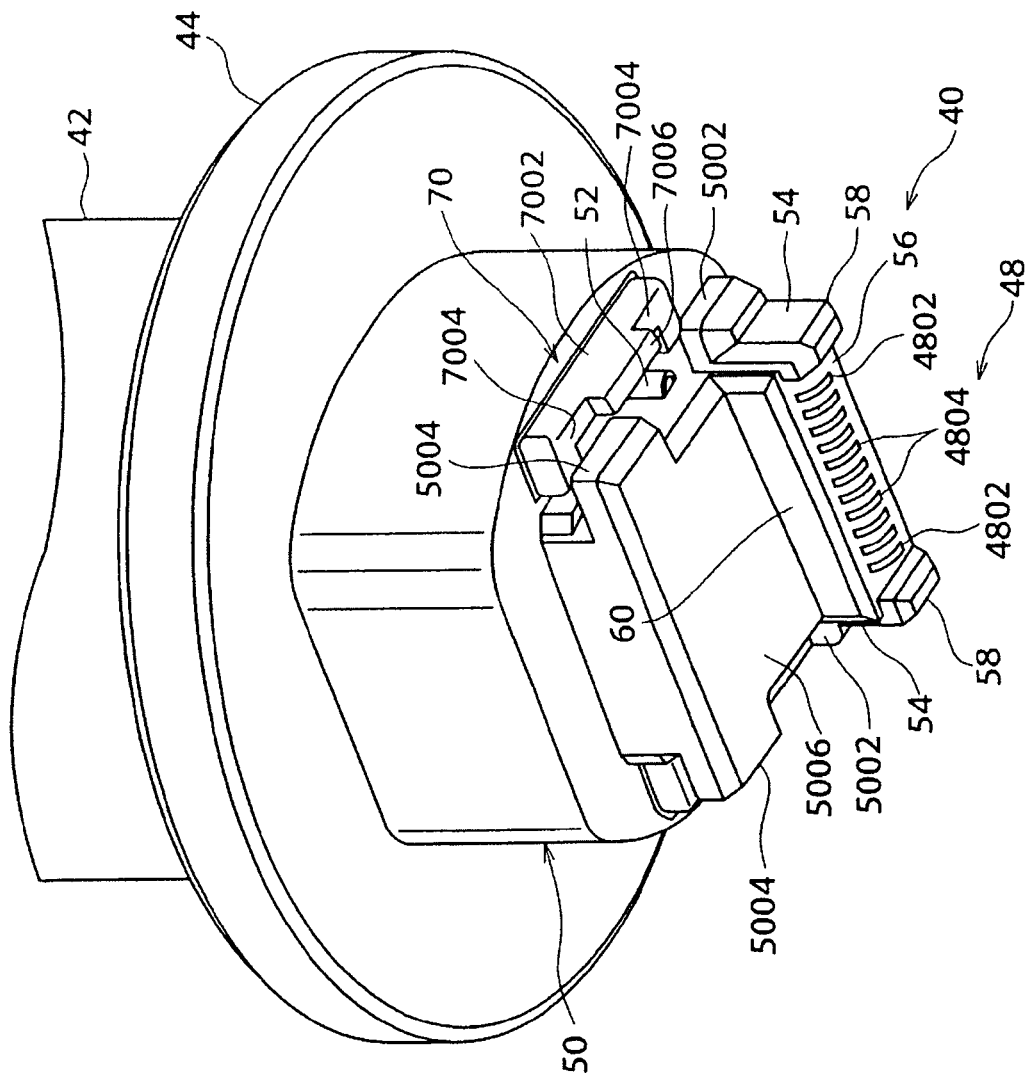

F I G. 3 4
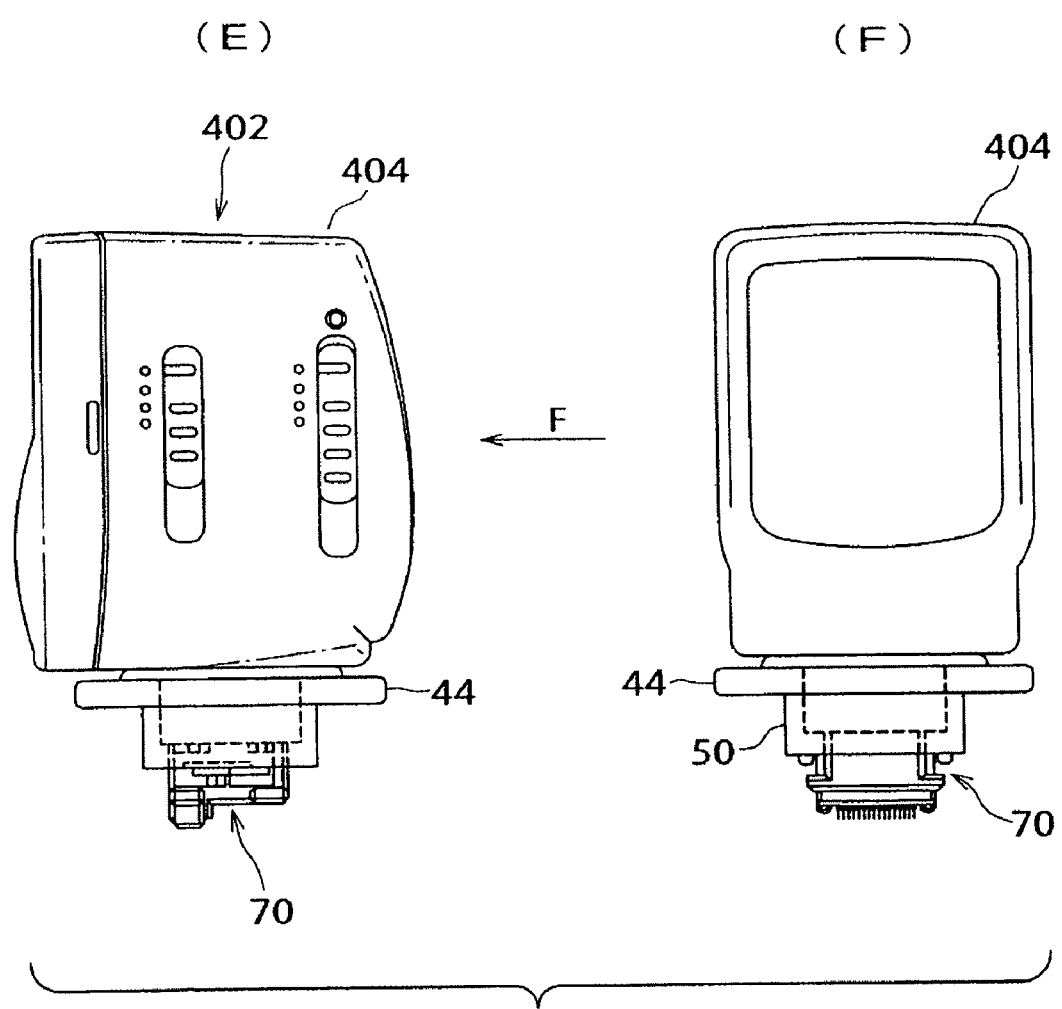

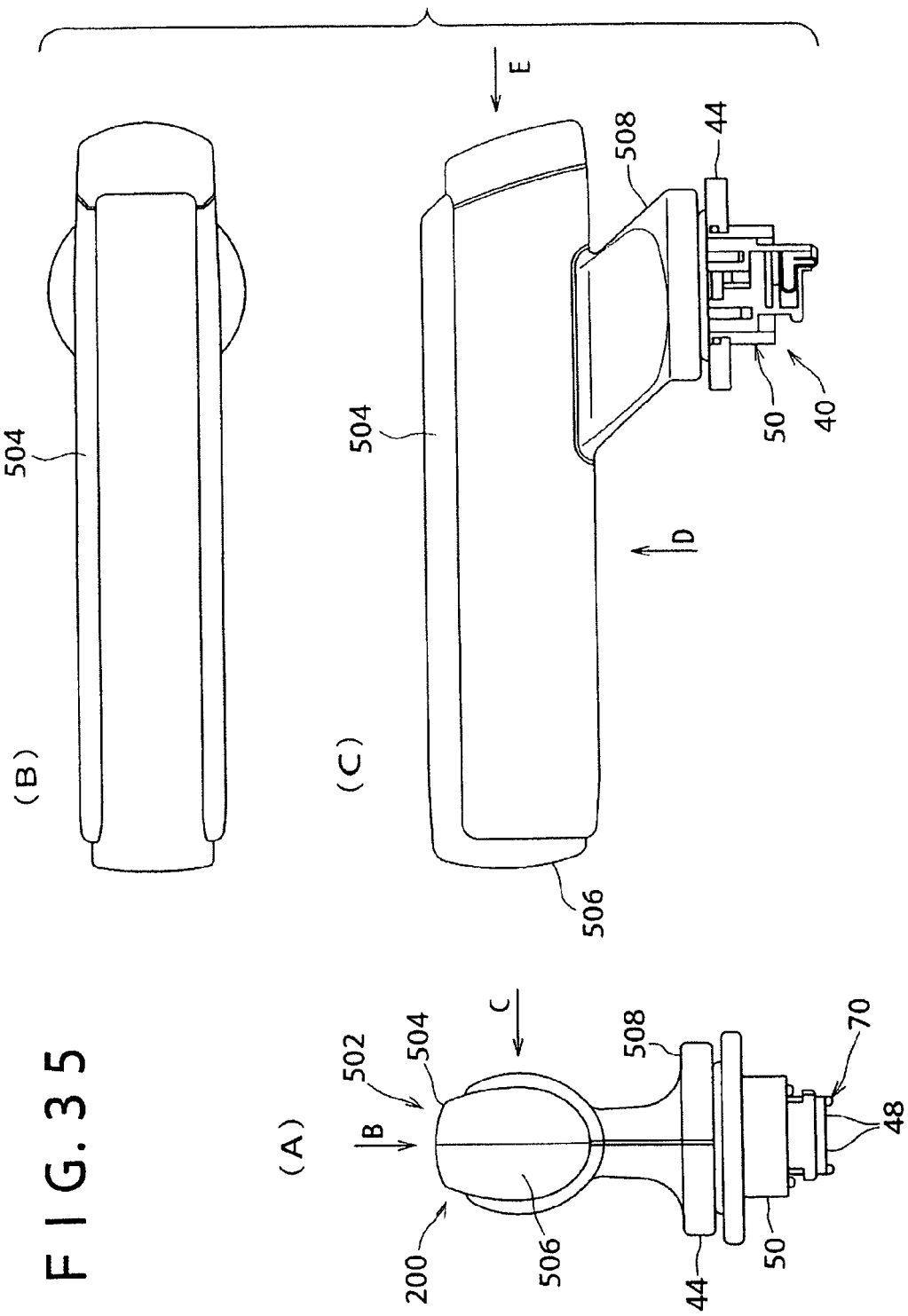

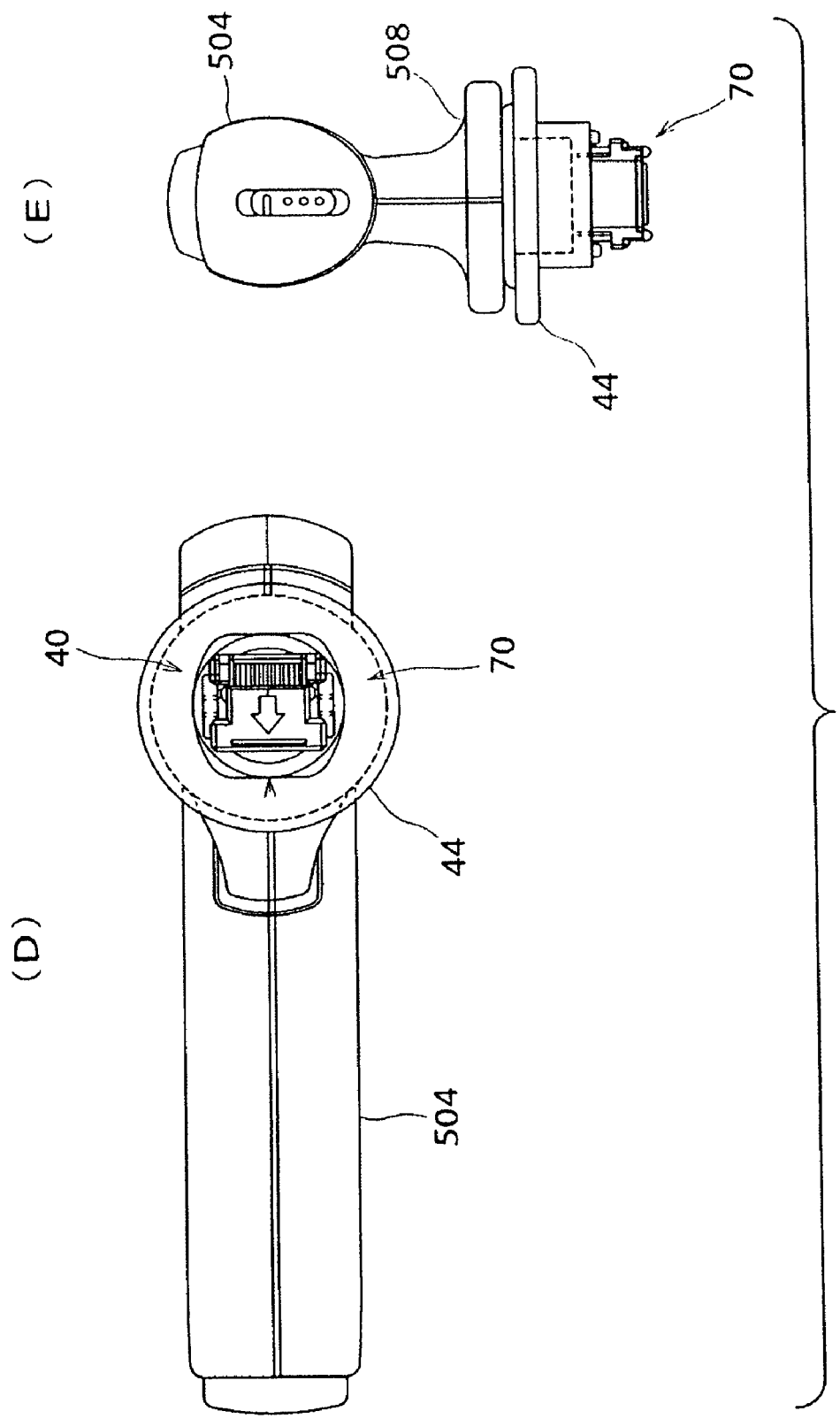

ELECTRONIC DEVICE AND ACCESSORY DEVICE

CROSS-REFERENCE TO RELATED APPLICATIONS

This application is a continuation of U.S. application Ser. No. 11/107,147, filed on Apr. 15, 2005, which claims priority from Japanese Patent Application Nos. JP 2004-131321, filed Apr. 27, 2004, JP 2004-131552 filed Apr. 27, 2004, and JP 2004-231818, filed Aug. 9, 2004, and which is related to Japanese Application No. JP 2005-093897, filed Mar. 29, 2005, the disclosures of which are hereby incorporated by reference herein.

BACKGROUND OF THE INVENTION

1. Field of the Invention

The present invention relates to an electronic device and an accessory device.

2. Description of the Related Art

An imaging device (hereinafter referred to as an electronic device) is, in many cases, provided with an accessory mounting section used to mount accessory devices such as a flashlight for emitting auxiliary light and a microphone for recording sound.

A conventional type of accessory mounting section includes a flat mounting surface, a holding section connected to the mounting surface, and contacts provided on the mounting surface for supplying electrical power or transferring signals.

An accessory device to be mounted on the electronic device includes a connection section to be connected to the accessory mounting section of the electronic device. The connection section is provided with contacts used to supply electrical power or transfer signals.

To connect the connection section of the accessory device to the accessory mounting section of the electronic device, the connection section is put in a position in which it abuts on the mounting surface of the accessory mounting section and it is then slid linearly along the mounting surface causing the connection section to be held by the holding section. In a state in which the connection section is held by the holding section, the contacts of the accessory device are electrically connected to the contacts of the accessory mounting section (see JP-A No. 163200/1997 and 166816/1997). Such an accessory mounting section and a connection section combined are referred to as an accessory shoe device.

SUMMARY OF THE INVENTION

In the conventional method, the connection section of the accessory device is linearly slid along the accessory mounting section of the electronic device by a distance corresponding to the length of a contour of the connection section. This makes it necessary to secure a space about twice as large as the contour of the connection section of the accessory device around the accessory mounting section of the electronic device, posing a disadvantage in making the electronic device smaller or improving the design of the electronic device.

Under the circumstances, the present invention addresses the above problem and aims to provide an electronic device and an accessory device which are advantageous in making the devices smaller and improving the design of the devices.

To cope with the problem, one embodiment of the present invention resides in an electronic device having an accessory mounting section for mounting a connection section of an accessory device. The accessory mounting section includes a pair of mutually facing locking plates which lie in a same plane, a guide groove formed between the pair of the locking plates, and a space formed downwardly under the pair of the locking plates and the guide groove. The guide groove has a width in the direction in which the pair of the locking plates face each other and a length perpendicular to the width. Mutually facing pairs of first concave portions, first convex portions, second concave portions, and second convex portions are provided, being arranged in the order mentioned in the length direction of the guide groove, at a pair of edges of the locking plates forming the guide groove. An upper guide surface which makes up a bottom portion of the space below a portion of the guide groove, the portion of the guide groove being between a pair of the second concave portions and a pair of the second convex portions of the pair of the locking plates, which determines the position below the guide groove of the connection section of the accessory device, and which guides the connection section of the accessory device in the length direction of the guide groove is provided. A contact mounting surface which makes up a bottom portion of the space below a portion of the guide groove, the portion of the guide groove being between a pair of the first convex portions of the pair of the locking plates, is provided at a level lower than the upper guide surface. Plural contacts for making electrical connections with the accessory device are provided, being arranged in the width direction of the guide groove, on the contact mounting surface. A lower guide surface which determines the position of the connection section of the accessory device in the width direction of the guide groove and which guides the connection section of the accessory device along the length direction of the guide groove is provided on each side, as viewed in the length direction of the guide groove, of a portion of the space, the portion of the space being below the first concave portions and the first convex portions of the pair of the locking plates.

Another embodiment of the present invention resides in an accessory device having a connection section for connection to an accessory mounting section of an electronic device. The connection section of the accessory device includes a shaft member protruding from a case of the accessory device. Of two directions perpendicular to the central axis of the shaft member, one is the width direction of the shaft member. The other of the two directions is the front-rear direction of the shaft member. A first locking part and a second locking part protruding in a same plane are provided in an end portion on each side, as viewed in the front-rear direction, of the shaft member, the first locking part and the second locking part being spaced apart from each other in the front-rear direction. On the side surface where the first locking part and the second locking part are formed on the each side of the shaft member, the portion between the two locking parts forms a recess. An upper guide surface which extends in a plane perpendicular to the length direction of the shaft member, which determines the position in the length direction of the shaft member with respect to the accessory mounting section of the electronic device, and which guides the shaft member in the front-rear direction with respect to the accessory mounting position of the electronic device is provided in a forward portion, as viewed in the length direction, of the shaft member, that is, a portion away from the case and ahead of the end portions, where the first locking parts and the second locking parts are provided, on the sides of the shaft member. A contact mounting surface being more away, in the length direction of the shaft member, from the case than the upper guide surface and lying in a plane parallel with the upper guide surface is provided in a forward portion, as viewed in the length direction, of the shaft member, the forward portion of the shaft member being ahead of the end portions, where the first locking plates are provided, on the sides of the shaft member. Plural contacts for making electrical connections with the electronic device are provided, being arranged in the width direction, on the contact mounting surface. Lower guide surfaces which determine the position in the width direction of the shaft member with respect to the accessory mounting section of the electronic device and which guide the shaft member in the front-rear direction with respect to the accessory mounting section of the electronic device are provided on both sides, as viewed in the front-rear direction, of the contact mounting surface.

In the electronic device of the embodiments of the present invention, to connect the connection section of the accessory device to the accessory mounting section of the electronic device, the connection section of the accessory device is inserted in the space via the first concave portions and the second concave portions. Next, the connection section of the accessory device is moved in a direction of from the first concave portions toward the first convex portions (or from the second concave portions toward the second convex portions) to connect the connection section of the accessory device to the accessory mounting section of the electronic device.

Therefore, according to the electronic device of the embodiments, the dimension along the length direction of the guide groove of a space required to enable the connection section of the accessory device to be connected to the accessory mounting section of the electronic device can be greatly reduced compared with such a space required in conventional cases. This is quite an advantage in making the electronic device and the accessory device smaller and in improving the design of the devices.

In the accessory device of the embodiments of the present invention, to connect the connection section of the accessory device to the accessory mounting section of the electronic device, the first locking parts and the second locking parts are inserted in the accessory mounting section of the electronic device. Next, the shaft member is moved in the front-rear direction to connect the connection section of the accessory device to the accessory mounting section of the electronic device.

Therefore, according to the accessory device of the embodiments, the dimension along the length direction of the guide groove of a space required to enable the connection section of the accessory device to be connected to the accessory mounting section of the electronic device can be greatly reduced compared with such a space required in conventional cases. This is quite an advantage in making the electronic device and the accessory device smaller and in improving the design of the devices.

BRIEF DESCRIPTION OF THE DRAWINGS

FIG. 3 is a view for explaining the connector on the electronic device;

FIG. 14 is a front perspective view of an electronic device of a third embodiment;

FIG. 17 shows a configuration of the connector on the electronic device. In FIG. 17, part (A) is a plan view of the connector on the electronic device, part (B) is a view in the direction of arrow B in part (A), part (C) is a view in the direction of arrow C in part (A), and part (D) is a view in the direction of arrow D in part (A);

In FIG. 18, part (E) is a view in the direction of arrow E in part (D) of FIG. 17 and part (F) is a cross-sectional view taken along line F-F in part (E);

FIG. 20 is a perspective view of a connector on the accessory device;

In FIG. 31, part (A) is a front elevation view of the accessory device of the fourth embodiment, part (B) is a view in the direction of arrow B in part (A), part (C) is a view in the direction of arrow C in part (A), and part (D) is a view in the direction of arrow D in part (A);

In FIG. 32, part (E) is a view in the direction of arrow E in part (A) of FIG. 31 and part (F) is a view in the direction of arrow F in part (E) of FIG. 32;

In FIG. 33, part (A) is a front elevation view of the accessory device of the fifth embodiment, part (B) is a view in the direction of arrow B in part (A), part (C) is a view in the direction of arrow C in part (A), and part (D) is a view in the direction of arrow D in part (A);

FIG. 34 shows a configuration of the accessory device of the fifth embodiment. In FIG. 34, part (E) is a view in the direction of arrow E in part (A) of FIG. 33 and part (F) is a view in the direction of arrow F in part (E) of FIG. 34;

FIG. 35 shows a configuration of an accessory device of a sixth embodiment. In FIG. 35, part (A) is a front elevation view of the accessory device of the sixth embodiment, part (B) is a view in the direction of arrow B in part (A), and part (C) is a view in the direction of arrow C in part (A); and FIG. 36 shows a configuration of the accessory device of the sixth embodiment. In FIG. 36, part (D) is a view in the direction of arrow D in part (C) of FIG. 35 and part (E) is a view in the direction of arrow E in part (C) of FIG. 35.

DETAILED DESCRIPTION

First Embodiment

A first embodiment of the present invention will be described with reference to drawings.

Figure 1:
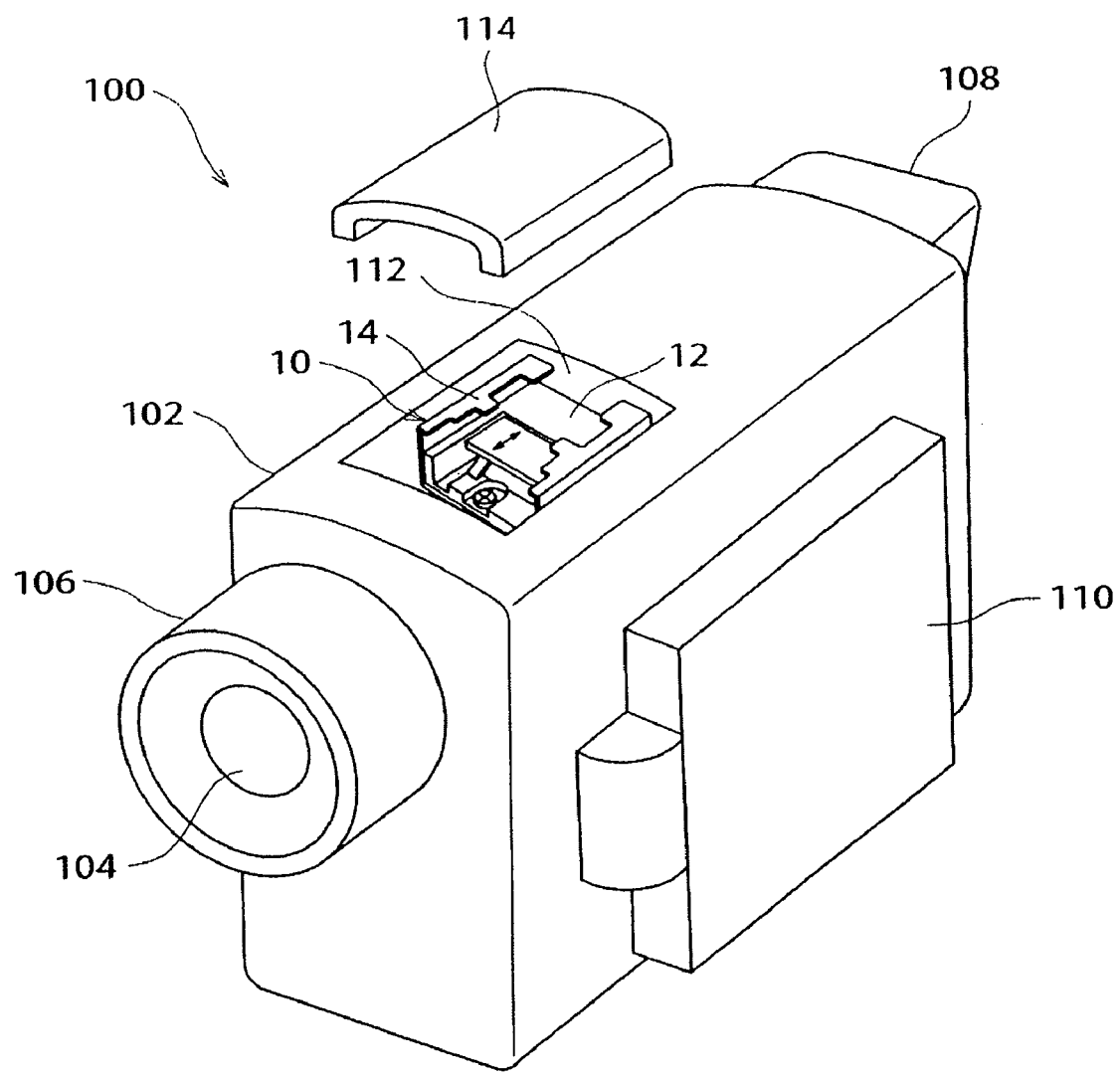
FIG. 1 is a front perspective view of an electronic device of a first embodiment.

FIG. 1 is a front perspective view of an electronic device of the first embodiment.

Figure 2:
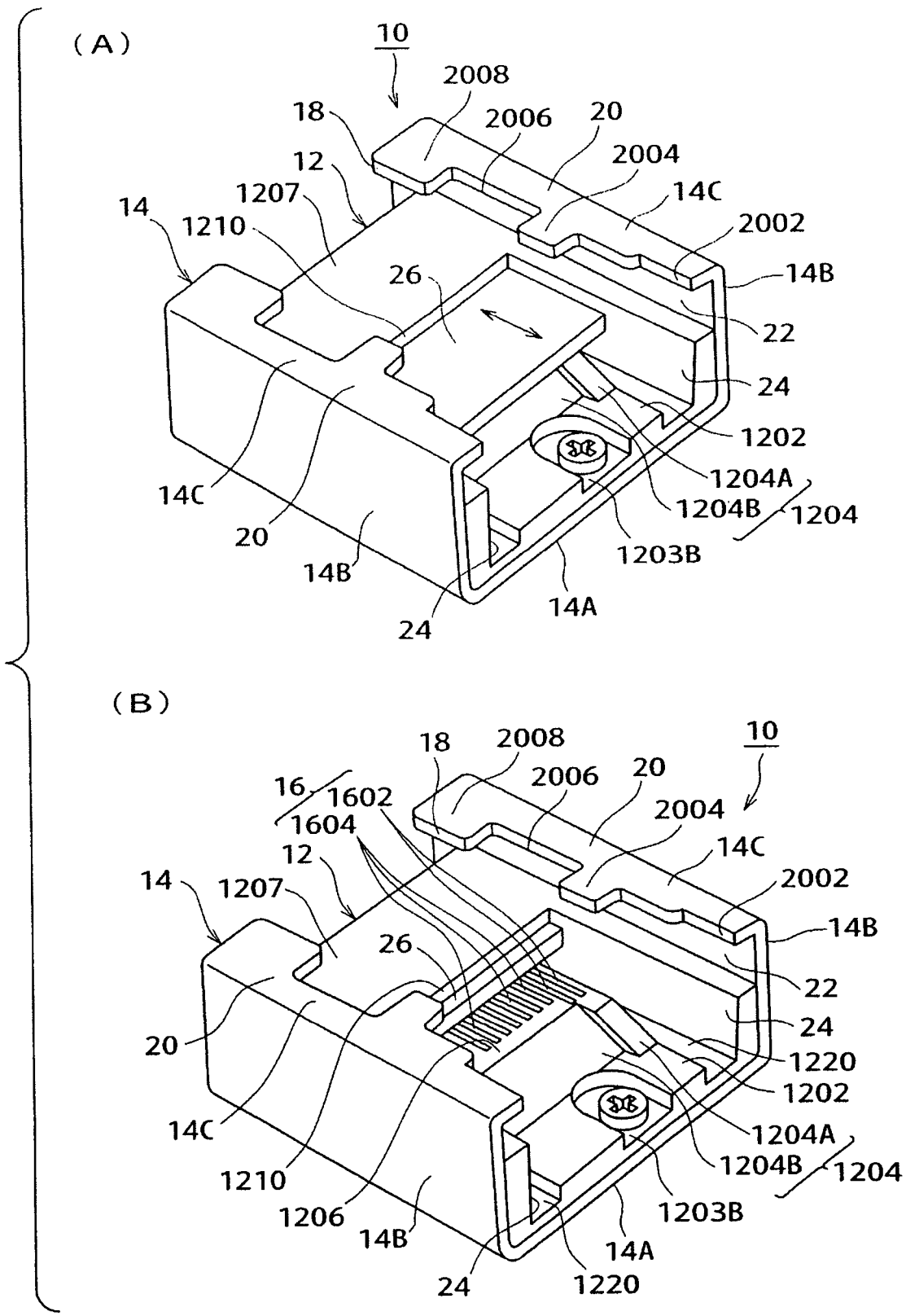
FIG. 2 shows perspective views of a connector on the electronic device.

FIG. 2 shows perspective views of a connector on the electronic device. Part (A) of FIG. 2 shows the connector in a state in which a cover is in a closed position. Part (B) of FIG. 2 shows the connector in a state in which the cover is in an open position.

Part (A) of FIG. 3 is a plan view of the connector on the electronic device. Part (B) of FIG. 3 is a view in the direction of arrow B in part (A). Similarly, part (C) is a view in the direction of arrow C in part (A) and part (D) is a view in the direction of arrow D in part (A).

Figure 4:
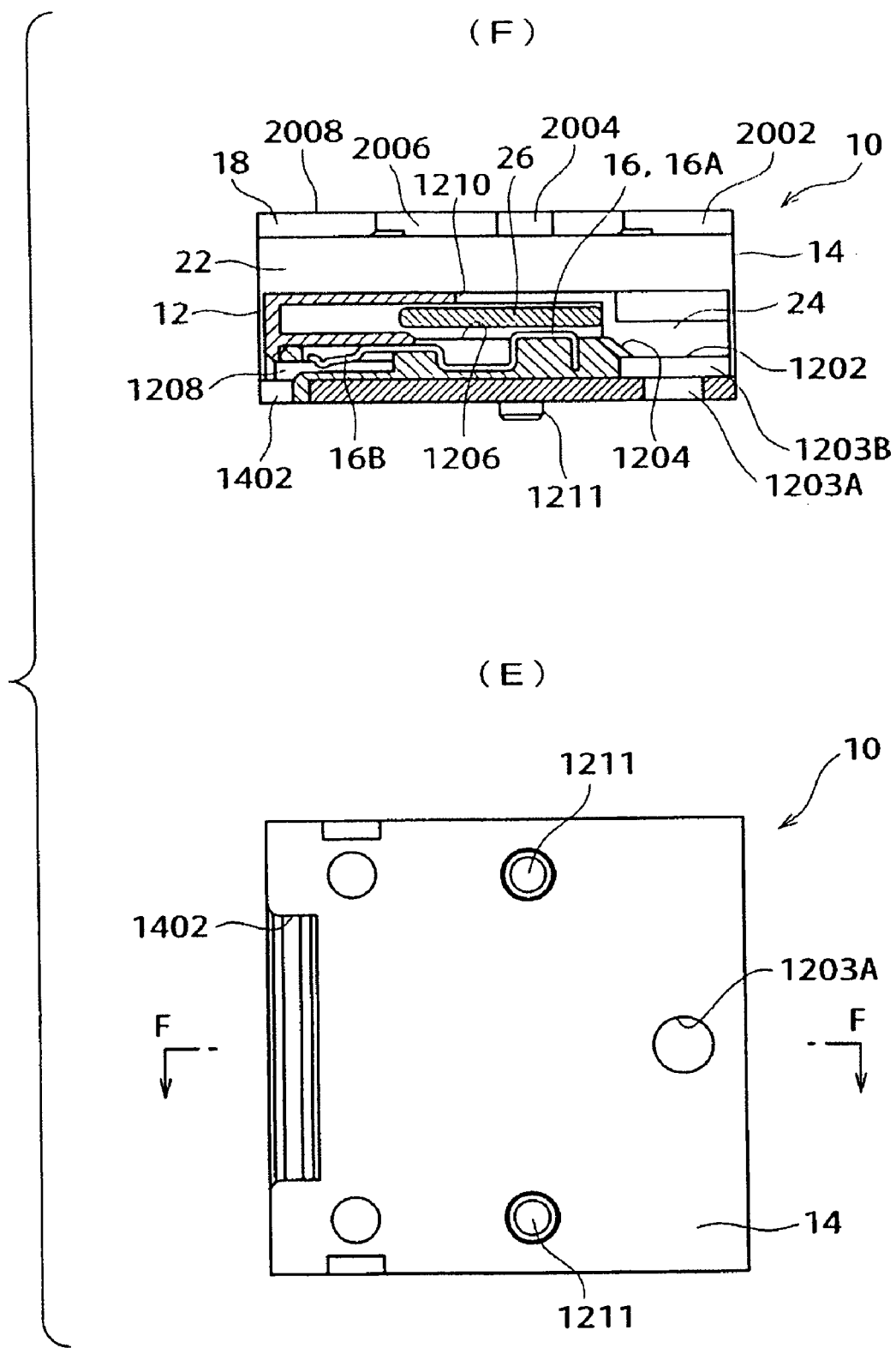
FIG. 4 is a view for explaining the connector on the electronic device.

Part (E) of FIG. 4 is a view in the direction of arrow E in part (D) of FIG. 3. Part (F) of FIG. 4 is a cross-sectional view taken along line F-F in part (E).

Figure 5:
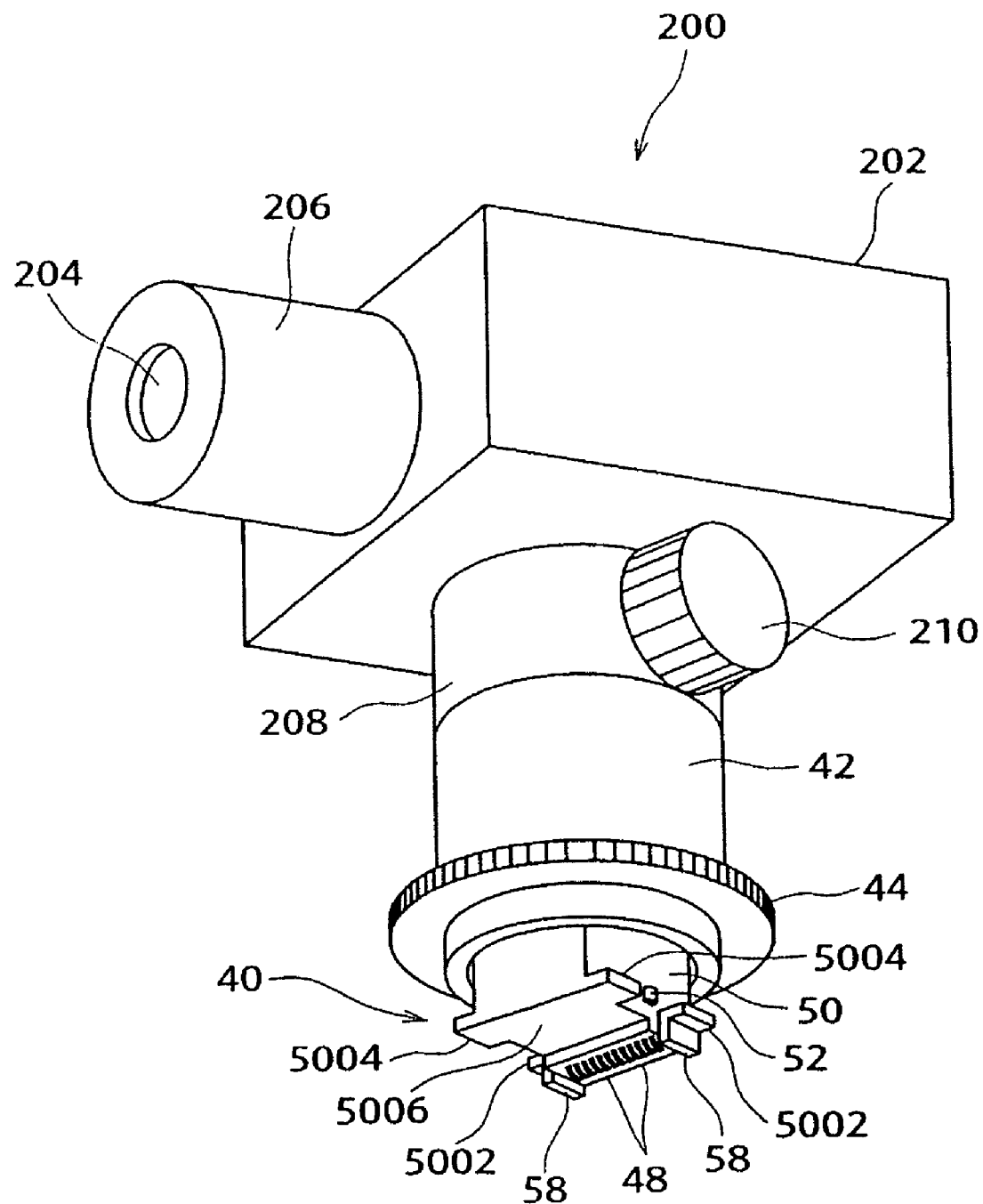
FIG. 5 is a perspective view of an accessory device.
Figure 6:
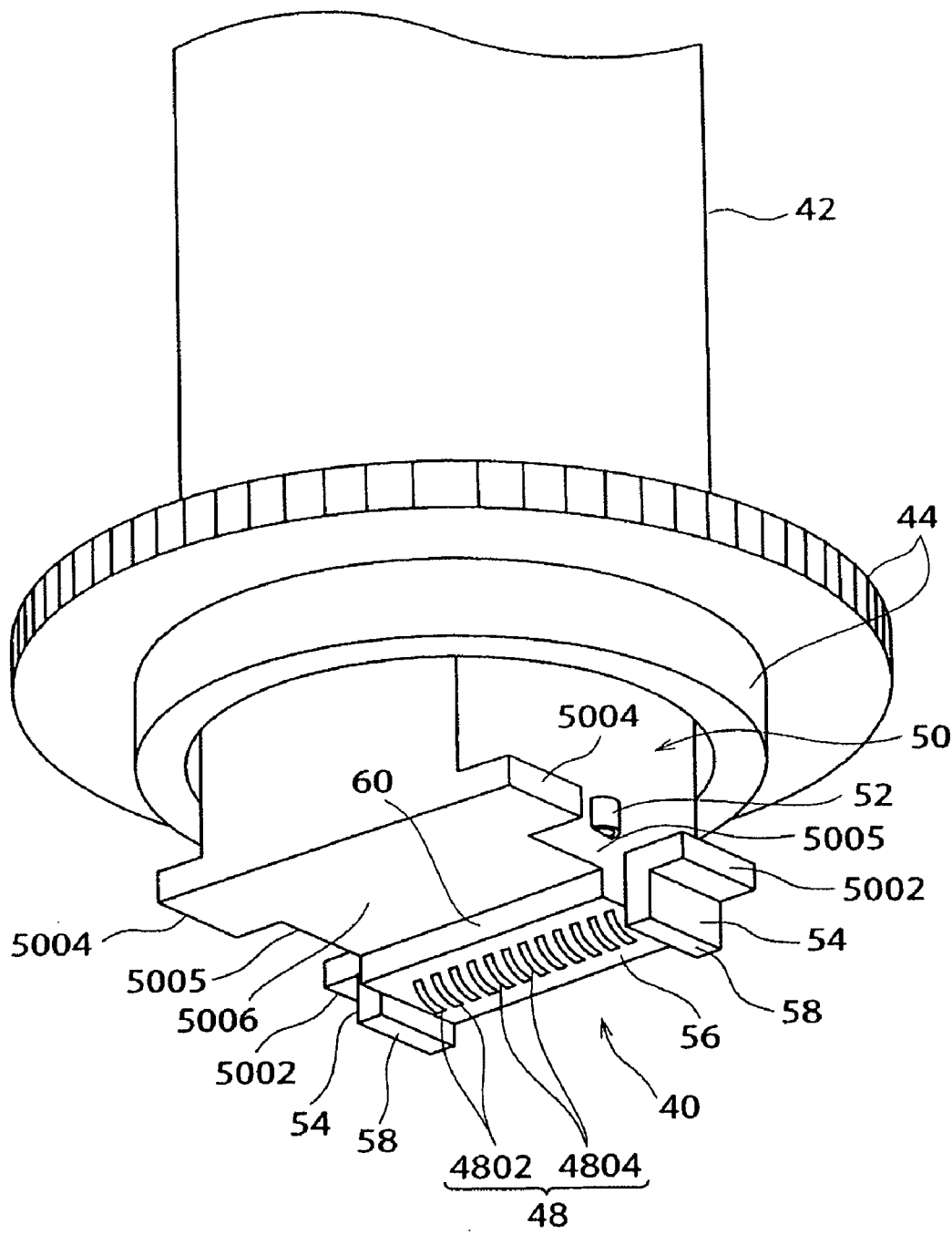
FIG. 6 is a perspective view of a connector on the accessory device.
Figure 7:
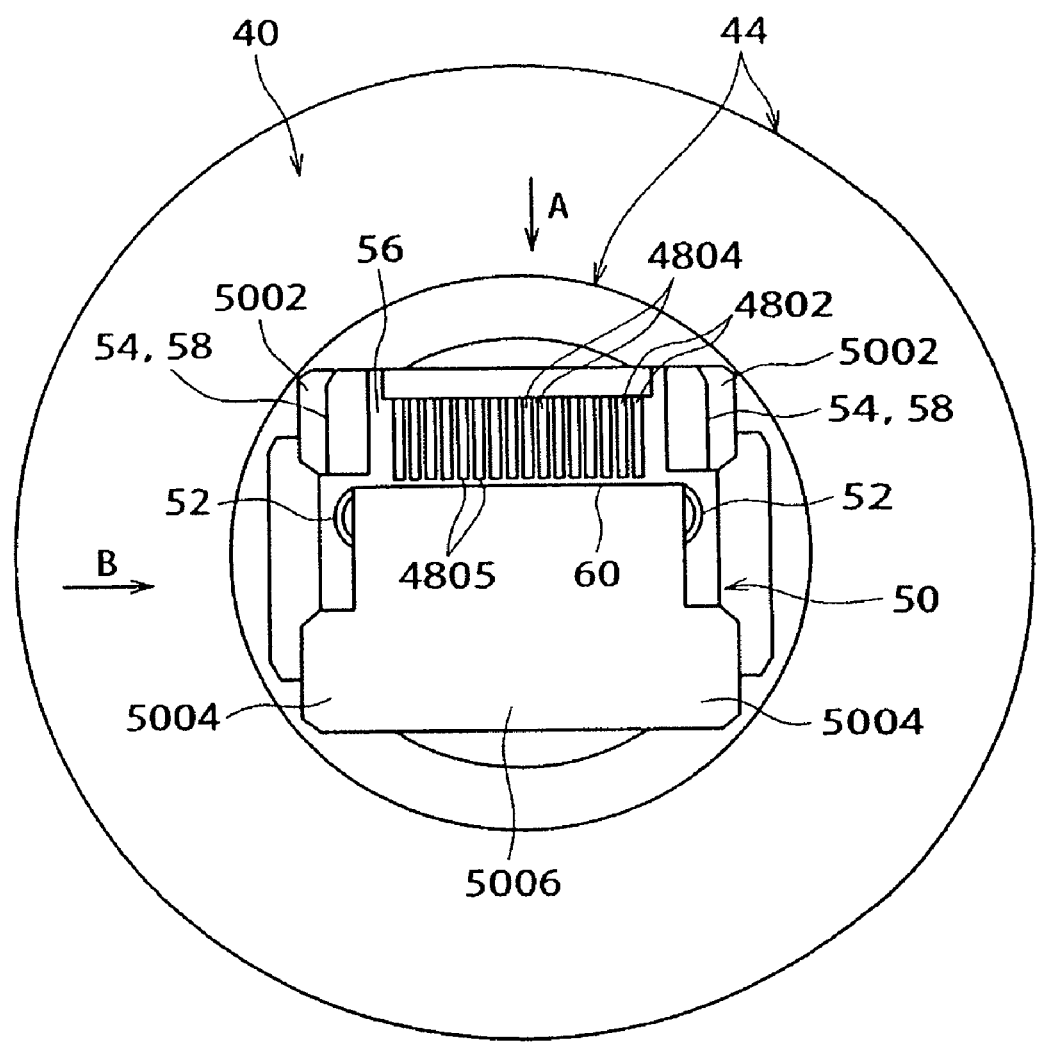
FIG. 7 is a plan view of the connector on the accessory device.
Figure 8:
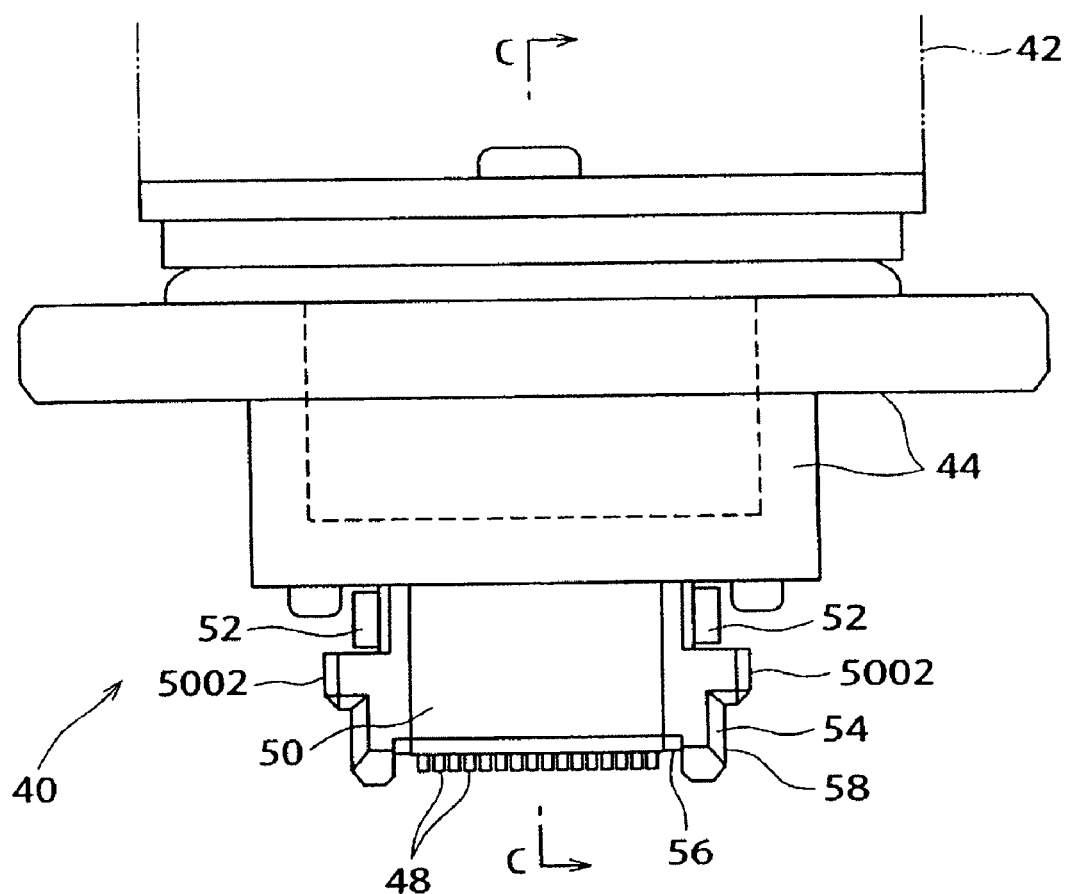
FIG. 8 is a view in the direction of arrow A in FIG. 7.
Figure 9:
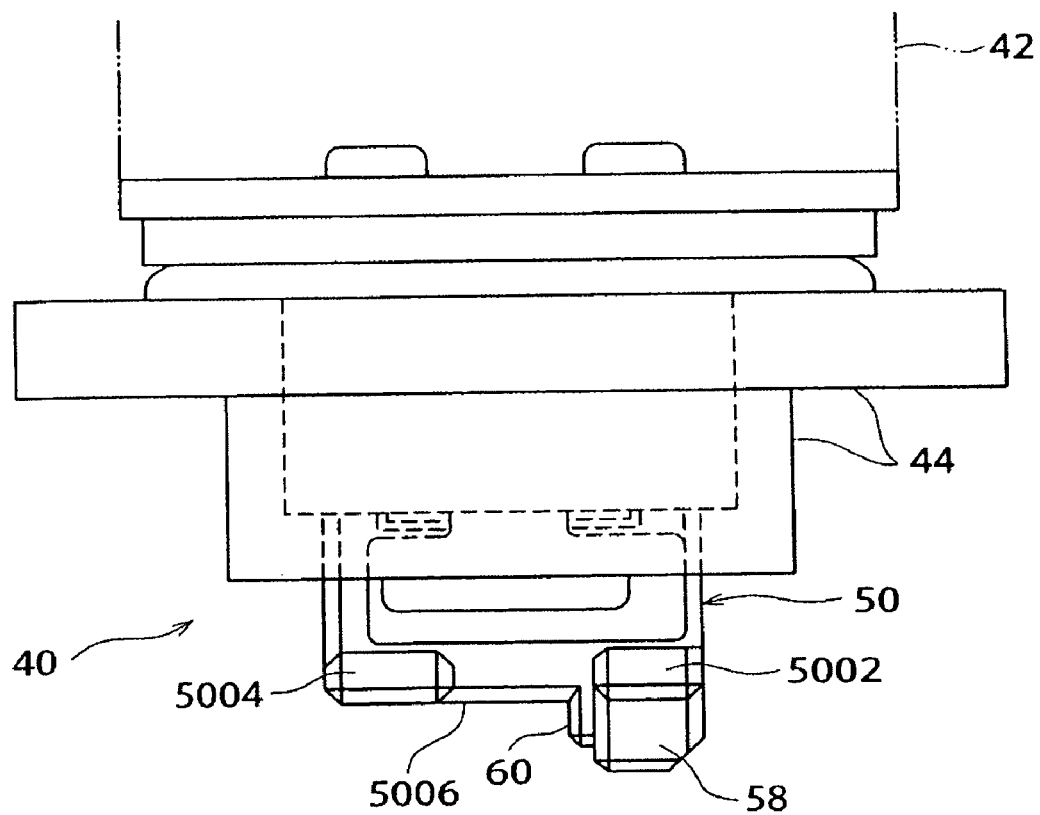
FIG. 9 is a view in the direction of arrow B in FIG. 7.
Figure 10:
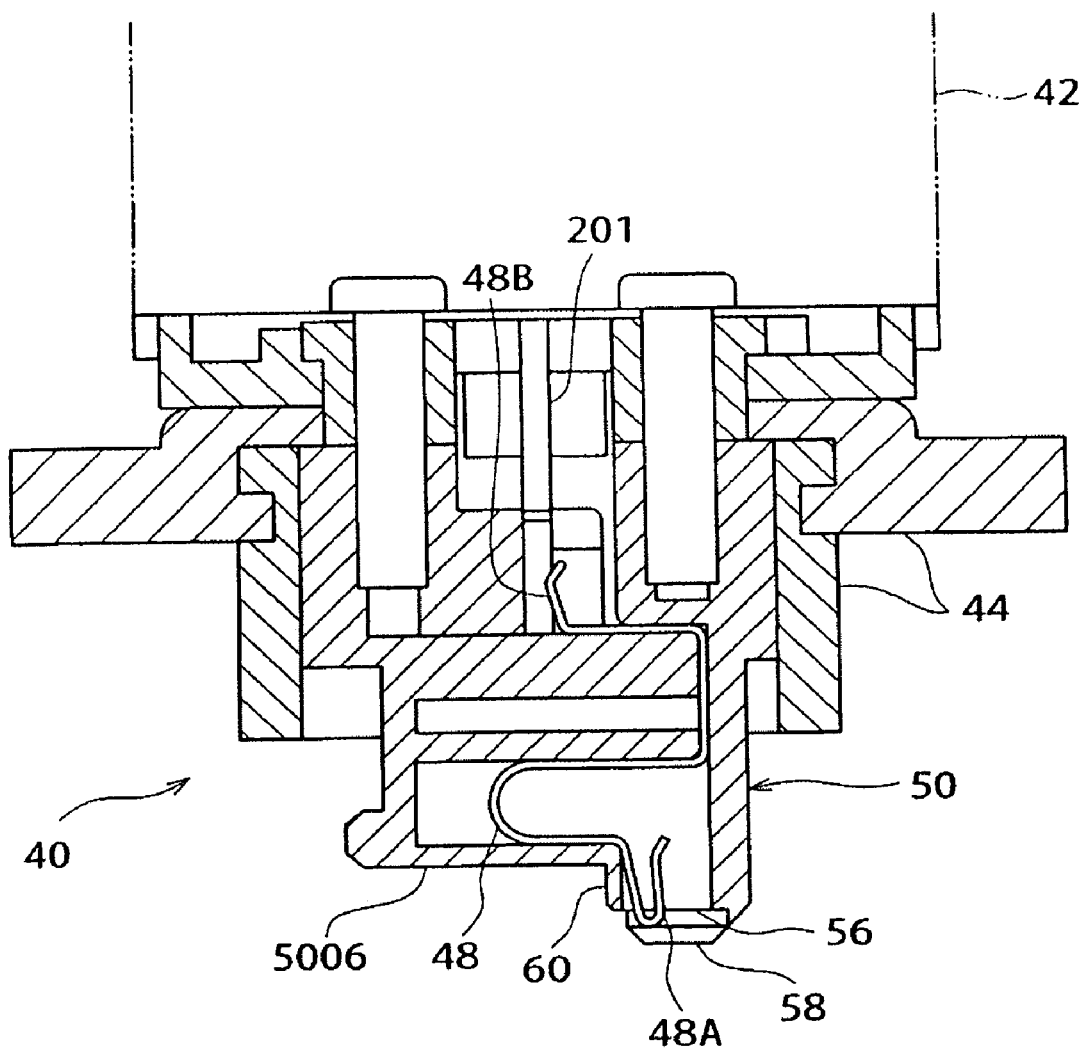
FIG. 10 is a cross-sectional view taken along line C-C in FIG. 8.

FIG. 5 is a perspective view of an accessory device. FIG. 6 is a perspective view of a connector on the accessory device. FIG. 7 is a plan view of the connector on the accessory device. FIG. 8 is a view in the direction of arrow A in FIG. 7. FIG. 9 is a view in the direction of arrow B in FIG. 7. FIG. 10 is a cross-sectional view taken along line C-C in FIG. 8.

Figure 11:
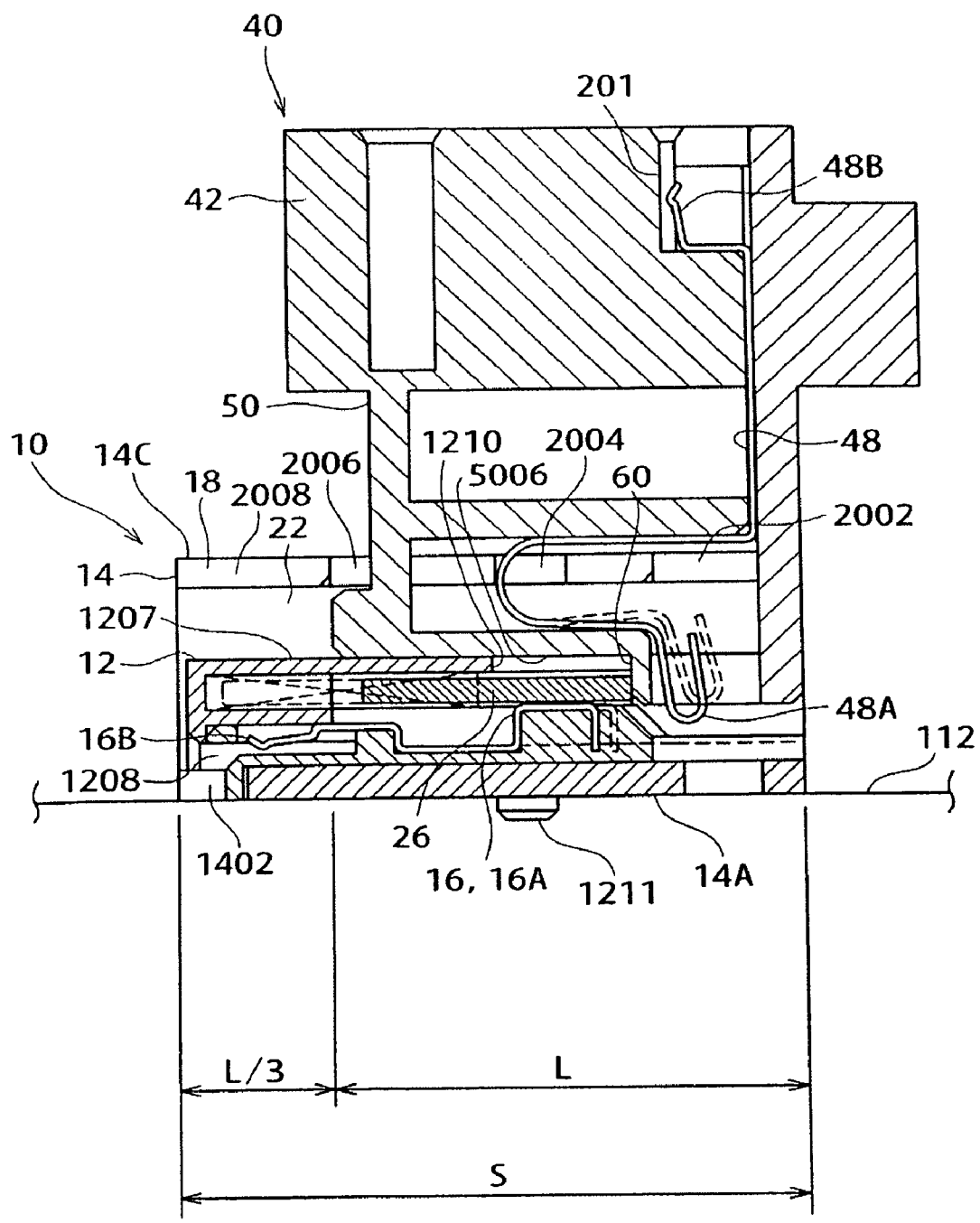
FIG. 11 is a cross-sectional view of the connector on the electronic device and the connector on the accessory device in a state in which the latter is inserted in the former.
Figure 12:
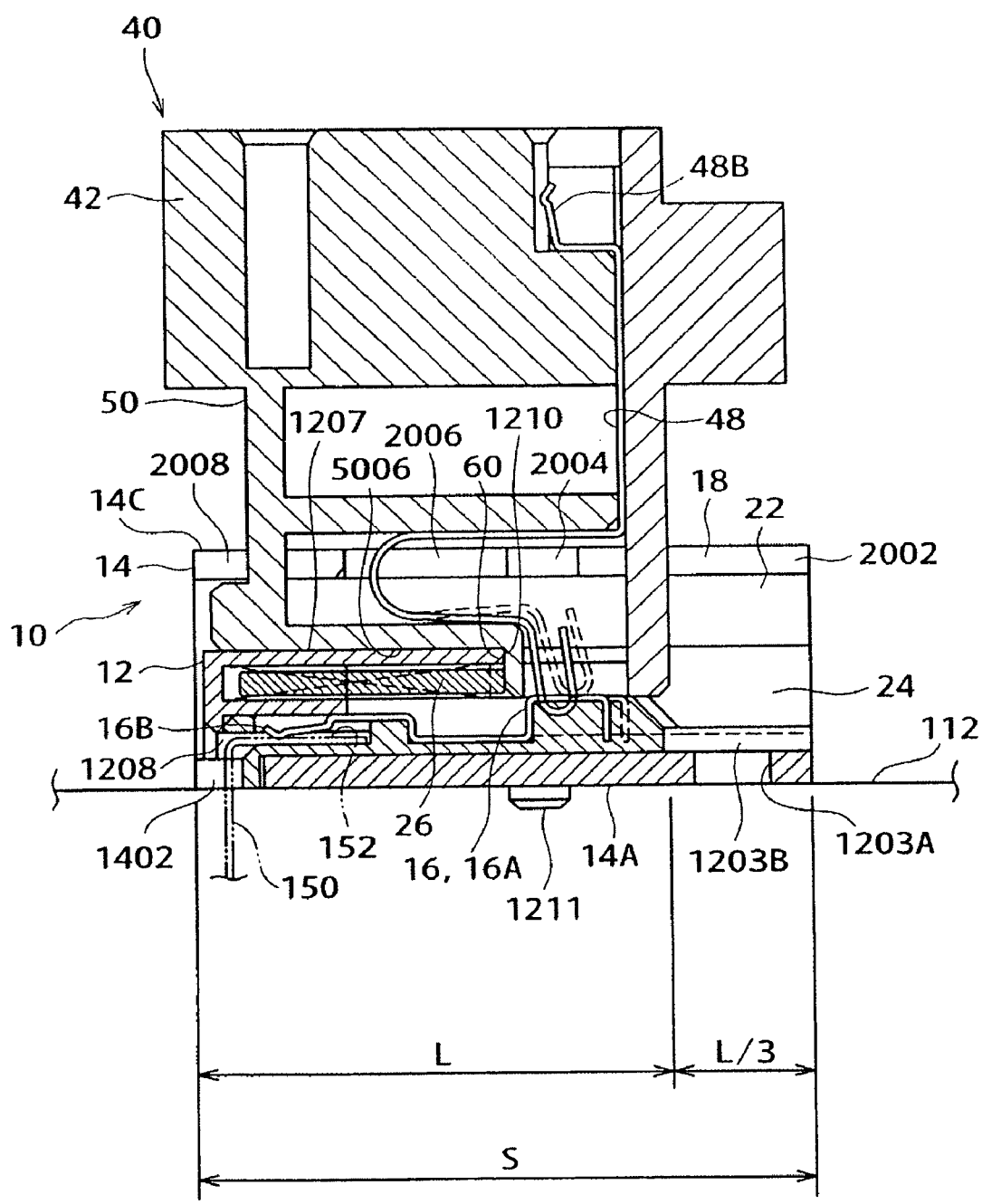
FIG. 12 is a cross-sectional view of the connector on the electronic device and the connector on the accessory device in a state in which the latter is fitted to the former.

FIG. 11 is a cross-sectional view of the connector on the electronic device and the connector on the accessory device in a state in which the latter is inserted in the former. FIG. 12 is a cross-sectional view of the connector on the electronic device and the connector on the accessory device in a state in which the latter is fitted to the former.

First, the electronic device will be described.

In the present application, an electronic device 100 is, as shown in FIG. 1, a video camera provided with a case 102 which, making up an exterior of the video camera, has a flat rectangular parallelepiped shape. In this specification, "left" and "right" are as seen from the front of the electronic device 100. Also, "front" and "rear" are as seen from a subject of shooting (front) toward the image pickup device (rear) along the optical axis of the optical system of the electronic device 100.

A lens barrel 106 facing forward and incorporating a shooting optical system 104 is provided in an upper part of the front of the case 102.

The case 102 accommodates an image pickup device for taking a subject image transmitted though the shooting optical system 104 and a recording and reproducing section for recording the subject image taken by the image pickup device as still-image data or moving-image data and reproducing the recorded data.

An electronic viewfinder 108 for viewing the subject image taken by the image pickup device is provided in an upper part of the rear of the case 102.

A display 110 for displaying the subject image taken by the image pickup device is openably and closably provided on the right-hand side of the case 102.

Operating switches (not shown) such as for starting and stopping shooting and setting switches (not shown) for making various settings are provided in a rear part of the top of the case 102 and on the left-hand side of the case 102.

A recess 112 having a rectangular shape as viewed from above is provided in a front part of the top of the case 102. The recess 112 is provided with a detachable lid 114 used to cover and uncover the recess 112. A connector 10 on the electronic device is installed in the recess 112. When the connector 10 on the electronic device is not used, the lid 114 is attached to the recess 112 to hide the connector 10. When the connector 10 on the electronic device is to be used, the lid 114 is detached from the recess 112 to expose the connector 10.

The electronic device 100 has an accessory mounting section for mounting an accessory device 200 (see FIG. 5). The accessory mounting section is made up of the connector 10 on the electronic device. The accessory device 200 (see FIG. 5) has a connection section which is fitted to the accessory mounting section of the electronic device 100. The connection section is made up of a connector 40 (see FIG. 5) on the accessory device.

The connector 10 on the electronic device will be described in the following.

As shown in parts (A) and (B) of FIG. 2, the connector 10 on the electronic device includes an inner member 12 made of synthetic resin die-formed into a solid part and an outer member 14 made of steel plate shaped by bending. The inner member 12 is fixedly fitted inside the outer member 14.

The connector 10 on the electronic device includes plural contacts 16 for making electrical connections with the accessory device 200, locking plates 20 forming a guide groove 18, and a space 22 formed downwardly under the locking plates 20 and the guide groove 18.

The outer member 14 includes a bottom plate portion 14A, side plate portions 14B extending upwardly from both sides of the bottom plate portion 14A, and upper plate portions 14C bent-formed to hang over from upper edges of the side plate portions 14B such that edges of the upper plate portions 14C face each other. The locking plates 20 that extend in a same plane are formed with the upper plate portions 14C.

On the pair of mutually facing edges of the locking plates 20 forming the guide groove 18, a pair of first concave portions 2002, a pair of first convex portions 2004, a pair of second concave portions 2006, and a pair of second convex portions 2008 are formed being arranged in the order mentioned in the direction in which the guide groove 18 extends, so that each pair of the concave and convex portions formed along the pair of edges face each other across the guide groove 18. The guide groove is open at both ends in the direction in which it extends. The edge of each of the first convex portions 2004 and the second convex portions 2008 extends linearly in the direction in which the guide groove 18 extends.

The guide groove 18 has a width in the direction in which the pair of the locking plates 20 face each other and a length which is perpendicular to the width. The direction in which the guide groove 18 extends is the direction of its length.

As shown in part (A) of FIG. 3, each of the first convex portions 2004 includes a convex part 2004A and a convex part 2004B with the latter protruding more than the former and the two convex parts are arranged along the direction in which the guide groove 18 extends. Each of the second convex portions 2008 is formed such that its amount of protrusion is identical with that of the convex parts 2004B.

The space 22 is where a connector 40 (see FIG. 5) on the accessory device is inserted and then moved in a direction perpendicular to the direction of insertion. Its location is under the locking plates 20, between the side plate portions 14B, and above the inner member 12.

For convenience in describing embodiments of the present invention, the direction in which the connector 40 on the accessory device is inserted in the space 22 via the guide groove 18 when fitting the connector 40 on the accessory device to the connector 10 on the electronic device will be referred to as the direction of insertion. Similarly, the direction in which the connector 40 on the accessory device having been inserted in the space 22 is moved inside the space 22, that is, the direction in which the guide groove 18 extends will be referred to as the direction of fitting, the direction opposite to the direction of insertion will be referred to as the direction of removal, and the direction opposite to the direction of fitting will be referred to as the direction of withdrawal, respectively.

A pair of guide surfaces 24 making up lower guide surfaces of the connector 10 and extending in the direction of fitting while facing each other in the width direction of the guide groove 18 are provided in portions, which form bottom portions of the space 22, of the connector 10 on the electronic device, that is, portions below the first concave portions 2002 and the first convex portions 2004 of the inner member 12. The pair of the guide surfaces 24 of the connector 10 on the electronic device serve to determine the position of the connector 40 on the accessory device in a direction perpendicular to the direction in which the guide groove 18 extends, that is, the width direction of the guide groove 18.

In other words, as shown in FIGS. 2 and 3, the guide surfaces 24 of the connector 10 on the electronic device are provided below the first concave portions 2002 and the first convex portions 2004 of the pair of the locking plates 20, that is, on both sides, as viewed in the length direction of the guide groove 18, of the space 22. The guide surfaces 24 of the connector 10 on the electronic device determine the position, along the width of the guide groove 18, of the connector 40 on the accessory device and guide, along the length of the guide groove 18, the connector 40 on the accessory device.

The plural contacts 16 for making electrical connections of the connector 10 on the electronic device are located in a portion of the inner member 12, the portion being at the bottom of the space 22 and between the pair of the guide surfaces 24 of the connector 10 on the electronic device.

To be more detailed, a bottom surface 1202, an inclined surface 1204 being inclined upward from an edge of the bottom surface 1202, and a flat contact mounting surface 1206 extending from an edge of the inclined surface 1204 in parallel with the bottom surface 1202 are provided in a portion of the inner member 12, the portion of the inner member 12 forming a bottom portion of the space 22 and the bottom portion of the space 22 being between the pair of the guide surfaces 24 of the connector 10 on the electronic device. The bottom surface 1202, the inclined surface 1204, and the contact mounting surface 1206 are arranged in the order mentioned along the direction of fitting.

A flat intermediate surface 1207 extending in parallel with the bottom surface 1202 and making up an upper guide surface is provided in a portion of the inner member 12, the portion of the inner member 12 being below the second concave portions 2006 and the second convex portions 2008. In other words, the intermediate surface 1207 forms a bottom portion of the space 22, the bottom portion of the space 22 being below a portion of the guide groove 18 and the portion of the guide groove 18 being between a pair of the second concave portions 2006 and a pair of the second convex portions 2008 of a pair of the locking plates 20. The intermediate surface 1207 extends in a portion of the inner member 12, the portion being below the first concave portions 2002 and the first convex portions 2004 and extending along the pair of the side plate portions 14B.

In the present embodiment, when the connector 40 on the accessory device is inserted in the space 22, an end surface 5006 (see FIG. 6) of the connector 40 on the accessory device abuts on the intermediate surface 1207 thereby causing the depth of insertion of the connector 40 on the accessory device to be limited in the space 22 in the direction of insertion or, in other words, determining the position in the direction of insertion of the connector 40 on the accessory device.

As shown in parts (A) and (B) of FIG. 3, the contact mounting surface 1206 forms, at a lower level than the intermediate surface 1207, a bottom portion of the space 22, the bottom portion being below a portion of the guide groove 18 and the portion of the guide groove 18 being between the first convex portions 2004 of a pair of the locking plates 20.

The plural contacts 16 of the connector 10 on the electronic device are provided in a portion, which is separated in the direction of fitting from a border between the inclined surface 1204 and the contact mounting surface 1206, of the contact mounting surface 1206. They are linearly arranged to be apart from each other along the width of the guide groove 18. In other words, as shown in part (A) of FIG. 3, the plural contacts 16 are provided in a portion toward the intermediate surface 1207 of the contact mounting surface 1206.

As shown in part (B) of FIG. 2, a recess 1220 extending along the length of the guide groove 18 is provided on each side, as viewed in the length direction of the guide groove 18, of the contact mounting surface 1206.

The plural contacts 16 of the connector 10 on the electronic device will be described in more detail in the following. As shown in part (F) of FIG. 4, each of the contacts 16 is made of an elongated metallic strip formed by bending. One end 16A of each of the contacts 16 is exposed, through an opening, above the contact mounting surface 1206. As shown in part (A) of FIG. 3, the one end 16A, exposed above the contact mounting surface 1206, of each of the contacts 16 linearly extends in its longitudinal direction which coincides with the direction of fitting.

The one ends 16A of the plural contacts 16 of the connector 10 on the electronic device are, as shown in part (A) of FIG. 3, arranged such that end portions, as viewed in the direction of fitting, of the one ends 16A are arranged linearly in the width direction of the guide groove 18. The one ends 16A of ground contacts 1602, among the plural contacts 16, to be connected to ground potential are formed to be larger in the longitudinal direction than the one ends 16A of other signal contacts 1604. End portions, as viewed in the direction of withdrawal, of the ground contacts 1602 are protruding more than corresponding end portions of the other signal contacts 1604. In other words, the ground contacts 1602 among the plural contacts 16 extend longer in the direction of from the first convex portions 2004 toward the first concave portions 2002 along the length of the guide groove 18, than the other contacts among the contacts 16. In part (A) of FIG. 3, the reference numeral 1605 denotes power supply contacts.

The layout of the contacts 1602, 1604, and 1605 as described above is, when connecting the connector 40 on the accessory device to the connector 10 on the electronic device, to cause ground contacts 4802, which are among contacts 48 of the connector 40 on the accessory device as shown in FIG. 6 and which are to be connected to ground potential, to come in contact with the ground contacts 1602 of the connector 10 on the electronic device before other signal contacts 4804. In this arrangement, the reference potentials of the accessory device 200 and the electronic device 100 are set to ground potential at the beginning of operation. As a result, effects of static noise are reduced and performance of both the accessory device 200 and the electronic device 100 is stabilized.

As shown in part (F) of FIG. 4, the portion other than the one end 16A of each of the contacts 16 is installed inside the inner member 12. Other ends 16B of the contacts 16 are each guided into a hole 1208 opened in an end portion as viewed in the direction of fitting of the inner member 12.

As shown in part (C) of FIG. 3 and parts (E) and (F) of FIG. 4, an open portion 1402 leading to the hole 1208 is provided at the bottom of the inner member 12 and also at the bottom plate portion 14A of the outer member 14. As shown in FIG. 12, a connecting end 152 of a flexible substrate 150 provided in the electronic device 100 is inserted into the hole 1208 via the open portion 1402 and electrically connected, in the hole 1208, to the other end 16B of each of the contacts 16. At this time, the connecting end 152 is held, due to elasticity of the other end 16B of each of the contacts 16, between the other end 16B of each of the contacts 16 and a wall having the hole 1208.

In this arrangement, electrical signals to drive the accessory device 200 are provided from internal electrical circuits of the electronic device 100 to each of the contacts 16, or electrical signals are provided from the accessory device 200 to internal circuits of the electronic device 100 via each of the contacts 16.

As shown in FIG. 12, when the bottom plate portion 14A of the outer member 14 is fixed to the bottom of the recess 112 of the electronic device 100, the open portion 1402 of the outer member 14 allows the flexible substrate 150 to be bent therein and led into the electronic device 100.

In the above arrangement, the flexible substrate 150 is positioned, as viewed from above, inside a contour of the outer member 14, that is, inside a contour of the connector 10 on the electronic device, so that it is unnecessary to secure a space where to arrange the flexible substrate 150 outside the connector 10 on the electronic device. This is an advantage in reducing the size of a space required to install the connector 10 on the electronic device.

In part (F) of FIG. 4, the reference numeral 1211 denotes positioning bosses protruding from the bottom of the outer member 14. The position of the connector 40 on the accessory device is determined by engaging the bosses 1211 with holes provided in the bottom of the recess 112 (see FIG. 1) of the electronic device 100.

In the present embodiment, as shown in part (B) of FIG. 2, the inclined surface 1204 includes an inclined surface portion 1204A corresponding to the ground contacts 1602 to be connected to ground potential and an inclined surface portion 1204B corresponding to the other contacts 1604 and 1605. The portion 1204A and the portion 1204B extend in different planes. This is because the portion 1204B is formed being shifted, relative to the portion 1204A, in the direction of fitting for separation from a recess 1203B provided in a portion near the portion 1204B of the bottom surface 1202. In the recess 1203B, there is a hole 1203A (see part (A) of FIG. 3) for inserting a bolt used to fix the connector 10 to the bottom of the recess 100 of the electronic device 100. The recess 1203B is to accommodate the head of the bolt.

The inclined surface 1204 has a function to smoothly guide the contacts 48 of the connector 40 on the accessory device.

The contacts 16 provided on the contact mounting surface 1206 are separated, in the direction of fitting, from the border between the inclined surface 1204 and the contact mounting surface 1206. This is to allow, when the connector 40 on the accessory device is inserted in the connector 10 on the electronic device and then moved in the direction of fitting, the contacts 48 of the connector 40 on the accessory device to slide over the portion, separating the contacts 16 from the border, of the contact mounting surface 1206 so as to allow the contacts 48 of the connector 40 on the accessory device to come into contact with the contacts 16 in a stable state. Thus, the portion, that extends between the border between the inclined surface 1204 and the contact mounting surface 1206 and the end portion as viewed in the direction of withdrawal of each of the contacts 16, of the contact mounting surface 1206 functions as a sliding surface for the contacts 48 of the connector 40 on the accessory device.

A cover 26 for covering the contacts 16 of the connector 10 on the electronic device is provided to be movable in the direction of fitting in a portion of the inner member 12 that forms the bottom of the space 22, the portion of the inner member 12 being between the pair of the guide surfaces 24 and below the intermediate surface 1207.

There are springs 2602 (see part (A) of FIG. 3) provided to energize the cover 26 toward a closed position (see part (A) of FIG. 2 and FIG. 11) where the cover covers the contacts 16 of the connector 10 on the electronic device. The cover 26, when being moved in the direction of fitting, abuts against an upright surface 60 (see FIG. 6) which makes up a portion of an insert section 50 of the connector 40 on the accessory device thereby allowing the insert section 50 to move the cover 26 into an open position (see part (B) of FIG. 2 and FIG. 12) causing the contacts 16 to be exposed.

An abutting surface 1210 extending in the width direction of the guide groove 18 and forming a positioning surface is provided at the edge as viewed in the direction of withdrawal of the intermediate surface 1207.

In the present embodiment, when the connector 40 on the accessory device is inserted in the space 22, the upright surface 60 (see FIG. 6) of the connector 40 on the accessory device abuts against the abutting surface 1210, so that, in the space 22, the depth of insertion in the direction of fitting of the connector 40 on the accessory device is limited by the abutting surface 1210. In other words, the position in the direction of fitting of the connector 40 on the accessory device is determined by the abutting surface 1210. The abutting surface 1210 faces in the direction of from the first convex portions 2004 toward the first concave portions 2002 along the length of the guide groove 18.

Next, the accessory device 200 will be described.

As shown in FIG. 5, the accessory device 200 in the present embodiment is a small camera having a small outer shape as compared with the electronic device 100. The small camera operates, for example, to shoot, at the same time as the electronic device 100 does shooting, a subject existing in a direction different from the direction in which the electronic device 100 is shooting, or to shoot a subject, which may be the same as or different from the subject being shot by the electronic device 100, at a magnification different from that of the electronic device 100.

The accessory device 200 has a case 202 which, having a rectangular parallelepiped shape, makes up an exterior of the accessory device 200. A lens barrel 206 facing forward and incorporating a shooting optical system 204 is provided in an upper part of the front of the case 202.

The case 202 accommodates an image pickup device which takes a subject image transmitted through the shooting optical system 204 and a signal processing section which processes an image signal generated by the image pickup device and outputs the processed signal to a connector 40, being described later, on the accessory device.

A connection section 208 having a cylindrical shape protruding from the undersurface of the case 202 is provided integrally with the case 202. The connector 40 on the accessory device is connected, to be rotatable about a central axis of the connection section 208, to an underside of the connection section 208. In FIG. 5, the reference numeral 210 denotes a fixing screw which fixes the connector 40 to the connection section 208 at a rotation angle.

In the present embodiment, as shown in FIG. 6, the connector 40 on the accessory device has a cylindrical shaft member 42 connected to the underside of the connection section 208. At a lower end of the shaft member 42, an insert section 50 made up of a rectangular-column shaft member whose cross-section is smaller than that of the shaft member 42 is provided. Of two directions perpendicular to the central axis of the insert section 50, one is the width direction of the insert section 50 and the other is the front-rear direction (the direction of fitting and the direction of withdrawal) of the insert section 50.

The dimension along the width direction of an end portion of the insert section 50 is slightly smaller than the distance between edges of a pair of the first convex portions 2004 and also between edges of a pair of the second convex portions 2008, that is, the distance between each pair of innermost edges of the guide groove 18 so as to allow the end portion of the insert section 50 to be smoothly put into and out from the guide groove 18.

A first locking part 5002 and a second locking part 5004 are provided on each side of the end portion of the insert section 50. They are protruding parts formed in a same plane and are, on the each side, spaced from each other in the front-rear direction. The first locking parts 5002 can be inserted in the space 22 via the first concave portions 2002 of the connector 10 on the electronic device and can then be moved therein in the direction of fitting. The second locking parts 5004 can be inserted in the space 22 via the second concave portions 2006 of the connector 10 on the electronic device and can then be moved in the direction of fitting. On each of the sides having the first locking parts 5002 and the second locking parts 5004, the portion excluding the first locking part 5002 and the second locking part 5004 makes up a concave portion 5005.

In the present embodiment, the length in the direction of fitting of each of the first locking parts 5002 and the second locking parts 5004 is approximately one third of the dimension in the direction of fitting of the insert section 50.

As shown in FIGS. 6 to 8, a spring strip 52 is crookedly protruding in a portion between the first locking part 5002 and the second locking part 5004 on each side of the end portion of the insert section 50. The spring strip 52 is made of a thin plate of spring steel and is fit in the insert section 50.

On each side of the end portion of the insert section 50, compared with the first locking part 5002 and the second locking part 5004 provided there, the spring strip 52 is located closer to a base portion of the insert section 50. In other words, on each side of the end portion of the insert section 50, the spring strip 52 is located closer to the case 202 than where the concave portion 5005 is provided. Each of the spring strips 52 can be pushed into the inside of the side where it is installed. Where it is installed, it is energized outwardly, that is, in the direction in which it protrudes.

In a state in which the first locking parts 5002 and the second locking parts 5004 are positioned in the space 22 having been entered via the first concave portions 2002 and the second concave portions 2006, respectively, the spring strips 52 stay inside the first concave portions 2002. When, in the space 22, the first locking parts 5002 and the second locking parts 5004 move toward under the first convex portions 2004 and the second convex portions 2008, respectively, the spring strips 52 come into elastic contact with edges of the first convex portions 2004. In a state in which the first locking parts 5002 and the second locking parts 5004 have moved to under the first convex portions 2004 and the second convex portions 2008, respectively, the spring strips 52 stay inside the second concave portions 2006. In this arrangement, the spring strips 52 allow a user to feel clicks when mounting the accessory device 200. In the present embodiment, in a state in which the first locking parts 5002 and the second locking parts 5004 having been moved in the direction of fitting in the space 22 are positioned under the first convex portions 2004 and the second convex portions 2008, respectively, the spring strip 52 on each side stays in elastic contact with a portion, which is toward the first convex portion 2004, of the edge of the second concave portion 2006 on each side, causing the accessory device 200 to be tentatively held there.

The end surface 5006 making up the upper guide surface is provided at an end of the insert section 50. When the insert section 50 is inserted in the space 22, the end surface 5006 abuts on the intermediate surface 1207 of the connector 10 on the electronic device, thereby limiting the depth of insertion of the connector 40 on the accessory device into the space 22, or in other words, thereby determining the position of the connector 40 in the direction of insertion.

As shown in FIG. 6, the end surface 5006 is located, as viewed in the direction along the length of the insert section 50 and away from the case 202, at an end of an end portion on each side of the insert section 50, the end portion on each side including the concave portion 5005 and the second locking part 5004. The end surface 5006 extends in a plane perpendicular to the length direction of the insert section 50 and determines the position of the insert section 50 in the length direction. It also guides the insert section 50 in the front-rear direction with respect to the connector 10 on the electronic device.

In the present embodiment, a pair of mutually facing guide walls 58 each protruding, in the longitudinal direction of the insert section 50 (the direction of insertion), from a base end of the first locking part 5002 on each side are provided. A surface on an outer side of each of the guide walls 58 forms an accessory guide surface 52 making up a lower guide surface, a pair of which are slidable along a pair of the guide surfaces 24 of the connector 10 on the electronic device. The accessory guide surfaces 52 determine the position, in the width direction of the guide groove 18, in the space 22 of the connector 40 on the accessory device by coming in contact with the guide surfaces 24 of the connector 10 on the electronic device.

Also in the present embodiment, should the insert section 50 of the connector 40 on the accessory device be reverse-oriented along the direction of fitting when an attempt is made to insert the insert section 50 in the space 22 in the connector 10 on the electronic device, a pair of the guide walls 58 of the connector 40 on the accessory device abut on the intermediate surface 1207 of the connector 10 on the electronic device thereby preventing the insert section 50 from being inserted in the space 22.

A flat contact mounting surface 56 which is parallel with the end surface 5006 is provided in an end portion of the insert section 50, the end portion being between base portions of a pair of the guide walls 58. The contact mounting surface 56 is located forward of the end surface 5006. An upright surface 60 making up a positioning surface perpendicular to both the contact mounting surface 56 and the end surface 5006 is formed between the contact mounting surface 56 and the end surface 5006.

Thus, as shown in FIG. 6, the contact mounting surface 56 is provided in a portion of the insert section 50, the portion being forward of where the first locking parts 5002 are formed. The contact mounting surface 56 is in parallel with the end surface 5006 while being located more outwardly than the end surface 5006 as viewed in the length direction of the insert section 50.

Also as shown in FIG. 6, the accessory guide surfaces 52 are located on both sides of the contact mounting surface 56 as viewed in the length direction.

The upright surface 60 faces in the direction of from the contact mounting surface 56 toward the end surface 5006 along the front-rear direction.

The plural contacts 48 of the connector 40 on the accessory device are provided on the contact mounting surface 56. They are arranged linearly being apart from each other between a pair of the guide walls.

The upright surface 60 is arranged such that, when the insert section 50 is inserted in the space 22 of the connector 10 on the electronic device and is then moved in the direction of fitting, it abuts against an edge of the cover 26.

As being described later, the upright surface 60 determines the position of the insert section 50 in the direction of fitting by abutting against the abutting surface 1210 of the connector 10 on the electronic device.

In the arrangement being described, when the insert section 50 is inserted in the space 22 of the connector 10 on the electronic device and is then moved in the space 22 in the direction of fitting, the first locking parts 5002 and the second locking parts 5004 come under the first convex portions 2004 and the second convex portions 2008, respectively, causing the plural contacts 48 of the connector 40 on the accessory device and the plural contacts 16 of the connector 10 on the electronic device to come into contact.

The plural contacts 48 of the connector 40 on the accessory device will be described in detail in the following. As shown in FIG. 10, each of the contacts 48 is made of an elongated metallic strip formed by bending. One end 48A of each of the contacts 48 protrudes downward from the contact mounting surface 56 (in the direction in which the insert section 50 extends, that is, in the direction of insertion). In the present embodiment, the guide walls 58 protrude from both sides, as seen in the length direction of the guide groove 18, of the contact mounting surface 56. The one end 48A of each of the plural contacts 48 is located closer to the base end of the insert section 50 than the end of the guide wall 58 on each side. To be more concrete, each of the contacts 48 is structured to be elastically deformable, so that, the one end 48A of each of the contacts 48 protruding downward from the contact mounting surface 56 is put in the inside of the contact mounting surface 56 when pushed upward.

The contacts 48 includes ground contacts 4802 to be connected to ground potential and other signal contacts 4804. The ground contacts 4802 are connected to the ground contacts 1602 of the connector 10 on the electronic device. The other signal contacts 4804 are connected to the other signal contacts 1604 of the connector 10 on the electronic device. In FIG. 7, the reference numeral 4805 denotes power supply contacts. The power supply contacts 4805 are connected to the power supply contacts 1605 of the connector 10 on the electronic device.

As shown in FIG. 10, the portion excluding the one end 48A of each of the contacts 48 is installed inside the insert section 50. The other end 48B of each of the contacts 48 is electrically connected to a wiring member 201 provided in the accessory device 200.

In this arrangement, electrical signals to drive the accessory device 200 are supplied to internal electrical circuits of the accessory device 200 via the contacts 48 and the wiring member 201, or electrical signals are supplied from the internal electrical circuits of the accessory device 200 to the contacts 48 via the wiring member 201.

A male thread (not shown) is formed around a lower periphery of the shaft material 42, that is, in the base portion of the insert section 50 and a clamp ring 44 is screwed to the male thread.

In a state in which the first locking parts 5002 and the second locking parts 5004 are positioned in the space 22 having been inserted via the first concave portions 2002 and the second concave portions 2006, respectively, the clamp ring 44 is positioned above the locking plates 20. In a state in which the first locking parts 5002 and the second locking parts 5004 having been moved in the direction of fitting in the space 22 are positioned under the first convex portions 2004 and the second convex portions 2008, respectively, rotating the clamp ring 44 enables the clamp ring 44 to clamp the first convex portions 2004 and the second convex portions 2008 in cooperation with the first locking parts 5002 and the second locking parts 5004.

In the present embodiment, therefore, the first locking parts 5002, the second locking parts 5004, the first convex portions 2004, the second convex portions 2008, and the clamp ring 44 make up a fixing means for clamping and fixing the connector 40 on the accessory device to the connector 10 on the electronic device.

Next, how to use the connector 10 on the electronic device and the connector 40 on the accessory device will be described.

To mount the accessory device 200 on the electronic device 100, the following procedure is used. The lid 114 is removed to thereby expose the connector 10 on the electronic device to make it accessible from outside the case 102. The accessory device 200 is oriented such that the end face 5006 of the connector 40 on the accessory device faces the intermediate surface 1207 of the connector 10 on the electronic device and such that the first locking parts 5002 and the second locking parts 5004 of the connector 40 on the accessory device face the first concave portions 2002 and the second concave portions 2006 of the connector 10 on the electronic device, respectively. With the accessory device 200 positioned as described above, the insert section 50 of the connector 40 on the accessory device is inserted into the guide groove 18 of the connector 10 on the electronic device. When this is done, the accessory guide surfaces 52 on both sides of the connector 40 on the accessory device come into contact with the guide surfaces 24 of the connector 10 on the electronic device thereby determining the position in the space 22 of the connector 40 in the width direction of the guide groove 18.

When the connector 40 on the accessory device has been inserted in the space 22 through the guide groove 18 as described above, the first locking parts 5002 and the second locking parts 5004 are, as shown in FIG. 11, positioned in the space 22 having been inserted via the first concave portions 2002 and the second concave portions 2006, respectively. Also in the same state, the end surface 5006 of the connector 40 on the accessory device abuts on the intermediate surface 1207 of the connector 10 on the electronic device and the spring strips 52 of the connector 40 on the accessory device are positioned inside the first concave portions 2002.

Next, as shown in FIG. 12, when the insert section 50 is moved in the direction of fitting, the spring strips 52 come into elastic contact with the edges of the first convex portions 2004 to be slightly pushed into the inside of the sides of the insert section 50. The spring strips 52 being in elastic contact with the edges of the first convex portions 2004 move in unison with the insert section 50.

When the first locking parts 5002 and the second locking parts 5004 are subsequently positioned under the first convex portions 2004 and the second convex portions 2008, respectively, the spring strips 52 protrude inside the second concave portions 2006 and the upright surface 60 of the connector 40 on the accessory device abuts against the abutting surface 1210 of the connector 10 on the electronic device thereby determining the position in the direction of fitting of the connector 40 on the accessory device. In the present embodiment, when the first locking parts 5002 and the second locking parts 5004 are positioned under the first convex portions 2004 and the second convex portions 2008, respectively, the spring strips 52 are in elastic contact with portions toward the first convex portions 2004 of the edges of the second concave portions 2006.

When the insert section 50 is moved in the direction of fitting, the upright surface 60 of the connector 40 on the accessory device pushes the cover 26 of the connector 10 on the electronic device into the open position. At the same time, the contacts 48 of the connector 40 on the accessory device after sliding over the contact mounting surface 1206 are electrically connected to the contacts 16 of the connector 10 on the electronic device to establish electrical continuity.

Next, rotate the clamp ring 44 to clamp and fix the first convex portions 2004 and the second convex portions 2008 in cooperation with the first locking parts 5002 and the second locking parts 5004. This completes mounting of the accessory device 200 on the electronic device 100.

With the accessory device 200 mounted on the electronic device 100, it is possible to do shooting with the accessory device 200 and also with the electronic device 100 simultaneously. Image signals generated in the accessory device 200 are transmitted to the electronic device 100 via the connector 40 on the accessory device and the connector 10 on the electronic device and are processed as required in the electronic device 100.

To demount the accessory device 200 from the electronic device 100, use the following procedure. Rotate the clamp ring 44 to unfix the connector 40 on the accessory device from the connector 10 on the electronic device.

Next, when the insert section 50 of the connector 40 on the accessory device is moved in the direction of withdrawal, the first locking parts 5002 and the second locking parts 5004 are moved in the space 22 to be positioned below the first concave portions 2002 and the second concave portions 2006, respectively. At the same time, the spring strips 52 are moved out of the second concave portions 2006 to come into elastic contact with the edges of the first convex portions 2004 to be slightly pushed into the inside of the sides of the insert section 50. The spring strips 52 being in elastic contact with the edges of the first convex portions 2004 and moving in unison with the insert section 50 enter the first concave portions 2002 and protrude therein. As the insert section 50 is moved in the direction of withdrawal, the contacts 48 of the connector 40 on the accessory device are separated from the contacts 16 of the connector 10 on the electronic device to break the electrical continuity there. The cover 26 returns from the open position to the closed position.

In that state, moving the insert section 50 of the connector 40 on the accessory device in the direction of withdrawal lifts the first locking parts 5002 and the second locking parts 5004 of the connector 40 on the accessory device out of the space 22 via the first concave portions 2002 and the second concave portions 2006, respectively, to separate the insert section 50 of the connector 40 on the accessory device from the connector 10 on the electronic device. This completes demounting of the accessory device 200 from the electronic device 100.

Second Embodiment

A second embodiment will be described in the following.

In the following description of the second embodiment, portions and members similar to those used in the first embodiment will be denoted by the same reference numerals as used in describing the first embodiment.

The second embodiment differs from the first embodiment in that the space 22 of the connector 10 on the electronic device includes walls designed to prevent the connector 40 on the accessory device from being fitted in a wrong direction.

Figure 13A:
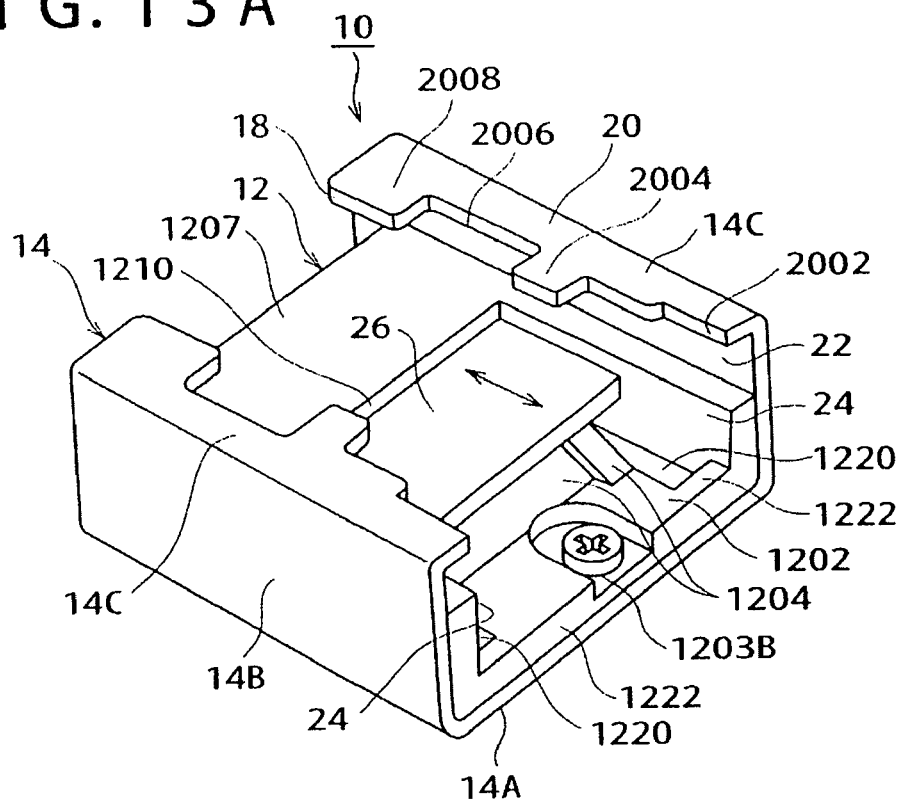
FIGS. 13A and 13B show perspective views of a connector on the electronic device of a second embodiment.
Figure 13B:
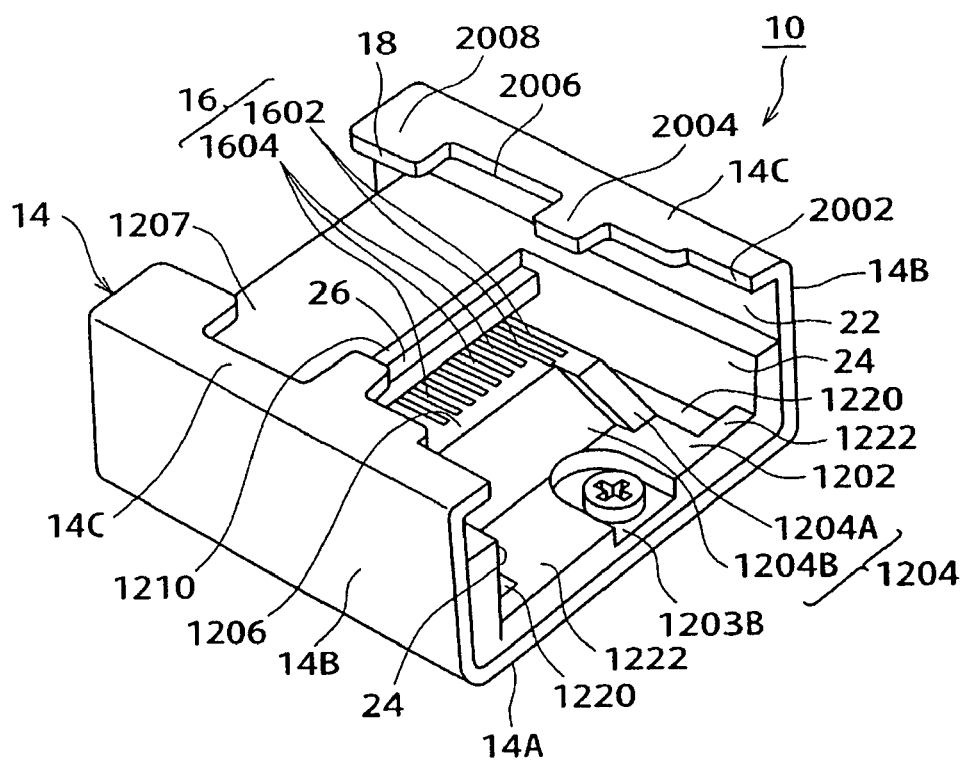

FIG. 13A is a perspective view of the connector 10 on the electronic device of the second embodiment. FIG. 13A shows the connector in a state in which the cover is in a closed position. FIG. 13B shows the connector in a state in which the cover is in an open position.

As shown in FIGS. 13A and 13B and as in the first embodiment, recesses 1220 extending along the guide surfaces 24 of the connector 10 on the electronic device are provided on both sides, as viewed in the width direction of the guide groove 18, of the bottom surface 1202. When the connector 40 on the accessory device is inserted in the space 22, the recesses 1220 accommodate end portions of the guide walls 58. In the first embodiment, the ends, as viewed in the direction of withdrawal, of the recesses 1220 are open. In the second embodiment, the ends, as viewed in the direction of withdrawal, of the recesses 1220 are each blocked with a wall portion 1222.

The upper surface of each of the wall portions 1222 is on a same plane as the bottom surface 1202.

In the above arrangement, if an attempt is made to insert, in the direction of fitting, the insert section 50 of the connector 40 on the accessory device via an end portion, as viewed in the direction of withdrawal, of the connector 10 on the electronic device, the guide walls 58 of the insert section 50 abut against the wall portions 1222 to prevent the insert section 50 from being inserted in the direction of fitting.

Therefore, an erroneous operation in which the insert section 50 of the connector 40 on the accessory device is inserted in the direction of fitting via the end portion, as viewed in the direction of withdrawal, of the connector 10 on the electronic device can be prevented.

In the above arrangement, when fitting the connector 40 on the accessory device to the connector 10 on the electronic device, only one mode of operation in which the connector 40 is inserted in the space 22 via the guide groove 18 is allowed. Limiting the operation to mount the accessory device 200 on the electronic device 100 to only one mode improves usability of the devices.

According to the first and the second embodiments, when fitting the connector 40 on the accessory device to the connector 10 on the electronic device, the first locking parts 5002 and the second locking parts 5004 of the connector 40 on the accessory device are inserted in the space 22 via the first concave portions 2002 and the second concave portions 2006, respectively. The insert section 50 of the connector 40 on the accessory device is then moved in the direction of fitting to position the first locking parts 5002 and the second locking parts 5004 under the first convex portions 2004 and the second convex portions 2008, respectively. As a result, the plural contacts 16 of the connector 10 on the electronic device come into contact with the plural contacts 48 of the connector 40 on the accessory device.

Now refer to FIGS. 11 and 12 to review the dimension S, that is, the dimension in the direction of fitting of a space required to fit the connector 40 on the accessory device to the connector 10 on the electronic device. In the present embodiment, the length in the direction of fitting of each of the first locking parts 5002 and the second locking parts 5004 is approximately one third of the dimension in the direction of fitting of the insert section 50. Therefore, the dimension S may be just as large as the sum of L and L/3, where L represents the dimension in the direction of fitting of the connector 40 on the accessory device (the corresponding dimension of the insert section 50) and the L/3 approximately represents the dimension in the direction of fitting of each of the first locking parts 5002 and the second locking parts 5004.

Therefore, the dimension in the direction of fitting required to fit the connector 40 on the accessory device to the connector 10 on the electronic device may be just as large as the sum of the dimension in the direction of fitting of the connector 40 on the accessory device and the dimension in the direction of fitting of each of the first locking parts 5002 and the second locking parts 5004.

On the other hand, when a conventional method in which the connector 40 on the accessory device is fitted to the connector 10 on the electronic device from outside the contour of the connector 10, the dimension S is required to be at least as large as 2L, that is, twice the dimension L in the direction of fitting of the connector 40 on the accessory device.

Thus, unlike in cases in which the conventional method is used, it is not necessary to secure, around the connector 10 on the electronic device, a large space for use in fitting the connector 40 on the accessory device to the connector 10 on the electronic device. This is quite an advantage in making the electronic device 100 and the accessory device 200 smaller and in improving the design of the devices.

Also, the first convex portions 2004, that are fixed and held by the first locking parts 5002 of the connector 40 on the accessory device, of the connector 10 on the electronic device, that is, the first convex portions 2004 used to fix the connector 40 on the accessory device are also used as members which the spring strips 52 come in elastic contact with to generate clicks to be felt by the user. This is an advantage in checking an increase in the number of components and reducing the production cost.

Furthermore, an arrangement has been made such that, when the contacts 48 of the connector 40 on the accessory device and the contacts 16 of the connector 10 on the electronic device are in contact, the spring strips 52 stay in elastic contact with the edges of the first convex portions 2004 so as to temporarily hold the connector 40 on the accessory device. Thus, the first convex portions 2004 used to fix the connector 40 on the accessory device are also used as members for temporarily holding the connector 40 on the accessory device. This is an advantage in checking an increase in the number of components and reducing the production cost.

Third Embodiment

Next, a third embodiment of the present invention will be described with reference to drawings.

FIG. 14 is a front perspective view of an electronic device of the third embodiment.

Figure 15:
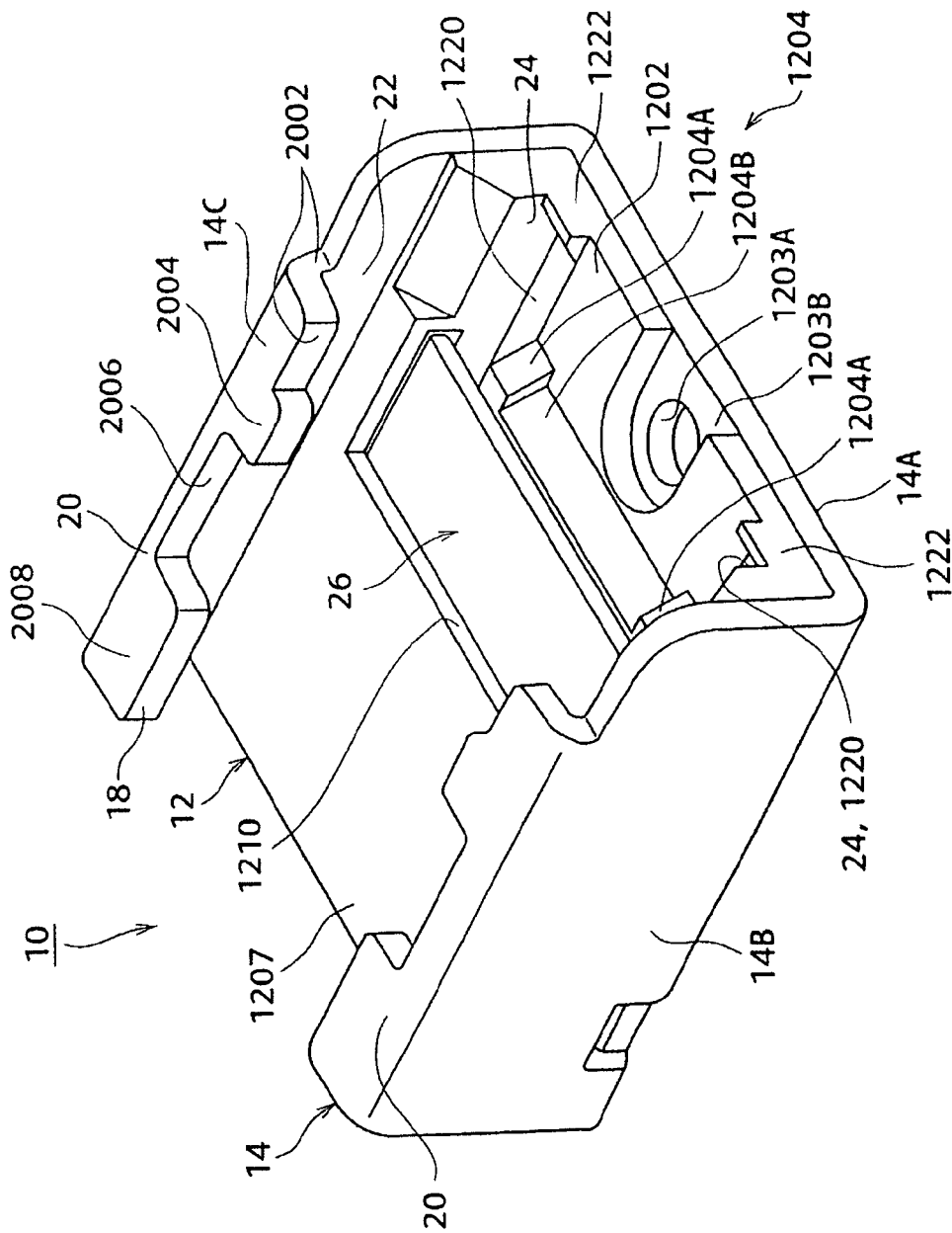
FIG. 15 is a perspective view showing a connector on the electronic device in a state in which a connector cover is in a closed position.
Figure 16:
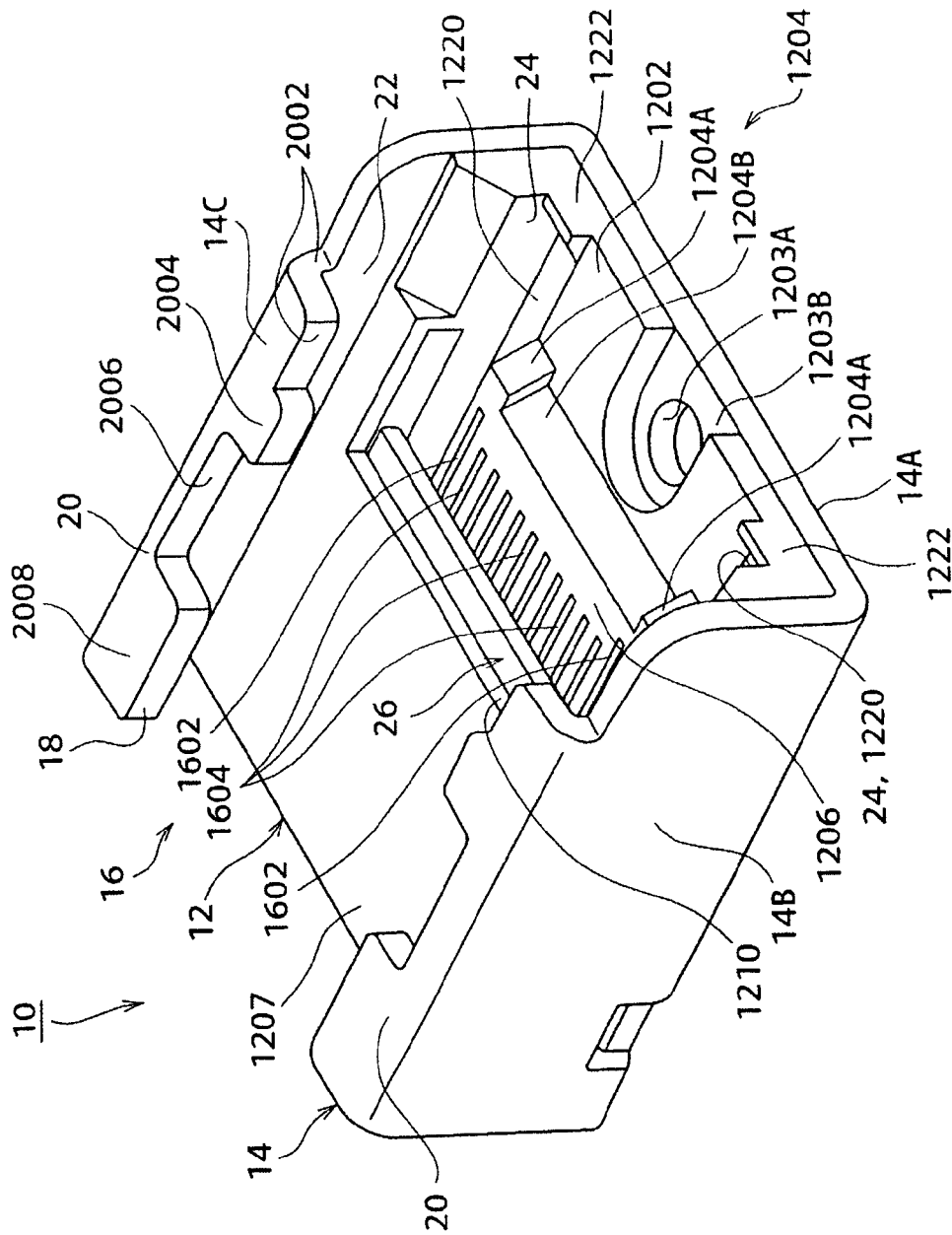
FIG. 16 is a perspective view showing the connector on the electronic device in a state in which the connector cover is in an open position.

FIG. 15 is a perspective view showing a connector on the electronic device in a state in which a connector cover is in a closed position. FIG. 16 a perspective view showing the connector on the electronic device in a state in which the connector cover is in an open position.

Part (A) of FIG. 17 is a plan view of the connector on the electronic device. Part (B) of FIG. 17 is a view in the direction of arrow B in part (A). Similarly, part (C) is a view in the direction of arrow C in part (A) and part (D) is a view in the direction of arrow D in part (A).

Figure 18:
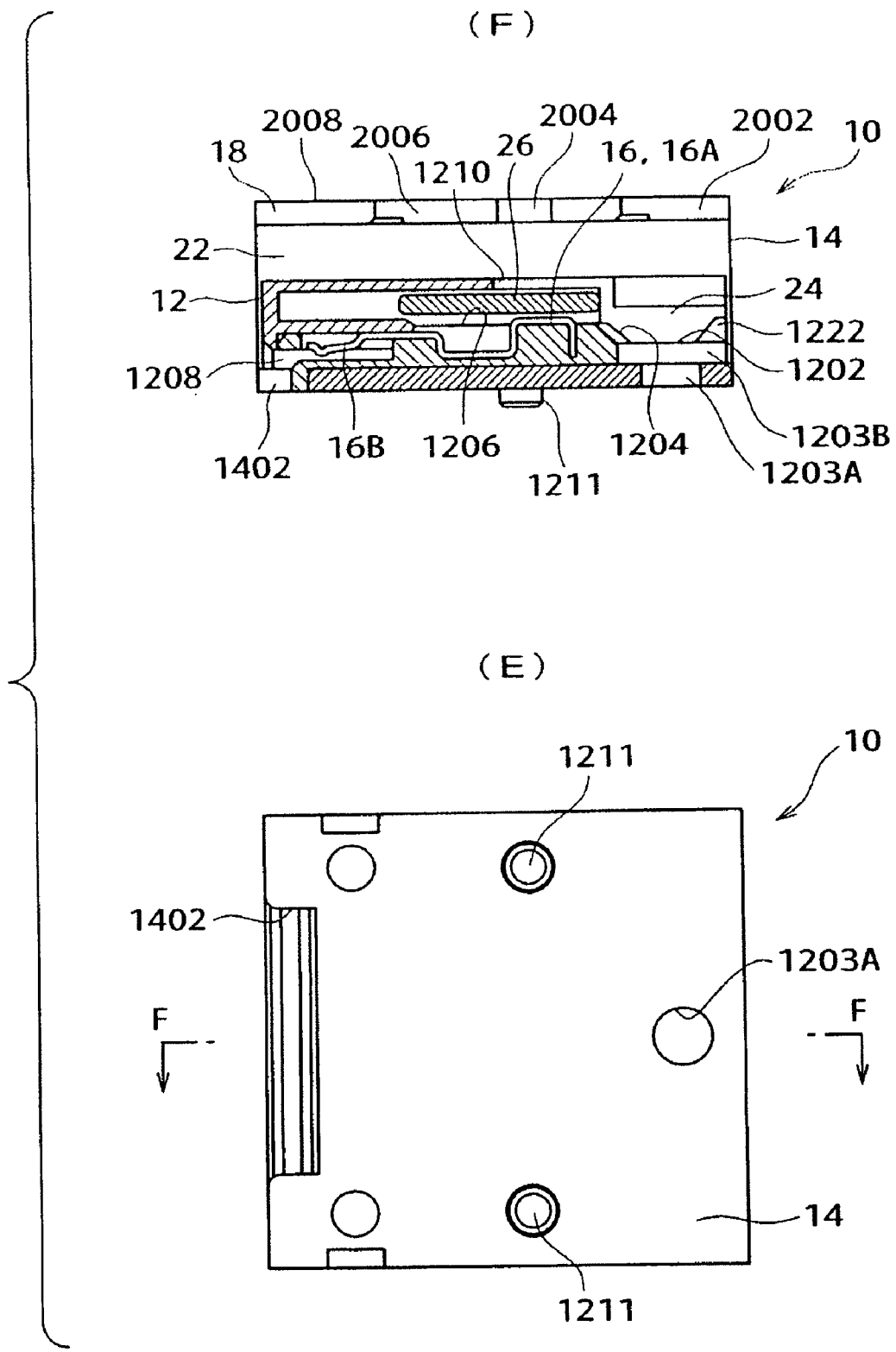
FIG. 18 shows a configuration of the connector on the electronic device.

Part (E) of FIG. 18 is a view in the direction of arrow E in part (D) of FIG. 17. Part (F) of FIG. 18 is a cross-sectional view taken along line F-F in part (E).

Figure 19:
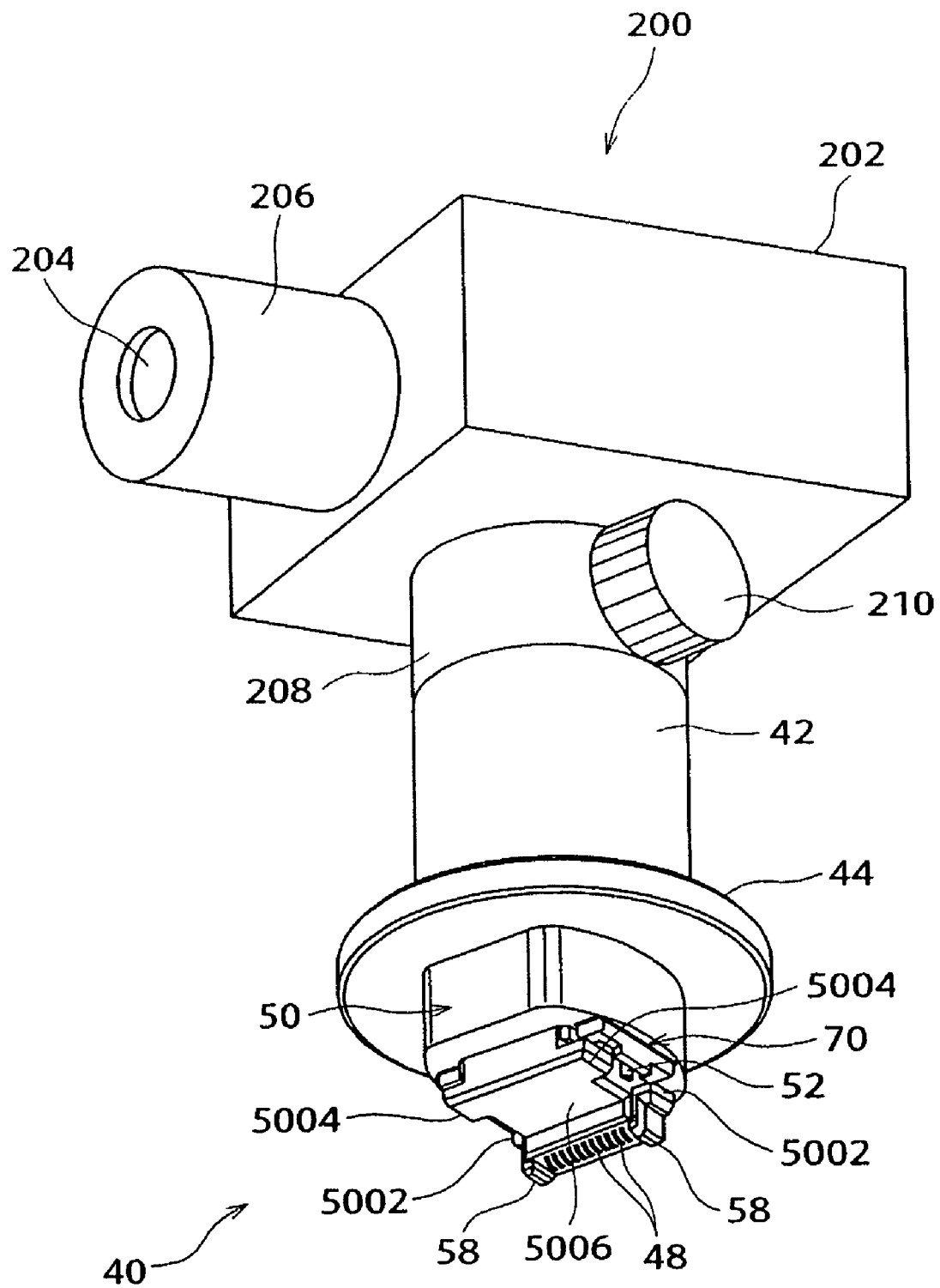
FIG. 19 is a perspective view of an accessory device.
Figure 21:
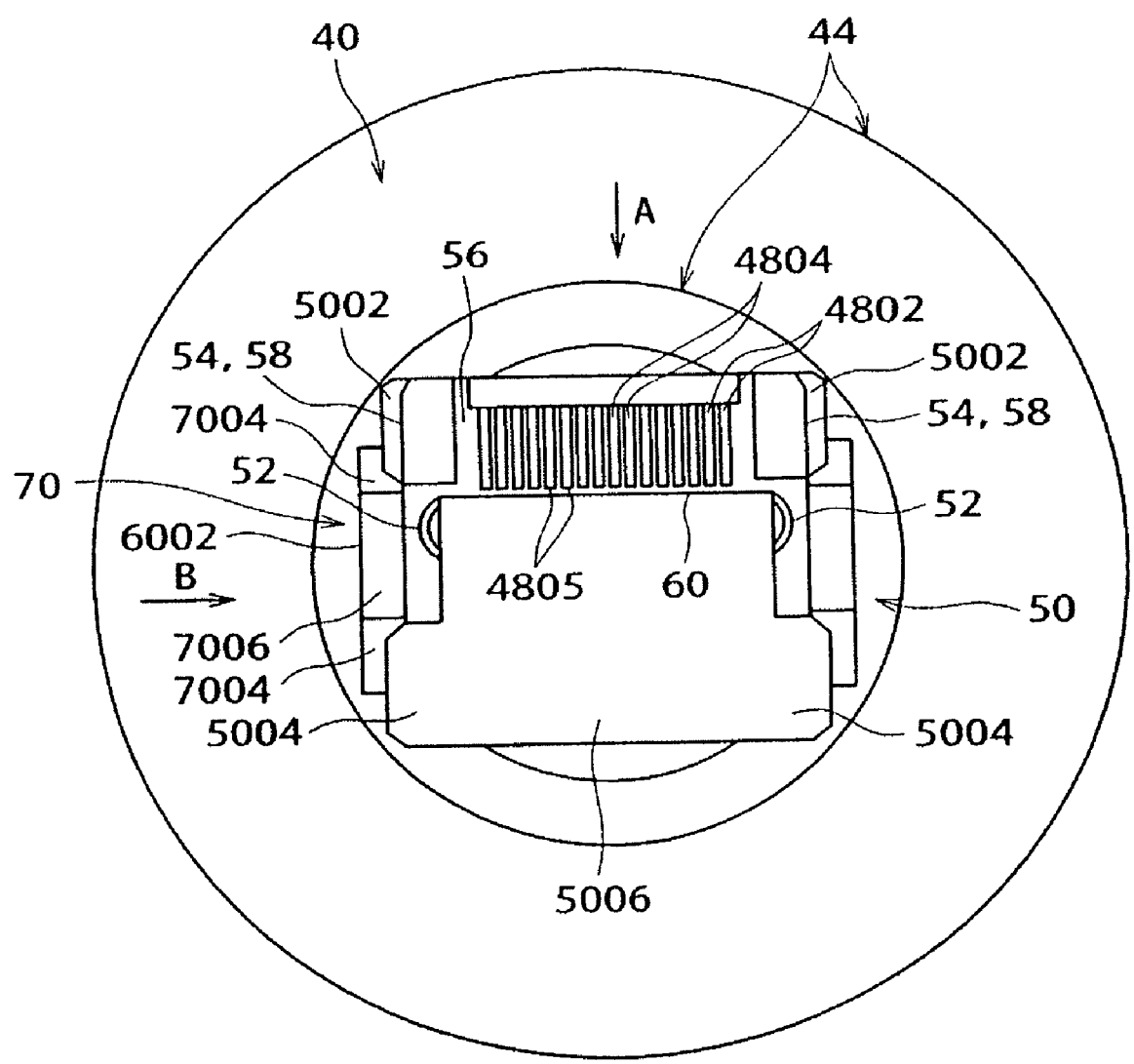
FIG. 21 is a plan view of the connector on the accessory device.
Figure 22:
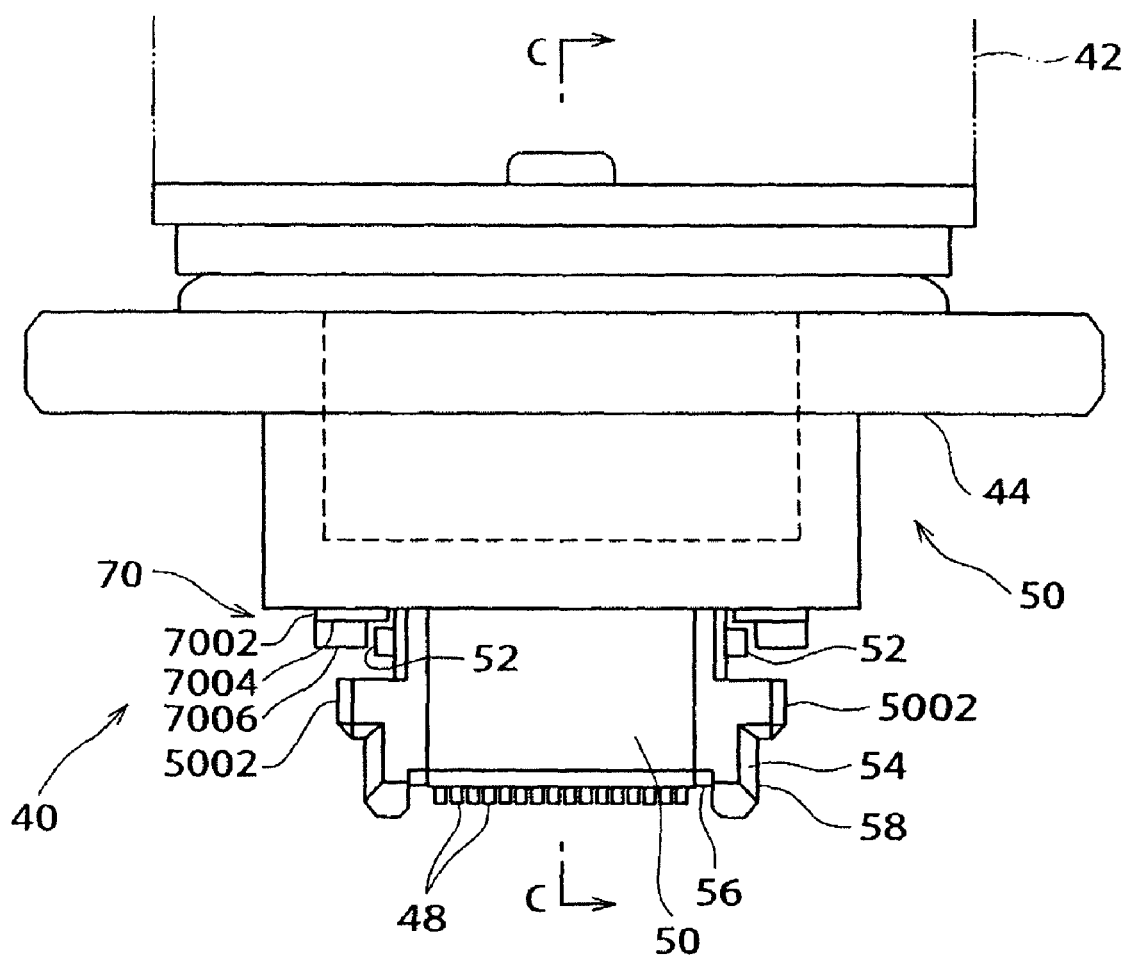
FIG. 22 is a view in the direction of arrow A in FIG. 21.
Figure 23:
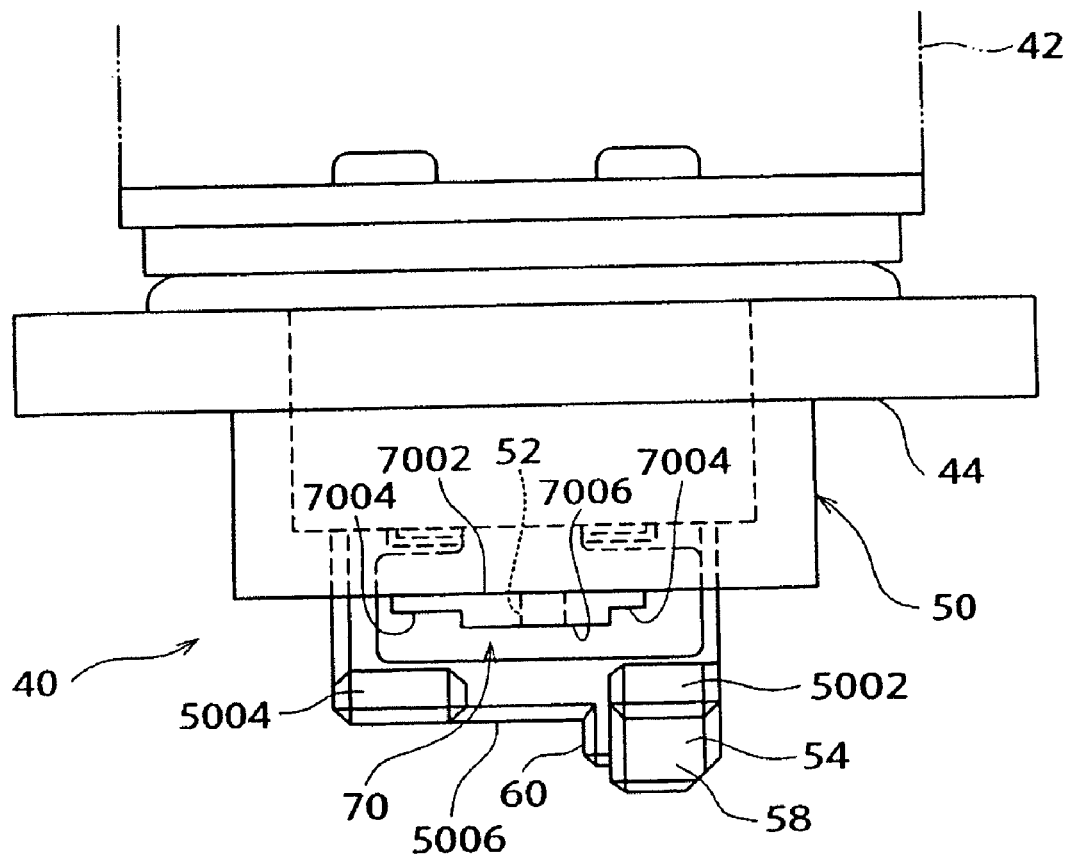
FIG. 23 is a view in the direction of arrow B in FIG. 21.
Figure 24:
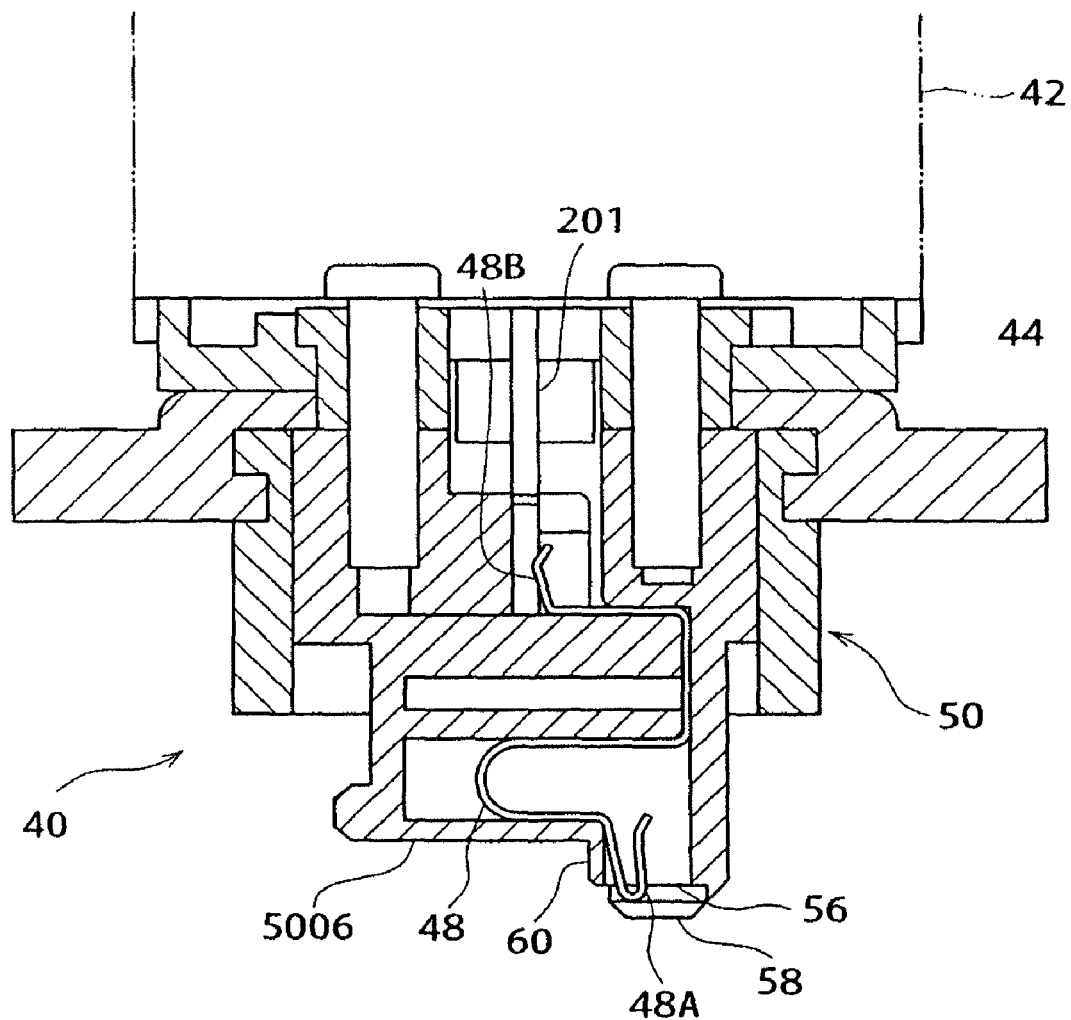
FIG. 24 is a cross-sectional view taken along line C-C in FIG. 22.

FIG. 19 is a perspective view of an accessory device. FIG. 20 is a perspective view of a connector on the accessory device. FIG. 21 is a plan view of the connector on the accessory device. FIG. 22 is a view in the direction of arrow A in FIG. 21. FIG. 23 is a view in the direction of arrow B in FIG. 21. FIG. 24 is a cross-sectional view taken along line C-C in FIG. 22.

Figure 25:
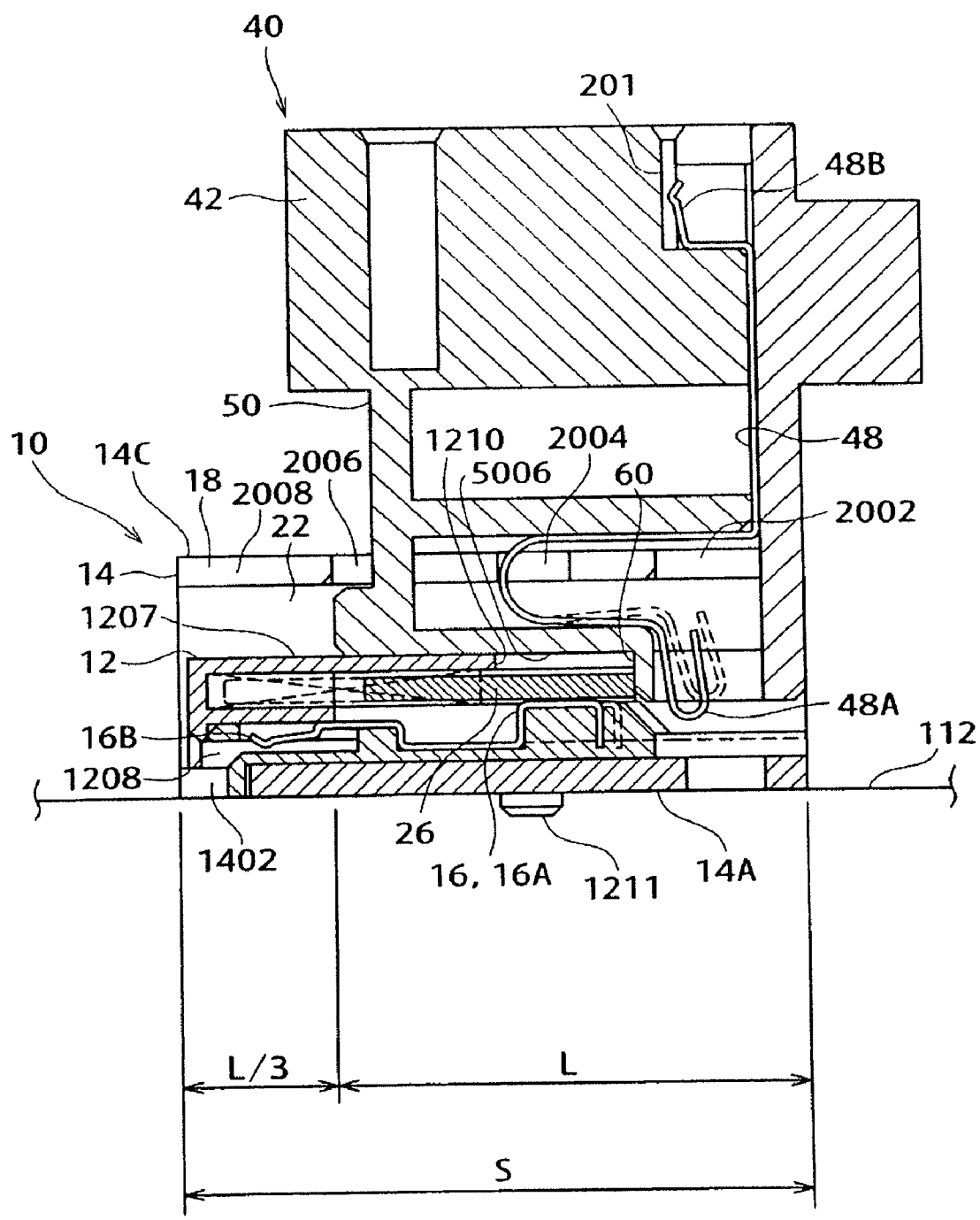
FIG. 25 is a cross-sectional view of the connector on the electronic device and the connector on the accessory device in a state in which the latter is inserted in the former.
Figure 26:
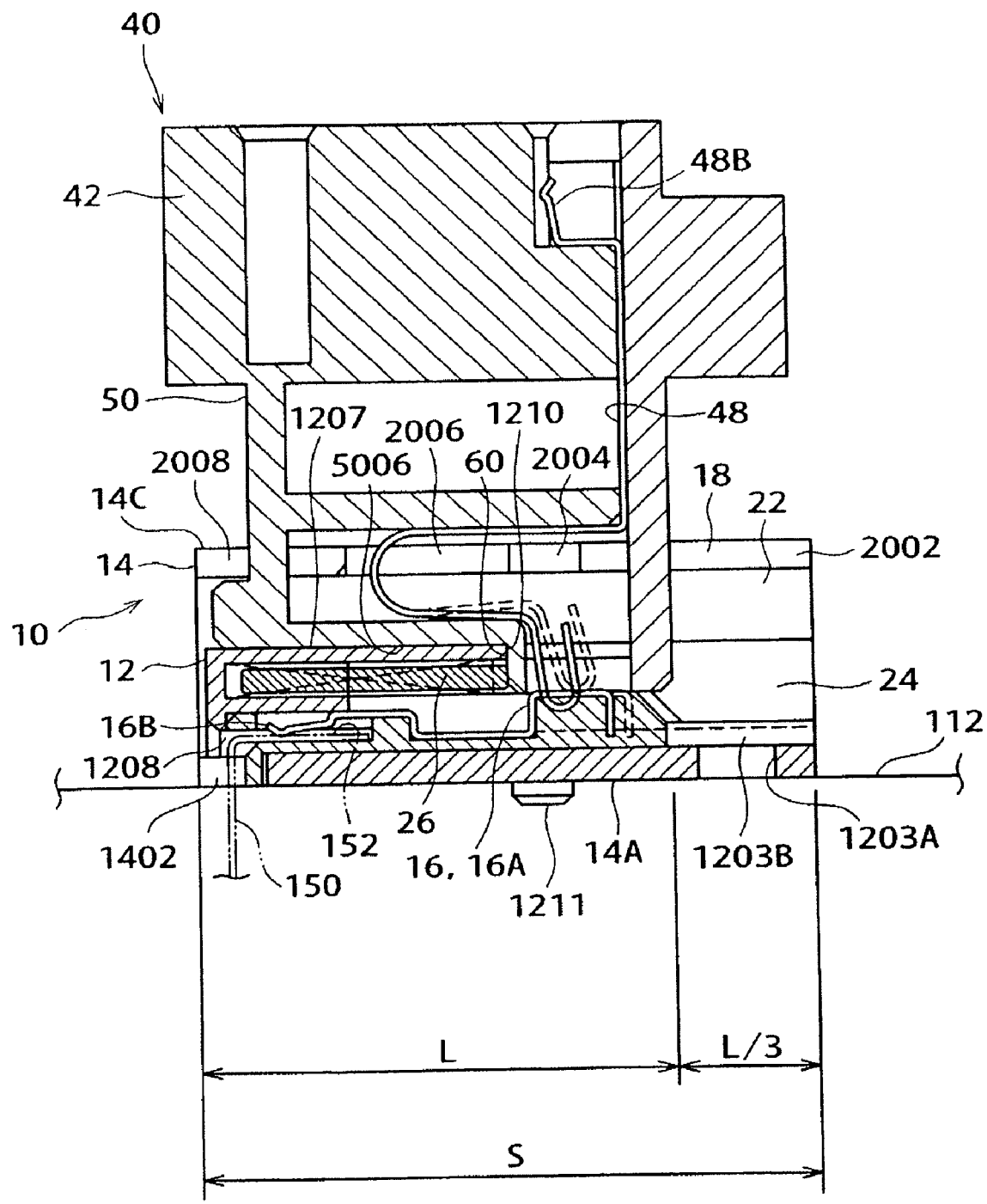
FIG. 26 is a cross-sectional view of the connector on the electronic device and the connector on the accessory device in a state in which the latter is fitted to the former.

FIG. 25 is a cross-sectional view of the connector on the electronic device and the connector on the accessory device in a state in which the latter is inserted in the former. FIG. 26 is a cross-sectional view of the connector on the electronic device and the connector on the accessory device in a state in which the latter is fitted to the former.

Figure 27:
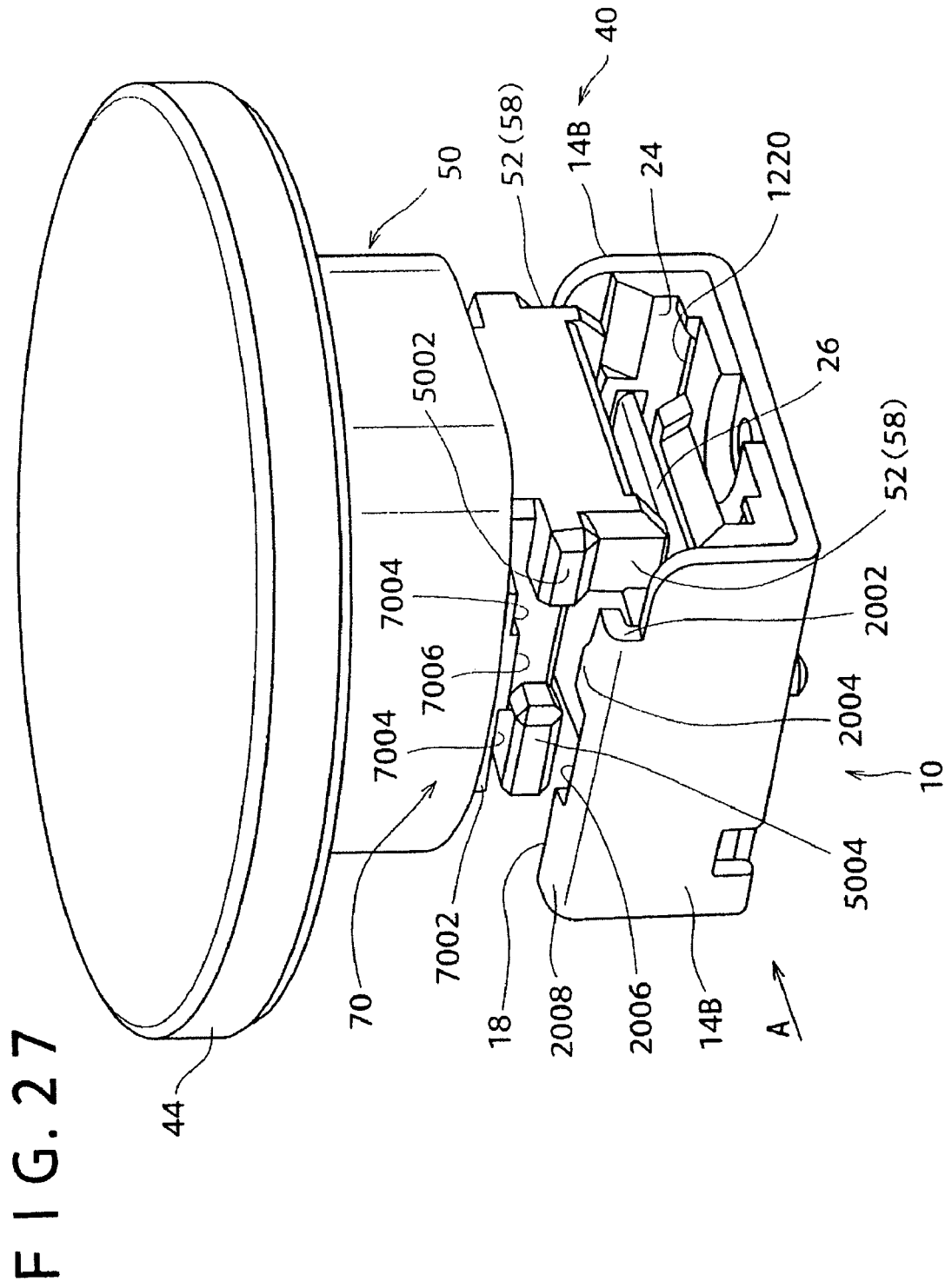
FIG. 27 is a perspective view of the connector on the electronic device and the connector on the accessory device in a state in which the latter is positioned above the former.
Figure 28:
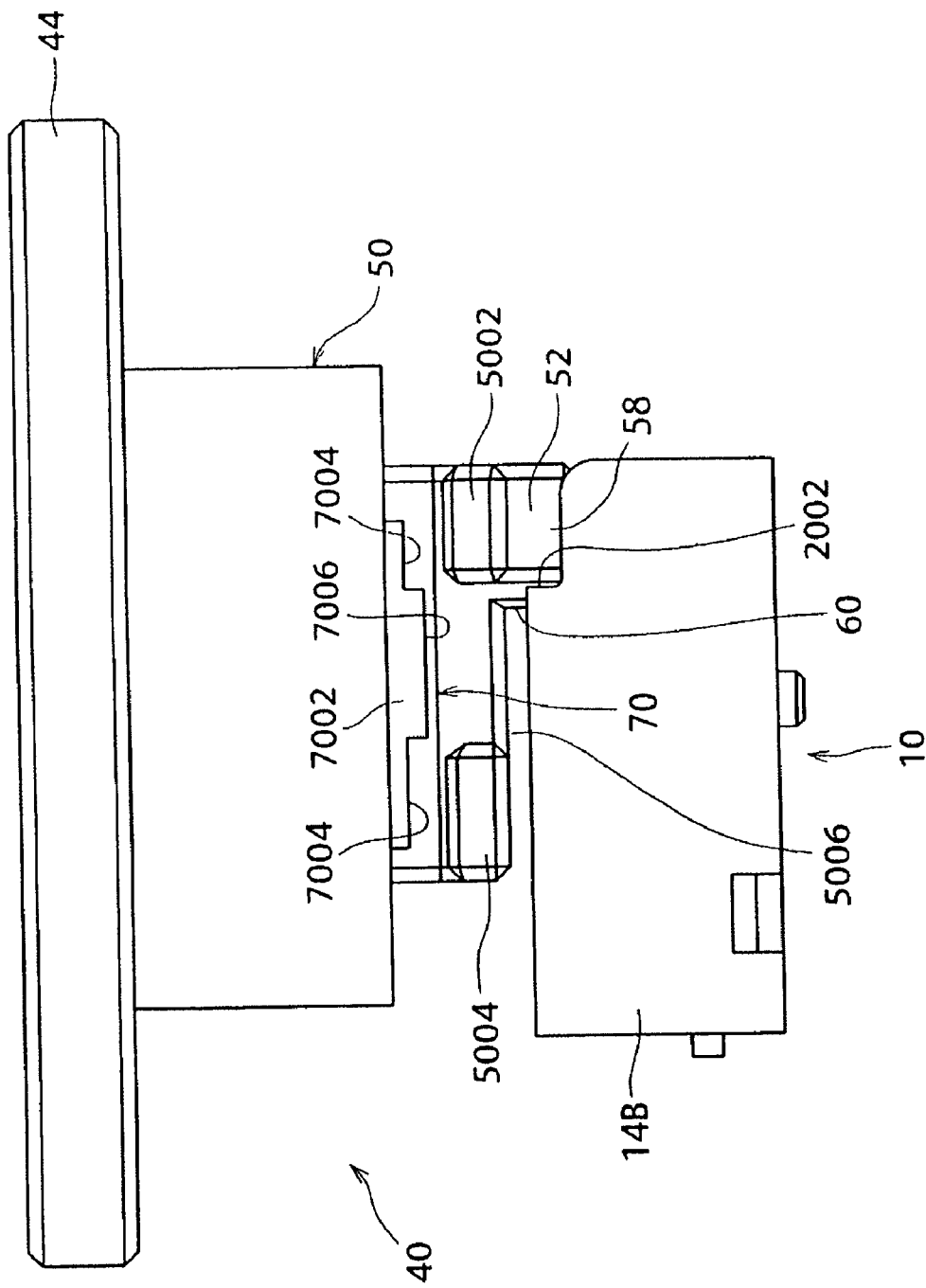
FIG. 28 is a view in the direction of arrow A in FIG. 27.
Figure 29:
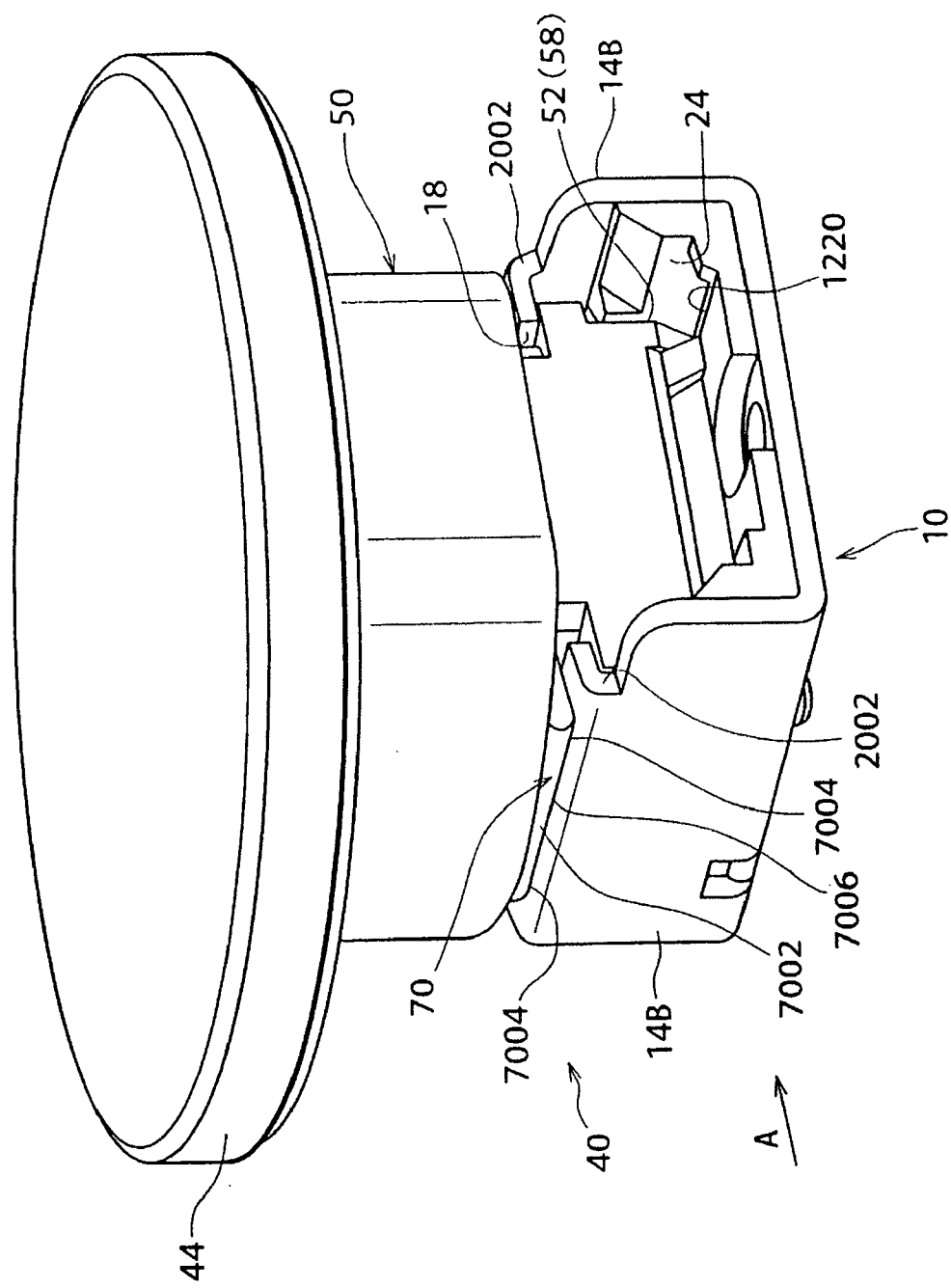
FIG. 29 is a perspective view of the connector on the electronic device and the connector on the accessory device in a state in which the latter is fitted to the former.
Figure 30:
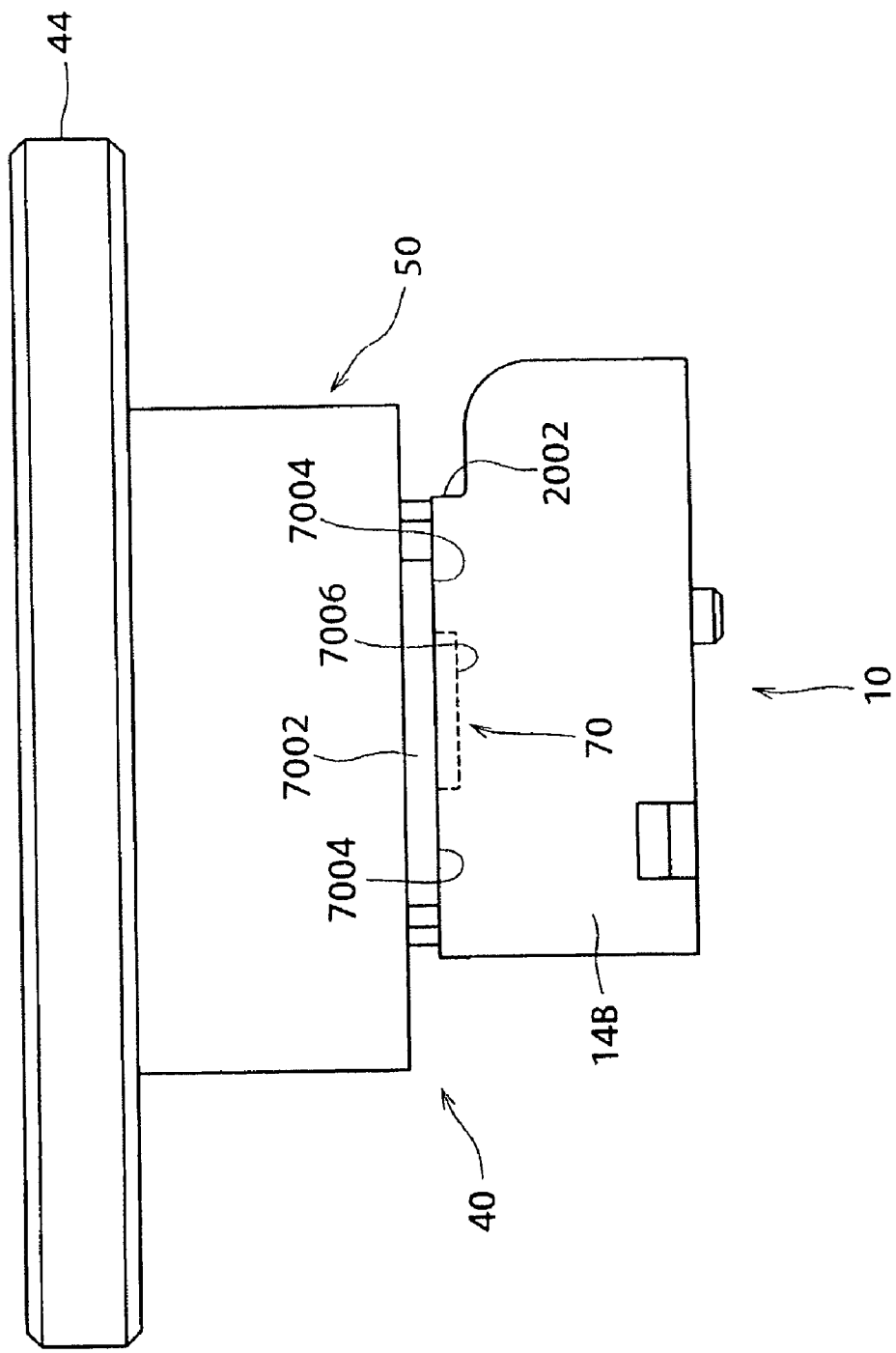
FIG. 30 is a view in the direction of arrow A in FIG. 29.

FIG. 27 is a perspective view showing a state in which the connector on the accessory device is positioned above the connector on the electronic device. FIG. 28 is a view in the direction of arrow A in FIG. 27. FIG. 29 is a perspective view of a state in which the connector on the accessory device has been fitted to the connector on the electronic device. FIG. 30 is a view in the direction of arrow A in FIG. 29.

First, the electronic device will be described.

In the present application, an electronic device 100 is, as shown in FIG. 14, a video camera provided with a case 102 which, making up an exterior of the video camera, has a flat rectangular parallelepiped shape.

A lens barrel 106 facing forward and incorporating a shooting optical system 104 is provided in an upper part of the front of the case 102. The case 102 accommodates an image pickup device for taking a subject image transmitted though the shooting optical system 104 and a recording and reproducing section for recording the subject image taken by the image pickup device as still-image data and moving-image data and reproducing the recorded data.

An electronic viewfinder 108 for viewing the subject image taken by the image pickup device is provided in an upper part of the rear of the case 102.

A display 110 for displaying the subject image taken by the image pickup device is openably and closably provided on the right-hand side of the case 102.

Operating switches (not shown) such as for starting and stopping shooting and setting switches (not shown) for making various settings are provided in a rear part of the top of the case 102 and on the left-hand side of the case 102.

A recess 112 having a rectangular shape as viewed from above is provided in a front part of the top of the case 102. The recess 112 is provided with a detachable lid 114 used to cover and uncover the recess 112. A connector 10 on the electronic device is provided in the recess 112. When the connector 10 on the electronic device is not used, the lid 114 is attached to the recess 112 to hide the connector 10. When the connector 10 on the electronic device is to be used, the lid 114 is detached from the recess 112 to expose the connector 10.

The electronic device 100 has an accessory mounting section for mounting an accessory device 200 (see FIG. 19). The accessory mounting section is made up of the connector 10 on the electronic device. The accessory device 200 (see FIG. 19) has a connection section to be fitted to the accessory mounting section of the electronic device 100. The connection section is made up of a connector 40 (see FIG. 19) on the accessory device.

The connector 10 on the electronic device will be described in the following.

As shown in FIGS. 15 and 16, the connector 10 on the electronic device includes an inner member 12 made of synthetic resin die-formed into a solid part and an outer member 14 made of steel plate shaped by bending. The inner member 12 is fixedly fitted in a lower part of the inside of the outer member 14.

The outer member 14 includes a bottom plate portion 14A, side plate portions 14B extending upward from both sides of the bottom plate portion 14A, and upper plate portions 14C bent-formed to hang over from upper edges of the side plate portions 14B such that edges of the upper plate portions 14C face each other.

The connector 10 on the electronic device includes plural contacts 16 used to supply power or to transfer signals, a pair of locking plates 20, a guide groove 18 formed between the pair of mutually facing locking plates 20, and a space 22 formed downwardly under the locking plates 20 and the guide groove 18.

The pair of the locking plates 20 are formed with the pair of the upper plate portions 14C. They extend in a same plane and their edges face each other.

The guide groove 18 is formed between the mutually facing edges of a pair of the locking plates 20. It extends in a direction perpendicular to the direction in which the locking plates 20 face each other. It is open at both ends as viewed in the direction in which it extends.

The guide groove 18 has a width in the direction in which the pair of the locking plates 20 face each other and a length which is perpendicular to the width. The direction in which the guide groove extends is the direction of its length.

On the pair of mutually facing edges of the locking plates 20, a pair of first concave portions 2002 (or a cutout 2002 in each of the locking plates 20) each of which is concave away from the edge of the locking part 20 on the other side, a pair of first convex portions 2004 each of which is convex toward the edge of the locking part 20 on the other side, a pair of second concave portions 2006 each of which is concave away from the edge of the locking part 20 on the other side, and a pair of second convex portions 2008 each of which is convex toward the edge of the locking part 20 on the other side are formed being arranged in the order mentioned in the direction in which the guide groove 18 extends.

The edges of the first convex portions 2004 and the second convex portions 2008 each extend linearly in the direction in which the guide groove 18 extends. As shown in part (A) of FIG. 17, each of the first convex portions 2004 includes a convex part 2004A and a convex part 2004B with the latter protruding more than the former and the two convex parts are arranged along the direction in which the guide groove 18 extends. Each of the second convex portions 2008 is formed such that its amount of protrusion is identical with that of the convex parts 2004B.

The space 22 is where a connector 40 (see FIG. 19) on the accessory device is inserted and then moved in a direction perpendicular to the direction of insertion. Its location is under the locking plates 20, between the side plate portions 14B, and above the inner member 12.

For convenience in describing embodiments of the present invention, the direction in which the connector 40 on the accessory device is inserted in the space 22 via the guide groove 18 when fitting the connector 40 on the accessory device to the connector 10 on the electronic device will be referred to as the direction of insertion. Similarly, the direction in which the connector 40 on the accessory device having been inserted in the space 22 is moved inside the space 22, that is, the direction in which the guide groove 18 extends will be referred to as the direction of fitting, the direction opposite to the direction of insertion will be referred to as the direction of removal, and the direction opposite to the direction of fitting will be referred to as the direction of withdrawal, respectively.

A pair of guide surfaces 24 making up lower guide surfaces of the connector 10 and extending in the direction of fitting while facing each other in the width direction of the guide groove 18 are provided in portions, which form bottom portions of the space 22, of the connector 10 on the electronic device, that is, portions below the first concave portions 2002 and the first convex portions 2004 of the inner member 12. The pair of the guide surfaces 24 of the connector 10 on the electronic device serve to determine the position of the connector 40 on the accessory device in a direction perpendicular to the direction in which the guide groove 18 extends, that is, the width direction of the guide groove 18.

In other words, as shown in FIGS. 15 to 17, the guide surfaces 24 of the connector 10 on the electronic device are provided below the first concave portions 2002 and the first convex portions 2004 of the pair of the locking plates 20, that is, on both sides, as viewed in the length direction of the guide groove 18, of the space 22. The guide surfaces 24 of the connector 10 on the electronic device determine the position, along the width of the guide groove 18, of the connector 40 on the accessory device and guide, along the length of the guide groove 18, the connector 40 on the accessory device.

As shown in FIG. 16, the contacts 16 for making electrical connections of the connector 10 on the electronic device are located in a portion of the inner member 12, the portion being at the bottom of the space 22 and between the pair of the guide surfaces 24 of the connector 10 on the electronic device.

To be more detailed, a bottom surface 1202, an inclined surface 1204 being inclined upward from an edge of the bottom surface 1202, and a flat contact mounting surface 1206 extending from an edge of the inclined surface 1204 in parallel with the bottom surface 1202 are provided in a portion of the inner member 12, the portion forming a bottom portion of the space 22 between the pair of the guide surfaces 24 of the connector 10 on the electronic device. The bottom surface 1202, the inclined surface 1204, and the contact mounting surface 1206 are arranged in the order mentioned in the direction of fitting.

A flat intermediate surface 1207 extending in parallel with the bottom surface 1202 and making up an upper guide surface is provided in a portion, which is below the second concave portions 2006 and the second convex portions 2008, of the inner member 12. In other words, the intermediate surface 1207 forms a bottom portion of the space 22. The bottom portion of the space 22 is below a portion of the guide groove 18, the portion of the guide groove 18 being between a pair of the second concave portions 20. The intermediate surface 1207 extends in a portion of the inner member 12, the portion of the inner member 12 being below the first concave portions 2002 and the first convex portions 2004 and extending along the pair of the side plate portions 14B.

In the present embodiment, when the connector 40 on the accessory device is inserted in the space 22, an end surface 5006 (see FIG. 20) of the connector 40 abuts on the intermediate surface 1207 thereby causing the depth of insertion of the connector 40 to be limited in the direction of insertion or, in other words, determining the position in the direction of insertion of the connector 40.

As shown in parts (A) and (B) of FIG. 17, the contact mounting surface 1206 forms, at a lower level than the intermediate surface 1207, a bottom portion of the space 22. The bottom portion of the space 22 is below a portion of the guide groove 18, the portion of the guide groove 18 being between the first convex portions 2004 of a pair of the locking plates 20.

The plural contacts 16 of the connector 10 on the electronic device are provided in a portion, which is separated in the direction of fitting from a border between the inclined surface 1204 and the contact mounting surface 1206, of the contact mounting surface 1206. They are linearly arranged to be apart from each other in the width direction of the guide groove 18. In other words, as shown in part (A) of FIG. 17, the plural contacts 16 are provided in a portion toward the intermediate surface 1207 of the contact mounting surface 1206.

The plural contacts 16 of the connector 10 on the electronic device will be described in more detail in the following. As shown in part (F) of FIG. 18, each of the contacts 16 is made of an elongated metallic strip formed by bending. One end 16A of each of the contacts 16 is exposed, through an opening, above the contact mounting surface 1206. As shown in part (A) of FIG. 17, the one end 16A, exposed above the contact mounting surface 1206, of each of the contacts 16 linearly extends in its longitudinal direction which coincides with the direction of fitting.

The one ends 16A of the plural contacts 16 of the connector 10 on the electronic device are, as shown in part (A) of FIG. 17, arranged such that end portions, as viewed in the direction of fitting, of the one ends 16A are arranged linearly in the width direction of the guide groove 18. The one ends 16A of ground contacts 1602, among the plural contacts 16, to be connected to ground potential are formed to be larger in the longitudinal direction than the one ends 16A of other signal contacts 1604. End portions, as viewed in the direction of withdrawal, of the ground contacts 1602 are protruding more than corresponding end portions of the other signal contacts 1604. In other words, the ground contacts 1602 among the plural contacts 16 extend longer in the direction of from the first convex portions 2004 toward the first concave sections 2002 along the length of the guide groove 18, than the others among the contacts 16. In part (A) of FIG. 17, the reference numeral 1605 denotes power supply contacts.

The layout of the contacts 1602, 1604, and 1605 as described above is, when connecting the connector 40 on the accessory device to the connector 10 on the electronic device, to cause ground contacts 4802, which are among contacts 48 of the connector 40 on the accessory device as shown in FIG. 20 and which are to be connected to ground potential, to come in contact with the ground contacts 1602 of the connector 10 on the electronic device before other signal contacts 4804. In this arrangement, the reference potentials of the accessory device 200 and the electronic device 100 are set to ground potential at the beginning of operation. As a result, effects of static noise are reduced and performance of both the accessory device 200 and the electronic device 100 is stabilized.

In the present embodiment, a pair of the outermost contacts among the plural contacts 16 arranged in the width direction of the guide groove 18 are the two ground contacts 1602.

The layout of the contacts 1602, 1604, and 1605 as described above is, even when the connector 40 on the accessory device is inserted at an angle with respect to the direction in which the guide groove 18 extends, to allow the ground contact 1602 on one of the two sides, as viewed in the length direction of the guide groove 18, to come in contact with the corresponding one of the ground contacts 4802 (see FIG. 20) of the connector 40 on the accessory device. In this arrangement, the reference potentials of the accessory device 200 and the electronic device 100 are set, with higher certainty, to ground potential. As a result, effects of static noise are reduced and performance of both the accessory device 200 and the electronic device 100 is further stabilized.

As shown in part (F) of FIG. 18, the portion other than the one end 16A of each of the contacts 16 is installed inside the inner member 12. Other ends 16B of the contacts 16 are each guided into a hole 1208 opened in an end portion, as viewed in the direction of fitting, of the inner member 12.

As shown in part (C) of FIG. 17 and parts (E) and (F) of FIG. 18, an open portion 1402 designed to provide a space leading to the hole 1208 is provided at the bottom of the inner member 12 and also at the bottom plate portion 14A of the outer member 14. As shown in FIG. 26, a connecting end 152 of a flexible substrate 150 provided in the electronic device 100 is inserted into the hole 1208 via the open portion 1402 and electrically connected, in the hole 1208, to the other end 16B of each of the contacts 16. At this time, the connecting end 152 is held, due to elasticity of the other end 16B of each of the contacts 16, between the other end 16B of each of the contacts 16 and a wall forming the hole 1208.

In this arrangement, electrical signals to drive the accessory device 200 are provided from internal electrical circuits of the electronic device 100 to each of the contacts 16, or electrical signals are provided from the accessory device 200 to internal circuits of the electronic device 100 via each of the contacts 16.

As shown in FIG. 26, when the bottom plate portion 14A of the outer member 14 is fixed to the bottom of the recess 112 of the electronic device 100, the open portion 1402 of the outer member 14 allows the flexible substrate 150 to be bent therein and led into the electronic device 100.

In the above arrangement, the flexible substrate 150 is positioned, as viewed from above, inside a contour of the outer member 14, that is, inside a contour of the connector 10 on the electronic device, so that it is unnecessary to secure a space where to arrange the flexible substrate 150 outside the connector 10 on the electronic device. This is an advantage in reducing the size of a space required to connect the connector 10 on the electronic device.

In part (F) of FIG. 18, the reference numeral 1211 denotes positioning bosses protruding from the bottom of the outer member 14. The position of the connector 40 on the accessory device is determined by engaging the bosses 1211 with holes provided in the bottom of the recess 112 (see FIG. 1) of the electronic device 100.

In the present embodiment, as shown in FIG. 16, the inclined surface 1204 includes inclined surface portions 1204A corresponding to the ground contacts 1602 to be connected to ground potential and an inclined surface portion 1204B corresponding to the other contacts 1604 and 1605. The portions 1204A and the portion 1204B extend in different planes. This is because the portion 1204B is formed being shifted, relative to the portions 1204A, in the direction of fitting for separation from a recess 1203B provided in a portion near the portion 1204B of the bottom surface 1202. In the recess 1203B, there is a hole 1203A for inserting a bolt used to fix the connector 10 to the bottom of the recess 100 of the electronic device 100. The recess 1203B is to accommodate the head of the bolt.

The inclined surface 1204 has a function to smoothly guide the contacts 48 of the connector 40 on the accessory device.

The contacts 16 provided on the contact mounting surface 1206 are separated, in the direction of fitting, from the border between the inclined surface 1204 and the contact mounting surface 1206. This is to allow, when the connector 40 on the accessory device is inserted in the connector 10 on the electronic device and then moved in the direction of fitting, the contacts 48 of the connector 40 on the accessory device to slide over the portion, separating the contacts 16 from the border, of the contact mounting surface 1206 so as to allow the contacts 48 of the connector 40 on the accessory device to come into contact with the contacts 16 in a stable state. Thus, the portion, that extends between the border between the inclined surface 1204 and the contact mounting surface 1206 and the end portion as viewed in the direction of withdrawal of each of the contacts 16, of the contact mounting surface 1206 functions as a sliding surface for the contacts 48 of the connector 40 on the accessory device.

A cover 26 for covering the contacts 16 of the connector 10 on the electronic device is provided to be movable in the direction of fitting in a portion of the inner member 12 that forms the bottom of the space 22, the portion of the inner member 12 being between the pair of the guide surfaces 24 and below the intermediate surface 1207.

There are springs 2602 (see part (A) of FIG. 17) provided to energize the cover 26 toward a closed position (see FIGS. 2 and 25) where the cover covers the contacts 16 of the connector 10 on the electronic device. The cover 26, when being moved in the direction of fitting, abuts against an upright surface 60 (see FIG. 20) which makes up a portion of a shaft section 50 of the connector 40 on the accessory device thereby allowing the shaft section 50 to move the cover 26 into an open position (see FIGS. 3 and 26) causing the contacts 16 to be exposed.

An abutting surface 1210 extending in the width direction of the guide groove 18 and forming a positioning surface is provided at the edge as viewed in the direction of withdrawal of the intermediate surface 1207.

In the present embodiment, when the connector 40 on the accessory device is inserted in the space 22, the upright surface 60 (see FIG. 20) of the connector 40 on the accessory device abuts against the abutting surface 1210, so that, in the space 22, the depth of insertion in the direction of fitting of the connector 40 on the accessory device is limited by the abutting surface 1210. In other words, the position in the direction of fitting of the connector 40 on the accessory device is determined by the abutting surface 1210. The abutting surface 1210 faces in the direction of from the first convex portions 2004 toward the first concave portions 2002 along the length of the guide groove 18.

As shown in FIGS. 15 and 16, recesses 1220 extending along the guide surfaces 24 of the connector 10 on the electronic device are provided on both sides, as viewed in the length direction of the guide groove 18, of the bottom surface 1202 of the inner member 12 or, in other words, on both sides, as viewed in the length direction of the guide groove 18, of the contact mounting surface 1206. When the connector 40 on the accessory device is inserted, the recesses 1220 accommodate end portions of the guide walls 58 (see FIG. 20).

The ends as viewed in the direction of withdrawal of the recesses 1220 are each blocked with a wall portion 1222.

In the above arrangement, if an attempt is made to insert, in the direction of fitting, the shaft section 50 (see FIG. 20) of the connector 40 on the accessory device via an end portion as viewed in the direction of withdrawal of the connector 10 on the electronic device, the guide walls 58 of the shaft section 50 abut against the wall portions 1222 to prevent the shaft section 50 from being inserted in the direction of fitting.

Therefore, an erroneous operation in which the shaft section 50 of the connector 40 on the accessory device is inserted in the direction of fitting via the end portion as viewed in the direction of withdrawal of the connector 10 on the electronic device can be prevented.

In this arrangement, when fitting the connector 40 on the accessory device to the connector 10 on the electronic device, only one mode of operation in which the connector 40 on the accessory device is inserted in the space 22 via the guide groove 18 is allowed. Limiting the operation to mount the accessory device 200 on the electronic device 100 to only one mode improves usability of the devices.

Next, the accessory device 200 will be described.

As shown in FIG. 19, the accessory device 200 in the present embodiment is a small camera having a small outer shape as compared with the electronic device 100. The small camera operates, for example, to shoot, at the same time as the electronic device 100 does shooting, a subject existing in a direction different from the direction in which the electronic device 100 is shooting, or to shoot a subject, which may be the same as or different from the subject being shot by the electronic device 100, at a magnification different from that of the electronic device 100.

The accessory device 200 has a case 202 which, having a rectangular parallelepiped shape, makes up an exterior of the accessory device 200. A lens barrel 206 facing forward and incorporating a shooting optical system 204 is provided in an upper part of the front of the case 202.

The case 202 accommodates an image pickup device which takes a subject image transmitted though the shooting optical system 204 and a signal processing section which processes an image signal generated by the image pickup device and outputs the processed signal to a connector 40, being described later, on the accessory device.

On the undersurface of the case 202, a connection section 208 having a cylindrical shape protruding from the undersurface is provided integrally with the case 202.

The connector 40 on the accessory device has, as shown in FIG. 19, a cylindrical shaft member 42 which is connected, to be rotatable about a same axis as the connection section 208, to an underside of the connection section 208. In FIG. 19, the reference numeral 210 denotes a fixing screw which fixes the shaft member 42 at a rotation angle with respect to the connection section 208.

As shown in FIG. 20, a shaft section 50 made up of a shaft member having a rectangular cross-section smaller than that of the shaft member 42 and extending along a same axis as the shaft member 42 is provided forward (at a lower end) of the shaft member 42 as viewed in the longitudinal direction. Of two directions perpendicular to the central axis of the shaft section 50, one is the width direction of the shaft section 50 and the other is the front-rear direction (the direction of fitting and the direction of withdrawal) of the shaft section 50.

The dimension along the width direction of an end portion of the shaft section 50 is slightly smaller than the distance between edges of a pair of the first convex portions 2004 and also between edges of a pair of the second convex portions 2008, that is, the distance between each pair of innermost edges of the guide groove 18 so as to allow the end portion of the shaft section 50 to be smoothly put into and out from the guide groove 18.

A first locking part 5002 and a second locking part 5004 are provided on each side of the end portion of the shaft section 50. They are protruding parts formed in a same plane and are, on each side, spaced from each other in the front-rear direction. The first locking parts 5002 can be inserted in the space 22 via the first concave portions 2002 of the connector 10 on the electronic device and can then be moved in the direction of fitting. The second locking parts 5004 can be inserted in the space 22 via the second concave portions 2006 of the connector 10 on the electronic device and can then be moved in the direction of fitting. On each of the sides having the first locking parts 5002 and the second locking parts 5004, the portion excluding the first locking part 5002 and the second locking part 5004 makes up a concave portion 5005.

In the present embodiment, the length in the direction of fitting of each of the first and the second locking parts 5002 and the second locking parts 5004 is approximately one third of the dimension in the direction of fitting of the shaft section 50.

As shown in FIGS. 19 to 22, a spring strip 52 is crookedly protruding in a portion between the first locking part 5002 and the second locking part 5004 on each side of the end portion of the shaft section 50. The spring strip 52 is made of a thin plate of spring steel and is fit in the shaft section 50.

On each side of the end portion of the shaft section 50, compared with the first locking part 5002 and the second locking part 5004 provided there, the spring strip 52 is located closer to a base portion of the shaft section 50. In other words, on each side of the end portion of the shaft section 50, the spring strip 52 is located closer to the case 202 than where the concave portion 5005 is provided. Each of the spring strips 52 can be pushed into the inside of the side where it is installed. Where it is installed, it is energized outwardly, that is, in the direction in which it protrudes.

In a state in which the first locking parts 5002 and the second locking parts 5004 are positioned in the space 22 having been entered via the first concave portions 2002 and the second concave portions 2006, respectively, the spring strips 52 stay inside the first concave portions 2002. When, in the space 22, the first locking parts 5002 and the second locking parts 5004 move toward under the first convex portions 2004 and the second convex portions 2008, respectively, the spring strips 52 come into elastic contact with edges of the first convex portions 2004. In a state in which the first locking parts 5002 and the second locking parts 5004 have moved to under the first convex portions 2004 and the second convex portions 2008, respectively, the spring strips 52 stay inside the second concave portions 2006. In this arrangement, the spring strips 52 allow a user to feel clicks when mounting the accessory device 200. In the present embodiment, in a state in which the first locking parts 5002 and the second locking parts 5004 having been moved in the direction of fitting in the space 22 are positioned under the first convex portions 2004 and the second convex portions 2008, respectively, the spring strip 52 on each side stays in elastic contact with a portion, which is toward the first convex portion 2004, of the edge of the second concave portion 2006 on each side, causing the accessory device 200 to be tentatively held there.

The end surface 5006 making up the upper guide surface is provided at an end of the shaft section 50. When the shaft section 50 is inserted in the space 22, the end surface 5006 abuts on the intermediate surface 1207 of the connector 10 on the electronic device, thereby limiting the depth of insertion of the connector 40 on the accessory device into the space 22, or in other words, thereby determining the position of the connector 40 on the accessory device in the direction of insertion.

As shown in FIG. 20, the end surface 5006 is located, as viewed in the direction along the length of the shaft section 50 and away from the case 202, at an end of an end portion on each side of the shaft section 50, the end portion on each side including the concave portion 5005 and the second locking part 5004. The end surface 5006 extends in a plane perpendicular to the length direction of the shaft section 50 and determines the position of the shaft section 50 in the length direction. It also guides the shaft section 50 in the front-rear direction with respect to the connector 10 on the electronic device.

In the present embodiment, a pair of mutually facing guide walls 58 each protruding, in the longitudinal direction of the insert section 50 (the direction of insertion), from a base end of the first locking part 5002 on each side are provided. A surface on an outer side of each of the guide walls 58 forms an accessory guide surface 52 making up a lower guide surface, a pair of which are slidable along a pair of the guide surfaces 24 of the connector 10 on the electronic device. The accessory guide surfaces 52 determine the position, in the width direction of the guide groove 18, in the space 22 of the connector 40 on the accessory device by coming in contact with the guide surfaces 24 of the connector 10 on the electronic device.

Also in the present embodiment, should the shaft section 50 of the connector 40 on the accessory device be reverse-oriented along the direction of fitting when an attempt is made to insert the shaft section 50 in the space 22 in the connector 10 on the electronic device, a pair of the guide walls 58 of the connector 40 on the accessory device abut on the intermediate surface 1207 of the connector 10 on the electronic device thereby preventing the shaft section 50 from being inserted in the space 22.

A flat contact mounting surface 56 which is parallel with the end surface 5006 is provided in an portion of the shaft section 50, the end portion being between base portions of a pair of the guide walls 58. The contact mounting surface 56 is located forward of the end surface 5006. An upright surface 60 making up a positioning surface perpendicular to both the contact mounting surface 56 and the end surface 5006 is formed between the contact mounting surface 56 and the end surface 5006.

Thus, as shown in FIG. 20, the contact mounting surface 56 is provided in a portion of the insert section 50, the portion being forward of where the first locking parts 5002 are formed. The contact mounting surface 56 is in parallel with the end surface 5006 while being located more outwardly than the end surface 5006 as viewed in the length direction of the shaft section 50.

Also as shown in FIG. 20, the accessory guide surfaces 52 are located on both sides of the contact mounting surface 56 as viewed in the length direction.

The upright surface 60 faces in the direction of from the contact mounting surface 56 toward the end surface 5006 along the front-rear direction.

The plural contacts 48 of the connector 40 on the accessory device are provided on the contact mounting surface 56. They are arranged linearly being apart from each other between a pair of the guide walls.

The upright surface 60 is arranged such that, when the shaft section 50 is inserted in the space 22 of the connector 10 on the electronic device and is then moved in the direction of fitting, it abuts against an edge of the cover 26.

As being described later, the upright surface 60 determines the position of the shaft section 50 in the direction of fitting by abutting against the abutting surface 1210 of the connector 10 on the electronic device.

In the arrangement being described, when the shaft section 50 is inserted in the space 22 of the connector 10 on the electronic device and is then moved in the space 22 in the direction of fitting, the first locking parts 5002 and the second locking parts 5004 come under the first convex portions 2004 and the second convex portions 2008, respectively, causing the plural contacts 48 of the connector 40 on the accessory device and the plural contacts 16 of the connector 10 on the electronic device to come into contact.

The plural contacts 48 of the connector 40 on the accessory device will be described in detail in the following. As shown in FIG. 24, each of the contacts 48 is made of an elongated metallic strip formed by bending. One end 48A of each of the contacts 48 protrudes downward from the contact mounting surface 56 (in the direction in which the shaft section 50 extends, that is, in the direction of insertion). In the present embodiment, the guide walls 58 protrude from both sides, as seen in the length direction of the guide groove 18, of the contact mounting surface 56. The one end 48A of each of the plural contacts 48 is located closer to the base end of the shaft section 50 than the end of the guide wall 58 on each side. To be more concrete, each of the contacts 48 is structured to be elastically deformable, so that, the one end 48A of each of the contacts 48 protruding downward from the contact mounting surface 56 is put in the inside of the contact mounting surface 56 when pushed upward.

Each of the contacts 48 includes ground contacts 4802 to be connected to ground potential and other signal contacts 4804. The ground contacts 4802 are connected to the ground contacts 1602 of the connector 10 on the electronic device. The other signal contacts 4804 are connected to the other signal contacts 1602 of the connector 10 on the electronic device. In FIG. 21, the reference numeral 4805 denotes power supply contacts. The power supply contacts 4805 are connected to the power supply contacts 1605 of the connector 10 on the electronic device.

As shown in FIG. 24, the portion excluding the one end 48A of each of the contacts 48 is installed inside the shaft section 50. The other end 48B of each of the contacts 48 is electrically connected to a wiring member 201 provided in the accessory device 200.

In this arrangement, electrical signals to drive the accessory device 200 are supplied to internal electrical circuits of the accessory device 200 via the contacts 48 and the wiring member 201, or electrical signals are supplied from the internal electrical circuits of the accessory device 200 to the contacts 48 via the wiring member 201.

With the end portion of the shaft section 50 inserted in the guide groove 18, an annular operation ring 44 is rotatably provided in a portion above the locking plates 20 of the shaft section 50. In the present embodiment, a groove is provided in a portion between the shaft member 42 and the shaft section 50. The operation ring 44 is rotatably installed in the groove.

A clamp block 70 which moves in the length direction of the shaft section 50, that is, in the vertical direction when the operation ring 44 is rotated is provided on each of the two sides of the shaft section 50. There are various conventionally known mechanisms which may be used to move the clamp blocks 70 in the vertical direction by rotating the operation ring 44. For example, a method may be used in which the clamp blocks 70 with male threads formed on their surfaces are installed to be movable in the length direction of the shaft section 50 and the male threads of the clamp blocks 70 and the female thread of the operation ring 44 are screwed together.

Each of the clamp blocks 70 includes a longitudinal plate portion 7002 extending in the direction in which the shaft section 50 extends, a clamping portion 7004 provided at a lower end of the longitudinal plate portion 7002, and a move preventing part 7006 which is inserted in the second concave portion 2006 formed between the first convex portion 2004 and the second convex portion 2008 on the same side. The clamping portions 7004, in a state in which the first locking parts 5002 and the second locking parts 5004 abut against undersurfaces of the first convex portions 2004 and the second convex portions 2008, respectively, abut on upper surfaces of the first convex portions 2004 and the second convex portions 2008, respectively, and, in cooperation with the first locking parts 5002 and the second locking parts 5004, clamp and fix the first convex portions 2004 and the second convex portions 2008. The move preventing parts 7006 prevent the shaft section 50 from moving in the direction in which the guide groove 18 extends.

Each of the clamping portions 7004 has an approximately rectangular parallelepiped shape extending in the direction in which the guide groove 18 extends and has a cross-section larger than that of each of the longitudinal plate portions 7002.

Each of the move preventing parts 7006 has an approximately rectangular parallelepiped shape protruding from an undersurface of one of the clamping portions 7004. It is sized such that it fits in between the first convex portion 2004 and the second convex portion 2008, that is, in the second convex portion 2006 on the same side.

Next, how to use the connector 10 on the electronic device and the connector 40 on the accessory device will be described.

To mount the accessory device 200 on the electronic device 100, the following procedure is used. The lid 114 is removed to thereby expose the connector 10 on the electronic device to make it accessible from outside the case 102.

As shown in FIGS. 27 and 28, the accessory device 200 is oriented such that the end face 5006 of the connector 40 on the accessory device faces the intermediate surface 1207 of the connector 10 on the electronic device and such that the first locking parts 5002 and the second locking parts 5004 of the connector 40 on the accessory device face the first concave portions 2002 and the second concave portions 2006 of the connector 10 on the electronic device, respectively. With the accessory device 200 oriented as described above, the shaft section 50 of the connector 40 on the accessory device is inserted into the guide groove 18 of the connector 10 on the electronic device. When this is done, the accessory guide surfaces 52 on both sides of the connector 40 on the accessory device come into contact with the guide surfaces 24 of the connector 10 on the electronic device thereby determining the position in the space 22 of the connector 40 on the accessory device in the width direction of the guide groove 18.

When the connector 40 on the accessory device has been inserted through the guide groove 18 as described above, as shown in FIG. 25, the first locking parts 5002 and the second locking parts 5004 are positioned in the space 22 having been inserted via the first concave portions 2002 and the second concave portions 2006, respectively. Also in the same state, the end surface 5006 of the connector 40 on the accessory device abuts on the intermediate surface 1207 of the connector 10 on the electronic device and the spring strips 52 of the connector 40 on the accessory device are positioned inside the first concave portions 2002.

Next, as shown in FIG. 26, when the shaft section 50 is moved in the direction of fitting, the spring strips 52 come into elastic contact with the edges of the first convex portions 2004 to be slightly pushed into the inside of the sides of the shaft section 50. The spring strips 52, while being in elastic contact with the edges of the first convex portions 2004, move in unison with the shaft section 50.

When the first locking parts 5002 and the second locking parts 5004 are subsequently positioned under the first convex portions 2004 and the second convex portions 2008, respectively, the spring strips 52 protrude inside the second concave portions 2006 and the upright surface 60 of the connector 40 on the accessory device abuts against the abutting surface 1210 of the connector 10 on the electronic device thereby determining the position in the direction of fitting of the connector 40 on the accessory device. In the present embodiment, when the first locking parts 5002 and the second locking parts 5004 are positioned under the first convex portions 2004 and the second convex portions 2008, respectively, the spring strips 52 are in elastic contact with portions toward the first convex portions 2004 of the edges of the second concave portions 2006.

When the shaft section 50 is moved in the direction of fitting, the upright surface 60 of the connector 40 on the accessory device pushes the cover 26 of the connector 10 on the electronic device into the open position. At the same time, the contacts 48 of the connector 40 on the accessory device after sliding over the inclined surface 1204 and the contact mounting surface 1206 are electrically connected to the contacts 16 of the connector 10 on the electronic device to establish electrical continuity.

Next, rotate the operation ring 44 to move the clamp blocks 70 down. When the clamp blocks 70 come down, the move preventing part 7006 on each side is inserted in the second concave portion 2006 located between the first convex portion 2004 and the second convex portion 2008 on the same side to prevent the shaft section 50 from moving in the direction in which the guide groove 18 extends.

Also, as the clamp blocks 70 come down, as shown in FIGS. 29 and 30, the first locking parts 5002 and the second locking parts 5004 abut against undersurfaces of the first convex portions 2004 and the second convex portions 2008, respectively, whereas undersurfaces of the clamping portions 7004 abut against upper surfaces of the first convex portions 2004 and the second convex portions 2008. This allows the clamping portions 7004 to clamp and fix the first convex portions 2004 and the second convex portions 2008 in cooperation with the first locking parts 5002 and the second locking parts 5004. In this way, the accessory device 200 is mounted on the electronic device 100.

With the accessory device 200 mounted on the electronic device 100, it is possible to do shooting with the accessory device 200 and do shooting with the electronic device 100 simultaneously. Image signals generated in the accessory device 200 are transmitted to the electronic device 100 via the connector 40 on the accessory device and the connector 10 on the electronic device and are processed as required in the electronic device 100.

To demount the accessory device 200 from the electronic device 100, use the following procedure. Rotate the operation ring 44 to move the clamp blocks 70 up. As the clamp blocks are moved up, the move preventing parts 7006 come up exiting the second concave portions 2006 and the clamping portions 7004 also come up to unclamp the first convex portions 2004 and the second convex portions 2008 that the clamping portions 7004 have been clamping in cooperation with the first locking parts 5002 and the second locking parts 5004.

Next, when the shaft section 50 of the connector 40 on the accessory device is moved in the direction of withdrawal, the first locking parts 5002 and the second locking parts 5004 are moved in the space 22 to be positioned below the first concave portions 2002 and the second concave portions 2006, respectively. At the same time, the spring strips 52 are moved out of the second concave portions 2006 to come into elastic contact with the edges of the first convex portions 2004 to be slightly pushed into the inside of the sides of the shaft section 50. The spring strips 52 being in elastic contact with the edges of the first convex portions 2004 and moving in unison with the shaft section 50 enter the first concave portions 2002 to protrude therein. As the shaft section 50 is moved in the direction of withdrawal, the contacts 48 of the connector 40 on the accessory device are separated from the contacts 16 of the connector 10 on the electronic device to break the electrical continuity there. The cover 26 returns from the open position to the closed position.

In this state, moving the shaft section 50 of the connector 40 on the accessory device in the direction of removal lifts the first locking parts 5002 and the second locking parts 5004 of the connector 40 on the accessory device out of the space 22 via the first concave portions 2002 and the second concave portions 2006, respectively, to separate the shaft section 50 of the connector 40 on the accessory device from the connector 10 on the electronic device. This completes demounting of the accessory device 200 from the electronic device 100.

According to the present embodiment, when fitting the connector 40 on the accessory device to the connector 10 on the electronic device, the first locking parts 5002 and the second locking parts 5004 of the connector 40 on the accessory device are inserted in the space 22 via the first concave portions 2002 and the second concave portions 2006, respectively. The shaft section 50 of the connector 40 on the accessory device is then moved in the direction of fitting to position the first locking parts 5002 and the second locking parts 5004 under the first convex portions 2004 and the second convex portions 2008, respectively. As a result, the plural contacts 16 of the connector 10 on the electronic device come into contact with the plural contacts 48 of the connector 40 on the accessory device.

Now refer to FIGS. 25 and 26 to review the dimension S, that is, the dimension in the direction of fitting of a space required to fit the connector 40 on the accessory device to the connector 10 on the electronic device. In the present embodiment, the length in the direction of fitting of each of the first locking parts 5002 and the second locking parts 5004 is approximately one third of the dimension in the direction of fitting of the shaft section 50. Therefore, the dimension S may be just as large as the sum of L and L/3, where L represents the dimension in the direction of fitting of the connector 40 on the accessory device (the dimension of the shaft section 50) and the L/3 approximately represents the dimension in the direction of fitting of each of the first locking parts 5002 and the second locking parts 5004.

Therefore, the dimension in the direction of fitting of a space required to fit the connector 40 on the accessory device to the connector 10 on the electronic device may be just as large as the sum of the dimension in the direction of fitting of the connector 40 on the accessory device and the dimension in the direction of fitting of each of the first locking parts 5002 and the second locking parts 5004.

On the other hand, when a conventional method in which the connector 40 on the accessory device is fitted to the connector 10 on the electronic device from outside the contour of the connector 10, the dimension S is required to be at least as large as 2L, that is, twice the dimension L in the direction of fitting of the connector 40 on the accessory device.

Thus, unlike in cases in which the conventional method is used, it is not necessary to secure, around the connector 10 on the electronic device, a large space for use in fitting the connector 40 on the accessory device to the connector 10 on the electronic device. This is quite an advantage in making the electronic device 100 and the accessory device 200 smaller and in improving the design of the devices.

Turning the operation ring 44 causes the clamping portions 7004 to abut on the upper surfaces of the first convex portions 2004 and the second convex portions 2008 allowing the clamping portions 7004 to clamp and fix the first convex portions 2004 and the second convex portions 2008 in cooperation with the first locking parts 5002 and the second locking parts 5004. Turning the operation ring 44 also causes the move preventing parts 7006 to be inserted in the first convex portions 2006 formed between the first convex portions 2004 and the second convex portions 2008 to thereby prevent the shaft section 50 from moving in the direction in which the guide groove 18 extends. In this way, the connector 40 on the accessory device can be firmly fitted to the connector 10 on the electronic device.

This arrangement is an advantage in unfailingly preventing the connector 40 on the accessory device from falling off the connector 10 on the electronic device in cases in which an external force is applied to the connector 40 on the accessory device in the direction in which the guide 18 extends.

Also, the first convex portions 2004 that are fixed and held by the first locking parts 5002 of the connector 40 on the accessory device, of the connector 10 on the electronic device, that is, the first convex portions 2004 used to fix the connector 40 on the accessory device are also used as members with which the spring strips 52 come in elastic contact to generate clicks to be felt by the user. This is an advantage in checking an increase in the number of components and reducing the production cost.

Furthermore, an arrangement has been made such that, when the contacts 48 of the connector 40 on the accessory device and the contacts 16 of the connector 10 on the electronic device are in contact, the spring strips 52 stay in elastic contact with the edges of the first convex portions 2004 so as to temporarily hold the connector 40 on the accessory device. Thus, the first convex portions 2004 used to fix the connector 40 on the accessory device are also used as members for temporarily holding the connector 40 on the accessory device. This is an advantage in checking an increase in the number of components and reducing the production cost.

Fourth Embodiment

Next, a fourth embodiment of the present invention will be described with reference to drawings.

Figure 31:
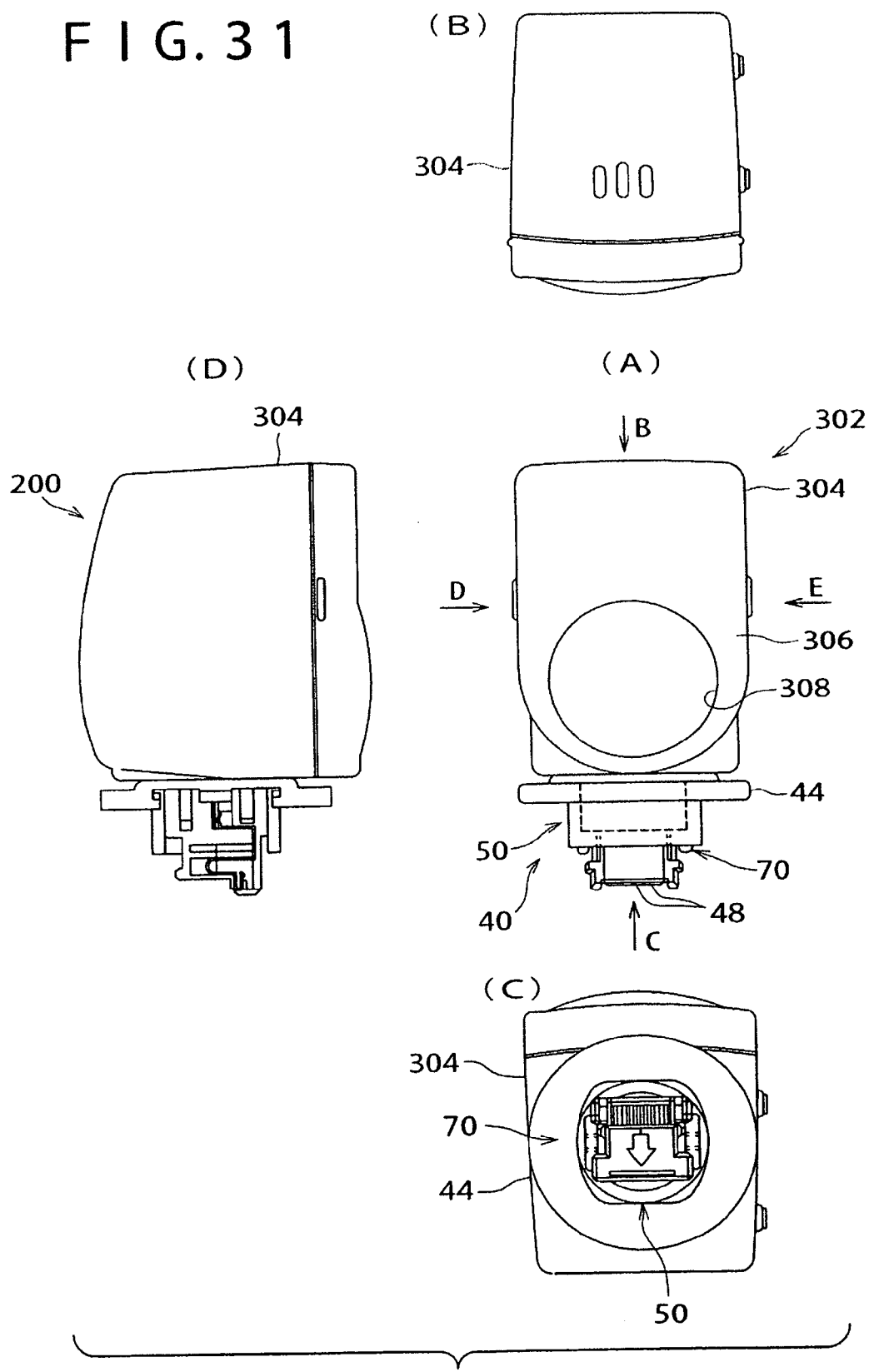
FIG. 31 shows a configuration of an accessory device of a fourth embodiment.
Figure 32:
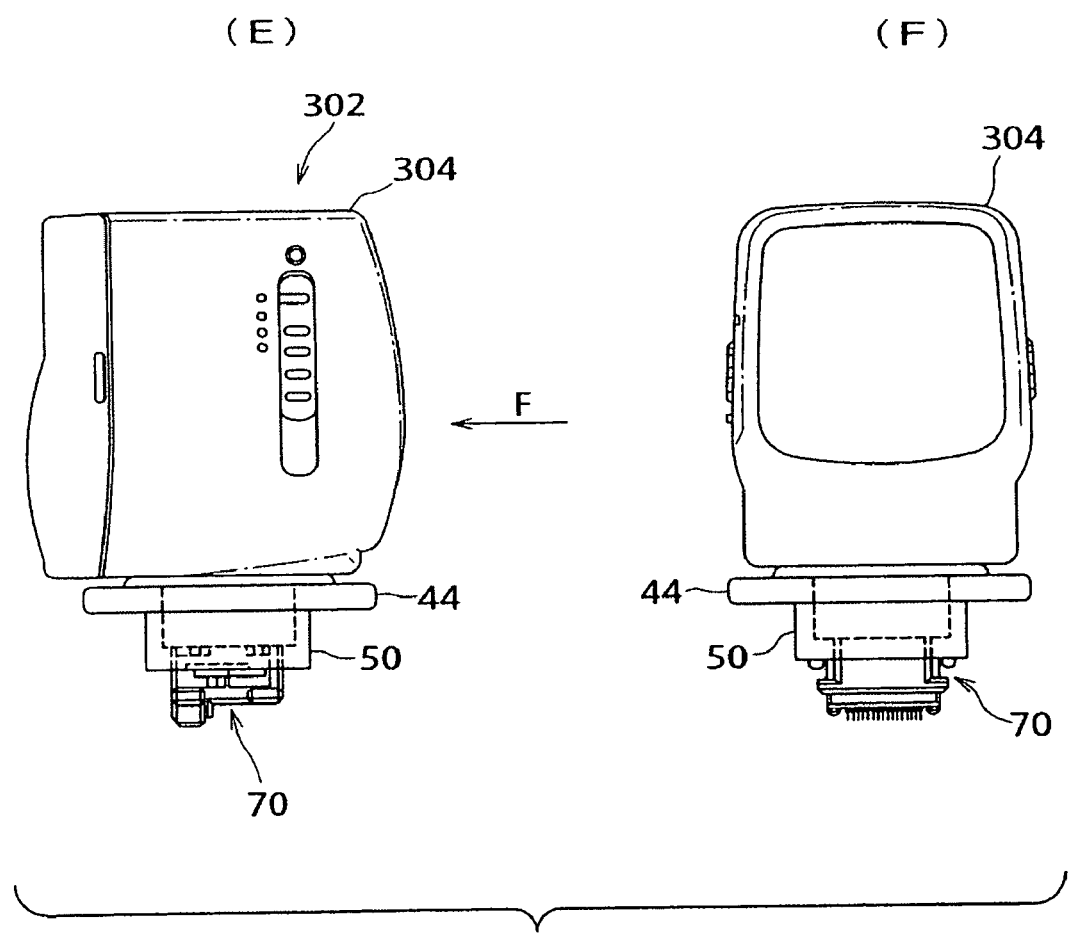
FIG. 32 shows a configuration of the accessory device of the fourth embodiment.

Part (A) of FIG. 31 is a front elevation view of an accessory device of the fourth embodiment. Part (B) of FIG. 31 is a view in the direction of arrow B in part (A). Similarly, part (C) is a view in the direction of arrow C in part (A) and part (D) is a view in the direction of arrow D in part (A). Part (E) of FIG. 32 is a view in the direction of arrow E in part (A) of FIG. 31. Part (F) of FIG. 32 is a view in the direction of arrow F in part (E).

In the fourth and the subsequent embodiments, a connector 40 on the accessory device similar to that according to the third embodiment is provided. The connector 40 on the accessory device is to be fitted to a connector on the electronic device like the one according to the third embodiment.

In the fourth embodiment, the accessory device 200 is a lighting device 302 for illuminating a subject with auxiliary light. The lighting device 302 has a case 304 accommodating a light source (not shown). Light from the light source is emitted via a window 308 provided on a front 306 of the case 304.

In the fourth embodiment, the connection section 208 and the shaft member 42 used in the third embodiment are not used; a shaft section 50 protrudes directly from an undersurface of the case 304.

In the fourth embodiment, too, the operation ring 44 is rotated to move the clamp blocks 70 up and down to allow the accessory device 200 to be fitted to the connector on the electronic device via the first locking parts 5002, the second locking parts 5004, the clamping portions 7004, and the move preventing parts 7006 as in the third embodiment. Therefore, effects similar to those created according to the third embodiment can also be created in the fourth embodiment.

Fifth Embodiment

Next, a fifth embodiment of the present invention will be described with reference to drawings.

Figure 33:
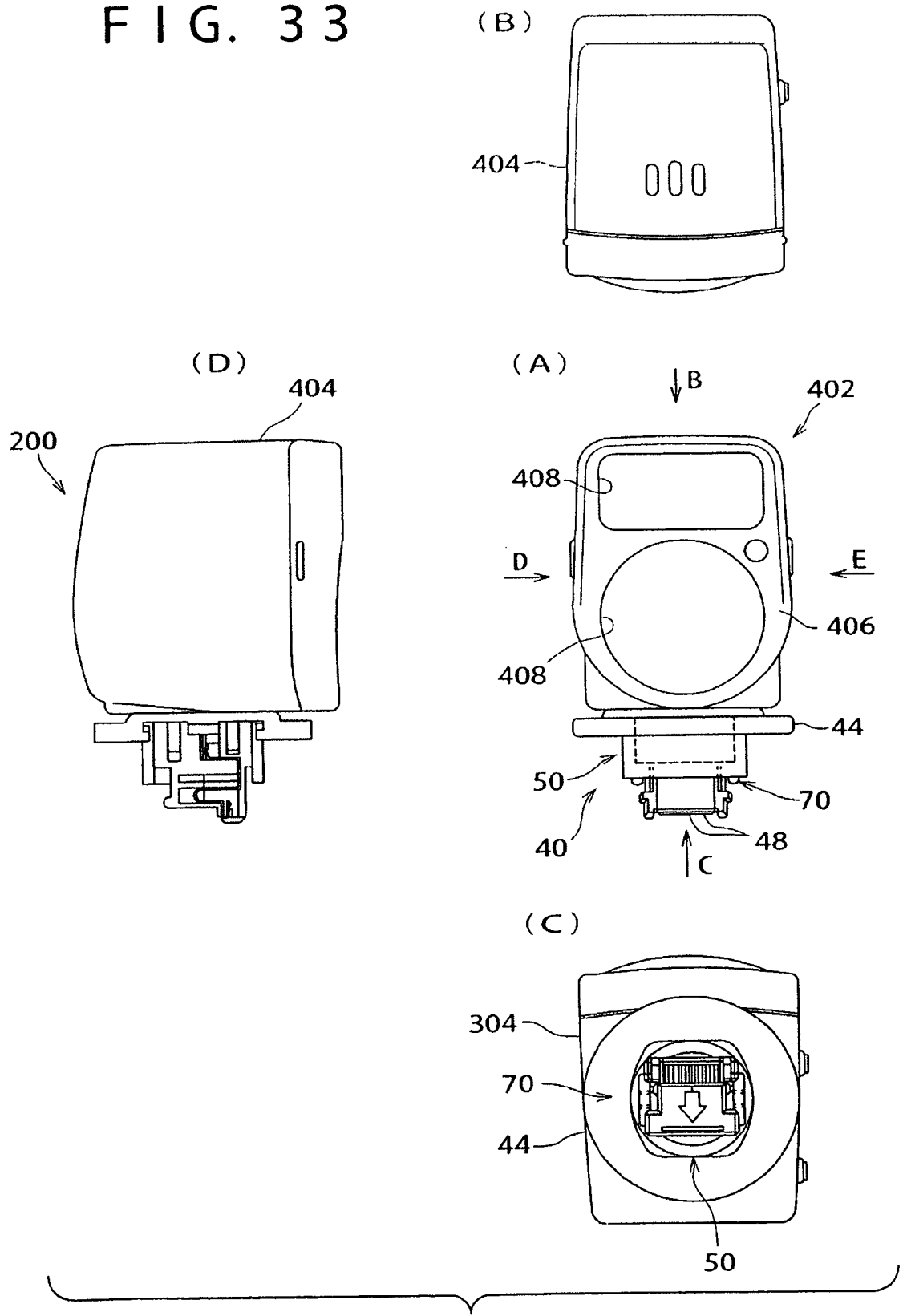
FIG. 33 shows a configuration of an accessory device of a fifth embodiment.

Part (A) of FIG. 33 is a front elevation view of an accessory device of the fifth embodiment. Part (B) of FIG. 33 is a view in the direction of arrow B in part (A). Similarly, part (C) is a view in the direction of arrow C in part (A) and part (D) is a view in the direction of arrow D in part (A). Part (E) of FIG. 34 is a view in the direction of arrow E in part (A) of FIG. 33. Part (F) of FIG. 34 is a view in the direction of arrow F in part (E) of FIG. 34.

In the fifth embodiment, the accessory device 200 is a flash device 402 for illuminating a subject with a flash of light.

The flash device 402 has a case 404. The case 404 accommodates a light source (not shown) which emits a flash of light and a light control sensor (not shown) which measures illuminance around a subject for the purpose of adjusting the intensity of the flash of light. Two windows 408 are provided on a front 406. The flash of light generated by the light source is emitted via the lower one of the two windows 408. The light control sensor measures the illuminance of the flash of light via the upper one of the two windows 408.

In the fifth embodiment, too, the operation ring 44 is rotated to move the clamp blocks 70 up and down to allow the accessory device 200 to be fitted to the connector on the electronic device via the first locking parts 5002, the second locking parts 5004, the clamping portions 7004, and the move preventing parts 7006 as in the third embodiment. Therefore, effects similar to those created according to the third embodiment can also be created in the fourth embodiment.

Sixth Embodiment

Next, a sixth embodiment of the present invention will be described with reference to drawings.

Part (A) of FIG. 35 is a front elevation view of an accessory device of the sixth embodiment. Part (B) of FIG. 35 is a view in the direction of arrow B in part (A) and part (C) is a view in the direction of arrow C in part (A). Part (D) of FIG. 36 is a view in the direction of arrow D in part (C) of FIG. 35. Part (E) of FIG. 36 is a view in the direction of arrow E in part (C) of FIG. 36.

In the sixth embodiment, the accessory device 200 is a microphone 502.

The microphone 502 has a case 504 which is long sideways. A sensor (not shown) which converts an audio signal into an electrical signal is provided on a front 506 of the case 504.

A base 508 is protrudingly provided in a rear part of an underside of the case 504. A shaft section 50 is protrudingly provided on an underside of the base 508.

In the sixth embodiment, too, the operation ring 44 is rotated to move the clamp blocks 70 up and down to allow the accessory device 200 to be fitted to the connector on the electronic device via the first locking parts 5002, the second locking parts 5004, the clamping portions 7004, and the move preventing parts 7006 as in the third embodiment. Therefore, effects similar to those created according to the third embodiment can also be created in the fourth embodiment.

An invention as described in the following can be extracted from the first to the sixth embodiments.

An accessory shoe device having a connector which is provided on an electronic device and which has contacts for supplying electric power or transferring signals, and a connector which is provided on an accessory device and which has contacts for supplying electric power or transferring signals; wherein:

the connector on the electronic device has locking plates forming a guide groove and a space facing an undersurface of the locking plates;

mutually facing pairs of first convex portions, first concave portions, second convex portions, and second concave portions are provided, being arranged in the order mentioned in a direction in which the guide groove extends, on a mutually facing pair of edges of the locking plates forming the guide groove;

the connector on the accessory device has an insert section which has the contacts and an end portion of which is inserted in the space via the guide groove;

a first locking part which can be inserted in the space via the first concave portions and which can then be moved along the direction in which the guide groove extends and a second locking part which can be inserted in the space via the second concave portions and which can then be moved along the direction in which the guide groove extends are provided on both sides of the end portion of the insert section;

spring strips which, in a state in which the first locking parts and the second locking parts have been entered in the space via the first concave portions and the second concave portions, respectively, are positioned in the first concave portions, which, when the first locking parts and the second locking parts move toward under the first convex portions and the second convex portions, respectively, come into elastic contact with edges of the first convex portions, and which, in a state in which the first locking parts and the second locking parts are positioned under the first convex portions and the second convex portions, respectively, are positioned in the second concave portions are provided between the first locking parts and the second locking parts in the end portion of the insert section; and the contacts included in the connector on the accessory device and the contacts included in the connector on the electronic device are in contact in a state in which the first locking parts and the second locking parts are positioned under the first convex portions and the second convex portions.

The above invention is characterized in that, in a state in which the first locking parts and the second locking parts are positioned under the first convex portions and the second convex portions, respectively, the spring strips are in elastic contact with portions toward the first convex portions of the edges of the second concave portions.

The above invention is characterized in that a fixing section which fixes the connector on the accessory device to the connector on the electronic device in a state in which the first locking parts and the second locking parts are positioned under the first convex portions and the second convex portions, respectively, is provided, the fixing section ranging over the connector on the electronic device and the connector on the accessory device.

The above invention is characterized in that a clamp ring which is fixed by screwing to a base of the insert section, the base being positioned, in a state in which the end portion of the insert section has been inserted in the guide groove, above the locking plates, and which clamps and fixes the first convex portions and the second convex portions in cooperation with the first locking parts and the second locking parts is provided, the locking section having the first locking parts, the second locking parts, the first convex portions, the second convex portions, and the clamp ring.

An invention as described in the following can also be extracted.

An accessory device having a connector on the accessory device to be connected to a connector on an electronic device, the connector on the accessory device having contacts for supplying electric power or transferring signals, wherein:

the connector on the electronic device has locking plates forming a guide groove and a space provided under the locking plates, and mutually facing pairs of first convex portions, first concave portions, second convex portions, and second concave portions are provided, being arranged in the order mentioned in a direction in which the guide groove extends, on a mutually facing pair of edges of the locking plates forming the guide groove;

the connector on the accessory device has an insert section which is provided with the contacts and an end portion of which is inserted in the space via the guide groove;

first locking parts which can be inserted in the space via the first concave portions and which can then be moved along the direction in which the guide groove extends and second locking parts which can be inserted in the space via the second concave portions and which can then be moved along the direction in which the guide groove extends are provided on both sides of the end portion of the insert section; and spring strips which, in a state in which the first locking parts and the second locking parts have been entered in the space via the first concave portions and the second concave portions, respectively, are in contact with portions toward the first convex portions of edges of the first concave portions and which, in a state in which the first locking parts and the second locking parts have moved in the space to under the first convex portions and the second convex portions, respectively, are in contact with portions toward the first convex portions of edges of the second concave portions are provided in portions between the first locking parts and the second locking parts in the end portion of the insert section.

According to the present invention, when fitting the connector on the accessory device to the connector on the electronic device, the first locking parts and the second locking parts of the connector on the accessory device are inserted in the space via the first concave portions and the second concave portions, respectively. The insert section of the connector on the accessory device is then moved in the direction of fitting to position the first locking parts and the second locking parts under the first convex portions and the second convex portions, respectively. As a result, the plural contacts of the connector on the electronic device come into contact with the plural contacts of the connector on the accessory device.

Therefore, the dimension in the direction of fitting of a space required to fit the connector on the accessory device to the connector on the electronic device may be just as large as the sum of the dimension in the direction of fitting of the connector on the accessory device and the dimension in the direction of fitting of each of the first locking parts and the second locking parts.

Thus, unlike when a conventional method in which the connector on the accessory device is fitted from outside the contour of the connector on the electronic device is used, it is not necessary to secure, around the connector on the electronic device, a large space for use in fitting the connector on the accessory device. This is quite an advantage in making the electronic device and the accessory device smaller and in improving the design of the devices.

Also, the first convex portions, that are used to fix the connector on the accessory device, of the connector on the electronic device are also used as members with which the spring strips of the connector on the accessory device come into elastic contact to generate clicks to be felt by the user. This is an advantage in checking an increase in the number of components and reducing the production cost.

An invention as described in the following can also be extracted.

An accessory shoe device having a connector which is provided on an electronic device and which has contacts for supplying electric power or transferring signals, and a connector which is provided on an accessory device and which has contacts for supplying electric power or transferring signals, wherein:

the connector on the electronic device has a pair of locking plates which extend in a same plane and whose edges face each other, a guide groove which is formed between the mutually facing edges of the pair of the locking plates and which extends in a direction perpendicular to the direction in which the edges face each other, and a space facing undersurfaces of the locking plates;

a pair of first concave portions each of which is concave in a direction to widen the guide groove, a pair of first convex portions each of which is convex in a direction to narrow the guide groove, a pair of second concave portions each of which is concave in a direction to widen the guide groove, and a pair of second convex portions each of which is convex in a direction to narrow the guide groove are provided, being arranged in the order mentioned in a direction in which the guide groove extends, on the mutually facing edges of the locking plates;

the connector on the accessory device has a shaft section which has a length and which has the contacts provided in an end portion thereof as viewed in a length direction thereof;

a first locking part which can be inserted in the space via the first concave portions and which can then be moved along the direction in which the guide groove extends and a second locking part which can be inserted in the space via the second concave portions and which can then be moved along the direction in which the guide groove extends are provided on both sides of the end portion of the shaft section;

the contacts of the connector on the electronic device are arranged such that they are in contact with the contacts of the connector on the accessory device in a state in which the first locking parts and the second locking parts abut against undersurfaces of the first convex portions and the second convex portions, respectively;

an operation ring is provided in a portion, above the locking plates, of the shaft section to be rotatable in a state in which the end portion of the shaft section has been inserted in the guide groove;

clamp blocks which are moved in the length direction of the shaft section by rotating the operation ring are provided on both sides of the shaft section; and the clamp blocks has clamping portions which, in a state in which the first locking parts and the second locking parts abut against the undersurfaces of the first convex portions and the second convex portions, abut against upper surfaces of the first convex portions and the second convex portions and clamp and fix the first convex portions and the second convex portions in cooperation with the first locking parts and the second locking parts and move preventing parts which are inserted in the second concave portions formed between the first convex portions and the second convex portions to prevent the shaft section from moving in the direction in which the guide groove extends.

The above invention is characterized in that spring strips which, in a state in which the first locking parts and the second locking parts have been entered in the space via the first concave portions and the second concave portions, respectively, are positioned in the first concave portions, which, when the first locking parts and the second locking parts move toward under the first convex portions and the second convex portions, respectively, come into elastic contact with edges of the first convex portions, and which, in a state in which the first locking parts and the second locking parts are positioned under the first convex portions and the second convex portions, respectively, are positioned in the second concave portions are provided between the first locking parts and the second locking parts in the end portion of the insert section.

The above invention is characterized in that, in a state in which the first locking parts and the second locking parts are positioned under the first convex portions and the second convex portions, respectively, the spring strips are in elastic contact with portions toward the first convex portions of edges of the second concave portions.

An invention as described in the following can also be extracted.

An accessory device having a connector on the accessory device to be connected to a connector on an electronic device, the connector on the accessory device having contacts for supplying electric power or transferring signals, wherein:

the connector on the electronic device has a pair of locking plates which extend in a same plane and whose edges face each other, a guide groove which is formed between the mutually facing edges of the pair of the locking plates and which extends in a direction perpendicular to the direction in which the edges face each other, and a space facing undersurfaces of the locking plates;

a pair of first concave portions each of which is concave in a direction to widen the guide groove, a pair of first convex portions each of which is convex in a direction to narrow the guide groove, a pair of second concave portions each of which is concave in a direction to widen the guide groove, and a pair of second convex portions each of which is convex in a direction to narrow the guide groove are provided, being arranged in the order mentioned in a direction in which the guide groove extends, on the mutually facing edges of the locking plates;

the connector on the accessory device has a shaft section which has a length and which has the contacts provided in an end portion thereof as viewed in a length direction thereof;

a first locking part which can be inserted in the space via the first concave portions and which can then be moved along the direction in which the guide groove extends and a second locking part which can be inserted in the space via the second concave portions and which can then be moved along the direction in which the guide groove extends are provided on both sides of the end portion of the shaft section;

the contacts of the connector on the accessory device are arranged such that they are in contact with the contacts of the connector on the electronic device in a state in which the first locking parts and the second locking parts abut against undersurfaces of the first convex portions and the second convex portions, respectively;

an operation ring is provided in a portion, above the locking plates, of the shaft section to be rotatable in a state in which the end portion of the shaft section has been inserted in the guide groove;

clamp blocks which are moved in the length direction of the shaft section by rotating the operation ring are provided on both sides of the shaft section; and the clamp blocks has clamping portions which, in a state in which the first locking parts and the second locking parts abut against the undersurfaces of the first convex portions and the second convex portions, abut against upper surfaces of the first convex portions and the second convex portions and clamp and fix the first convex portions and the second convex portions in cooperation with the first locking parts and the second locking parts and move preventing parts which are inserted in the second concave portions formed between the first convex portions and the second convex portions to prevent the shaft section from moving in the direction in which the guide groove extends.

The above invention is characterized in that spring strips which, in a state in which the first locking parts and the second locking parts have been entered in the space via the first concave portions and the second concave portions, respectively, are positioned in the first concave portions, which, when the first locking parts and the second locking parts move toward under the first convex portions and the second convex portions, respectively, come into elastic contact with edges of the first convex portions, and which, in a state in which the first locking parts and the second locking parts are positioned under the first convex portions and the second convex portions, respectively, are positioned in the second concave portions are provided between the first locking parts and the second locking parts in the end portion of the insert section.

According to the present invention, when fitting the connector on the accessory device to the connector on the electronic device, the first locking parts and the second locking parts of the connector on the accessory device are inserted in the space via the first concave portions and the second concave portions, respectively. The insert section of the connector on the accessory device is then moved in the direction of fitting to position the first locking parts and the second locking parts under the first convex portions and the second convex portions, respectively. As a result, the plural contacts of the connector on the electronic device come into contact with the plural contacts of the connector on the accessory device.

Therefore, the dimension in the direction of fitting of a space required to fit the connector on the accessory device to the connector on the electronic device may be just as large as the sum of the dimension in the direction of fitting of the connector on the accessory device and the dimension in the direction of fitting of each of the first locking parts and the second locking parts.

Thus, unlike when a conventional method in which the connector on the accessory device is fitted from outside the contour of the connector on the electronic device is used, it is not necessary to secure, around the connector on the electronic device, a large space for use in fitting the connector on the accessory device. This is quite an advantage in making the electronic device and the accessory device smaller and in improving the design of the devices.

Rotating the operation ring 44 causes the clamping portions 7004 to abut on the upper surfaces of the first convex portions 2004 and the second convex portions 2008 allowing the clamping portions 7004 to clamp and fix the first convex portions 2004 and the second convex portions 2008 in cooperation with the first locking parts 5002 and the second locking parts 5004. Rotating the operation ring 44 also causes the move preventing parts 7006 to be inserted in the first convex portions 2006 formed between the first convex portions 2004 and the second convex portions 2008 to thereby prevent the shaft section 50 from moving in the direction in which the guide groove 18 extends. In this way, the connector 40 on the accessory device can be firmly fitted to the connector 10 on the electronic device.

This arrangement is an advantage in unfailingly preventing the connector 40 on the accessory device from falling off the connector 10 on the electronic device in cases in which an external force is applied to the connector 40 on the accessory device in the direction in which the guide groove 18 extends.

Although, in the above description of the various preferred embodiments of the present invention, the present invention was described based on cases in which an accessory shoe device is applied to a video camera, applications of the present invention are not limited to such cases only. Needless to say, it is also possible to apply the present invention to cases of applying an accessory shoe device to various electronic devices such as a personal digital assistant (PDA) with camera and a camera cell-phone or various imaging devices such as a digital still camera and a film camera.

It should be understood by those skilled in the art that various modifications, combinations, sub-combinations and alterations may occur depending on design requirements and other factors insofar as they are within the scope of the appended claims or the equivalents thereof.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An accessory device that is connectable to an accessory mounting section of an electronic device, the accessory device comprising:

an exterior case;

an insert section which protrudes from the exterior case and which includes an end portion having a first side surface and a second side surface disposed on opposing sides of the end portion between a front face of the end portion and a back face of the end portion;

a first locking part and a second locking part that each extend from the first side surface and which are separated from each other by a concave portion; and another first locking part and another second locking part that each extend from the second side surface and which are separated from each other by another concave portion;

the first locking part and the another first locking part each being coplanar with an end surface of the end portion;

the second locking part including a guide portion which protrudes from the end surface of the end portion, and the another second locking part including another guide portion which protrudes from the end surface of the end portion; and the first side surface and the second side surface being configured such that the end portion of the insert section is insertable into an opening formed between a first locking plate and a second locking plate of an electronic device by moving the end portion along a first direction, and the end portion of the insert section is then movable within the accessory mounting section of the electronic device along a second direction that is substantially perpendicular to the first direction, the guide portion and the another guide portion permitting the end portion of the insert section to be inserted into the opening formed between the first locking plate and the second locking plate of the electronic device at a first orientation with respect to the opening and preventing the end portion of the insert section from being inserted into the opening formed between the first locking plate and the second locking plate of the electronic device at a second orientation that is a reverse of the first orientation.

2. The accessory device according to claim 1, wherein the end portion of the insert section includes a fixing means for clamping and fixing the insert section of the accessory device to the accessory mounting section of the electronic device after the end portion of the insert section is moved within the accessory mounting section of the electronic device.

3. The accessory device according to claim 2, wherein the fixing means includes a spring strip that extends from the first side surface and a further spring strip that extends from the second side surface.

4. The accessory device according to claim 1, wherein the end portion of the insert section is configured to limit insertion of the end portion to at most a predetermined depth within the opening in the accessory mounting section.

5. The accessory device according to claim 1, wherein the end portion of the insert section is configured to guide it while being moved within the accessory mounting section of the electronic device.

6. The accessory device according to claim 1, wherein the end portion of the insert section is configured to restrict its movement to at most a particular distance along the first direction.

7. The accessory device according to claim 1, wherein the end portion of the insert section includes a plurality of electrical contacts configured to electrically connect with the electronic device after the end portion is moved within the accessory mounting section.

8. The accessory device according to claim 1, wherein the accessory device includes an illumination device.

9. The first accessory device according to claim 1, wherein at least part of the first side surface is configured to substantially match a contour of an edge of the first locking plate of the accessory mounting section of the electronic device, and at least part of the second side surface is configured to substantially match a contour of an edge of the second locking plate of the accessory mounting section of the electronic device so that the end portion of the insert section is inserted into the opening formed between the edges of the first and second locking plates at a specific orientation with respect to the electronic device.

10. An electronic device, comprising:
an accessory mounting section that is connectable to an accessory device, the accessory mounting section including:
a first locking plate having an outer surface, an inner surface, and an end surface disposed between the outer surface and the inner surface, the end surface including a first concave part, a convex part, and a second concave part,
a second locking plate having an outer surface, an inner surface, and an end surface disposed between the outer surface and the inner surface, the end surface including another first concave part, another convex part, and another second concave part,
the end surface of the second locking plate being configured to face the end surface of the first locking plate and being spaced apart from the end surface of the first locking plate to form an opening in the accessory mounting section,
a pair of guide surfaces disposed beneath the edges of the first and second locking plates, respectively, and forming an opposing pair of spaces which are configured such that an end portion of the accessory device, after being inserted into the opening in the accessory mounting section, is movable along a predefined direction within the accessory mounting section, and
an intermediate surface disposed beneath the pair of guide surfaces under the first concave part and the another first concave part, but not under the second concave part and the another second concave part, to permit the end portion of the insert section of the accessory device to be inserted into the opening in the accessory mounting section at a first orientation with respect to the opening and to prevent the end portion of the insert section of the accessory device from being inserted into the opening in the accessory mounting section at a second orientation that is a reverse of the first orientation.

11. The electronic device according to claim 10, wherein the pair of spaces are configured such that the end portion of the insert section is movable within the accessory mounting section only along a direction substantially perpendicular to a direction of insertion.

12. The electronic device according to claim 10, wherein the accessory mounting section is configured to restrict insertion of the end portion of the insert section to at most a predetermined depth within the opening in the accessory mounting section.

13. The electronic device according to claim 10, wherein the accessory mounting section is configured to restrict movement of the end portion to at most a particular distance along the predefined direction.

14. The electronic device according to claim 10, wherein the accessory mounting section includes a plurality of electrical contacts configured to electrically connect with the end portion of the insert section after the end portion of the insert section is moved within the accessory mounting section.

15. The electronic device according to claim 10, wherein the end surface of the first locking plate is configured to substantially match a contour of a first side surface of an end portion of the accessory device, and the end surface of the second locking plate is configured to substantially match a contour of a second side surface of the end portion of the accessory device so that the end portion of the insert section can be inserted into the opening formed between the edges of the first and second locking plates at a specific orientation with respect to the electronic device.

16. An accessory device that is connectable to an accessory mounting section of an electronic device, the accessory device comprising:
an exterior case;
an insert section that protrudes from the exterior case and which includes an end portion located distally from the exterior case, the end portion including a first side surface and a second side surface disposed on opposing sides of the end portion between a front face of the end portion and a back face of the end portion;
a first locking part and a second locking part each extending from the first side surface and being separated from each other such that a concave portion is formed between the first locking part and the second locking part, the first locking part being disposed nearer to the front face of the end portion than the second locking part is disposed; and another first locking part and another second locking part each extending from the second side surface and being separated from each other such that another concave portion is formed between the another first locking part and the another second locking part, the another first locking part being disposed nearer to the front face of the end portion than the another second locking part is disposed;

the second locking part including a guide portion which protrudes from an end surface of the end portion, and the another second locking part including another guide portion which protrudes from the end surface of the end portion;

an edge of the first locking part, the second locking part, and the concave portion of the first side surface being configured to have a contour that is substantially an inverse of a contour of an edge of a first locking plate of the accessory mounting section of the electronic device, and an edge of the another first locking part, the another second locking part, and the another concave portion of the second side surface being configured to have a contour that is substantially an inverse of a contour of an edge of a second locking plate of the accessory mounting section of the electronic device so that the end portion of the insert section is inserted into an opening formed between the edge of the first and the edge of the second locking plates at only one orientation with respect to the electronic device;

the first side surface and the second side surface being further configured such that the end portion of the insert section is inserted into the opening formed by the first and second locking plates by moving the end portion along a first direction, the end portion of the insert section is movable within the accessory mounting section of the electronic device along a second direction that is substantially perpendicular to the first direction; and the guide portion and the another guide portion permitting the end portion of the insert section to be inserted into the opening formed by the first and second locking plates of the electronic device at a first orientation with respect to the opening and preventing the end portion of the insert section from being inserted into the opening formed by the first and second locking plates of the electronic device at a second orientation that is a reverse of the first orientation.

17. The accessory device according to claim 16, wherein the end portion of the insert section includes a fixing means for clamping and fixing the insert section of the accessory device to the accessory mounting section of the electronic device after the end portion of the insert section is moved within the accessory mounting section of the electronic device.

18. The accessory device according to claim 17, wherein the fixing means includes a spring strip that extends from the first side surface and a further spring strip that extends from the second side surface.

19. The accessory device according to claim 16, wherein the end portion of the insert section includes an end surface which is configured to limit insertion of the end portion to at most a predefined depth within the opening in the accessory mounting section.

20. The accessory device according to claim 16, wherein the end portion of the insert section includes a pair of guide surfaces which are configured to guide the end portion while the end portion is moved within the accessory mounting section of the electronic device.

21. The accessory device according to claim 16, wherein the end portion of the insert section includes a stop surface which is configured to restrict movement of the end portion along the first direction to at most a predefined distance.

22. The accessory device according to claim 16, wherein the end portion of the insert section includes a contact mounting surface upon which a plurality of electrical contacts are provided and which are configured to electrically connect with the electronic device after the end portion is moved a particular distance along the second direction within the accessory mounting section.

23. The accessory device according to claim 16, wherein the accessory device includes an illumination device.

24. An electronic device, comprising:
an accessory mounting section that is connectable to an accessory device, the accessory mounting section including:
a first locking plate having an outer surface, an inner surface, and an end surface disposed between the outer surface and the inner surface, the end surface including at least a first concave part, a convex part, and a second concave part,
a second locking plate having an outer surface, an inner surface, and an end surface disposed between the outer surface and the inner surface, the end surface including at least another first concave part, another convex part, and another second concave part,
the end surface of the second locking plate being configured to face the end surface of the first locking plate such that the another first concave part, the another convex part, and the another second concave part of the second locking plate face the first concave part, the convex part, and the second concave part of the first locking plate, respectively,
the first concave part, the convex part, and the second concave part of the first locking plate being configured to have a contour that substantially matches a contour of a first side surface of an end portion of the accessory device, and the another first concave part, the another convex part, and the another second concave part of the second locking plate being configured to have a contour that substantially matches a contour of a second side surface of the end portion of the accessory device so that the end portion of the accessory device can be inserted into an opening formed between the edges of the first and second locking plates at only one orientation with respect to the electronic device,
a pair of guide surfaces disposed beneath the edges of the first and second locking plates, respectively, and forming an opposing pair of spaces which are located between the pair of guide surfaces and the first and second locking plates, the pair of spaces being configured such that the end portion of the insert section of the accessory device, after being inserted into the opening in the accessory mounting section, is movable along only one direction within the accessory mounting section, and
an intermediate surface disposed beneath the pair of guide surfaces under the first concave part and the another first concave part, but not under the second concave part and the another second concave part, to permit the end portion of the insert section of the accessory device to be inserted into the opening in the accessory mounting section at a first orientation with respect to the opening and to prevent the end portion of the insert section of the accessory device from being inserted into the opening in the accessory mounting section at a second orientation that is a reverse of the first orientation.

25. The electronic device according to claim 24, wherein the pair of spaces are configured such that the end portion of the insert section is movable within the accessory mounting section only along a direction substantially perpendicular to a direction of insertion.

26. The electronic device according to claim 24, wherein the accessory mounting section includes an intermediate surface which is configured to restrict insertion of the end portion of the insert section to at most a predefined depth within the opening in the accessory mounting section.

27. The electronic device according to claim 24, wherein the accessory mounting section includes a stop surface which is configured to restrict movement of the end portion along the only one direction to at most a predefined distance.

28. The electronic device according to claim 24, wherein the accessory mounting section includes a plurality of electrical contacts which are configured to electrically connect with the end portion of the insert section after the end portion of the insert section is moved a particular distance along the only one direction within the accessory mounting section.

* * * * *